＊

US008567820B2

(12) United States Patent
Kimener et al.

(10) Patent No.: US 8,567,820 B2
(45) Date of Patent: Oct. 29, 2013

(54) TRAILER STABILIZER

(75) Inventors: R. Peter Kimener, Loveland, OH (US); Thomas Terrence Kimener, Loveland, OH (US); Daniel Wahlstrom, Vancouver, WA (US)

(73) Assignee: Midwest Industrial Door, Inc., Loveland, OH (US)

( * ) Notice: Subject to any disclaimer, the term of this patent is extended or adjusted under 35 U.S.C. 154(b) by 0 days.

(21) Appl. No.: 13/611,456

(22) Filed: Sep. 12, 2012

(65) Prior Publication Data
US 2013/0001922 A1    Jan. 3, 2013

Related U.S. Application Data

(63) Continuation of application No. 13/316,801, filed on Dec. 12, 2011, now Pat. No. 8,286,997, which is a continuation of application No. PCT/US2011/037260, filed on May 19, 2011.

(60) Provisional application No. 61/346,143, filed on May 19, 2010, provisional application No. 61/438,232, filed on Jan. 31, 2011.

(51) Int. Cl.
*B60S 9/02* (2006.01)
*B60D 1/66* (2006.01)

(52) U.S. Cl.
USPC ....................... 280/763.1; 280/475

(58) Field of Classification Search
USPC ............... 280/763.1, 79.4, 43.24, 400, 406.2, 280/475; 414/401, 402
See application file for complete search history.

(56) References Cited

U.S. PATENT DOCUMENTS

| 1,786,463 | A | 12/1930 | Thomas |
| 2,754,108 | A | 7/1956 | Brown |
| 2,766,007 | A | 10/1956 | Krilanovich |
| 2,841,247 | A | 7/1958 | Smalley |
| 3,169,012 | A | 2/1965 | Fagan |
| 3,183,854 | A | 5/1965 | Candlin, Jr. et al. |
| 3,189,322 | A | 6/1965 | Hadek |
| 3,234,893 | A | 2/1966 | Sweda |
| 3,235,211 | A | 2/1966 | Robinson et al. |
| 3,250,506 | A | 5/1966 | Thouvenelle et al. |
| 3,305,049 | A | 2/1967 | Willey |
| 3,348,502 | A | 10/1967 | Burns et al. |
| 3,362,353 | A | 1/1968 | Johnson et al. |
| 3,392,944 | A | 7/1968 | Wyrough |
| 3,403,487 | A | 10/1968 | Docter |
| 3,504,880 | A | 4/1970 | Toms |
| 3,521,902 | A | 7/1970 | Akers |
| 3,523,698 | A | 8/1970 | Bishop |

(Continued)

FOREIGN PATENT DOCUMENTS

| CA | 1197500 | 12/1985 |
| DE | 653079 C | 11/1937 |

(Continued)

*Primary Examiner* — Frank Vanaman
(74) *Attorney, Agent, or Firm* — Taft Stettinius & Hollister LLP

(57) ABSTRACT

A trailer stabilizer and signaling system comprising: (a) a repositionable freight trailer stabilizer comprising a frame having mounted thereto a wheel, the repositionable freight trailer stabilizer including a repositionable jack; and, (b) a stabilizer signaler operatively coupled to the trailer stabilizer, the stabilizer signaler including a deployable signal configured to confirm the trailer stabilizer is secured under a parked freight trailer.

19 Claims, 50 Drawing Sheets

(56) References Cited

U.S. PATENT DOCUMENTS

| | | | |
|---|---|---|---|
| 3,542,157 A | 11/1970 | Noah | |
| 3,556,481 A | 1/1971 | Mueller et al. | |
| 3,589,748 A | 6/1971 | Miller | |
| 3,669,409 A | 6/1972 | Eranosian | |
| 3,824,536 A | 7/1974 | Cherico | |
| 3,836,179 A | 9/1974 | Jennings | |
| 3,995,876 A | 12/1976 | Ronne | |
| 4,023,649 A | 5/1977 | Wood | |
| 4,037,822 A | 7/1977 | Barcella | |
| 4,067,543 A | 1/1978 | Orth et al. | |
| 4,097,840 A | 6/1978 | Chappelle | |
| 4,099,695 A | 7/1978 | Shinn, Jr. | |
| 4,113,065 A | 9/1978 | Sikli | |
| 4,199,168 A | 4/1980 | Bush et al. | |
| 4,223,767 A | 9/1980 | Powell | |
| 4,261,682 A | 4/1981 | Papps et al. | |
| 4,354,580 A | 10/1982 | DeLasantos et al. | |
| 4,366,965 A | 1/1983 | Rhodes | |
| 4,397,594 A | 8/1983 | Hammonds et al. | |
| 4,452,147 A | 6/1984 | Jwuc | |
| 4,456,278 A | 6/1984 | Chapman | |
| 4,456,413 A | 6/1984 | Pavlick | |
| 4,462,569 A | 7/1984 | Arzouman | |
| 4,524,699 A | 6/1985 | Pavlick | |
| 4,547,107 A | 10/1985 | Krause | |
| 4,573,663 A | 3/1986 | Nussbaum | |
| 4,582,176 A | 4/1986 | Roberts | |
| 4,636,119 A | 1/1987 | Terlecky | |
| 4,671,714 A | 6/1987 | Bennett | |
| 4,674,929 A | 6/1987 | Blunden | |
| 4,676,344 A | 6/1987 | Locicero | |
| 4,712,653 A | 12/1987 | Franklin et al. | |
| 4,718,800 A | 1/1988 | Engle | |
| 4,724,930 A | 2/1988 | VanLierop | |
| 4,743,150 A | 5/1988 | Hlinsky | |
| 4,822,004 A | 4/1989 | Van Lierop | |
| 4,858,888 A | 8/1989 | Cruz et al. | |
| 4,865,295 A | 9/1989 | Holloway | |
| 4,874,184 A | 10/1989 | Boyer | |
| 4,921,074 A | 5/1990 | Ochs | |
| 4,973,206 A | 11/1990 | Engle | |
| 5,013,011 A | 5/1991 | Halloway | |
| 5,015,131 A | 5/1991 | Schmidt et al. | |
| 5,017,064 A | 5/1991 | Kirwan et al. | |
| 5,017,065 A | 5/1991 | Krug et al. | |
| 5,020,445 A | 6/1991 | Adams, Jr. | |
| 5,026,229 A | 6/1991 | Matyas et al. | |
| 5,048,896 A | 9/1991 | Channell | |
| 5,052,868 A | 10/1991 | Hesch et al. | |
| 5,059,072 A | 10/1991 | Holt | |
| 5,090,720 A | 2/1992 | Heider et al. | |
| 5,100,105 A | 3/1992 | Schneider et al. | |
| 5,107,772 A | 4/1992 | Viens | |
| 5,112,172 A | 5/1992 | Engle | |
| 5,137,297 A | 8/1992 | Walker | |
| 5,139,102 A | 8/1992 | Pocapalia | |
| 5,215,344 A | 6/1993 | Augustyniak et al. | |
| 5,224,311 A | 7/1993 | Pearce | |
| 5,249,905 A | 10/1993 | Warner et al. | |
| 5,291,835 A | 3/1994 | Wicks | |
| 5,322,143 A | 6/1994 | Curran | |
| 5,340,082 A | 8/1994 | Holloway | |
| 5,348,331 A | 9/1994 | Hawkins | |
| 5,407,309 A | 4/1995 | Hesch et al. | |
| 5,490,748 A | 2/1996 | Hapeman | |
| 5,518,354 A | 5/1996 | Engle | |
| 5,531,559 A | 7/1996 | Kruzick | |
| 5,553,987 A | 9/1996 | Ellis | |
| 5,582,498 A | 12/1996 | Springer et al. | |
| 5,709,518 A | 1/1998 | Alexander et al. | |
| 5,743,697 A | 4/1998 | Alexander | |
| 5,757,528 A * | 5/1998 | Bradley et al. | 398/129 |
| 5,762,459 A | 6/1998 | Springer et al. | |
| 5,808,769 A * | 9/1998 | Kerklaan et al. | 398/131 |
| 5,868,379 A | 2/1999 | Ellis | |
| 5,934,857 A | 8/1999 | Alexander | |
| 6,082,952 A | 7/2000 | Alexander | |
| 6,089,544 A | 7/2000 | Ellis | |
| 6,091,764 A * | 7/2000 | Silk et al. | 375/219 |
| 6,092,970 A | 7/2000 | Hahn et al. | |
| 6,144,888 A * | 11/2000 | Lucas et al. | 700/83 |
| 6,168,360 B1 | 1/2001 | Knox | |
| 6,250,432 B1 | 6/2001 | Hageman et al. | |
| 6,250,650 B1 | 6/2001 | Douglas | |
| 6,309,165 B1 | 10/2001 | Hahn et al. | |
| 6,318,947 B1 | 11/2001 | Hahn et al. | |
| 6,336,527 B1 | 1/2002 | Metz | |
| 6,357,987 B1 | 3/2002 | Palus | |
| 6,368,043 B1 | 4/2002 | Leum et al. | |
| 6,396,408 B2 * | 5/2002 | Drummond et al. | 340/815.4 |
| 6,505,713 B1 | 1/2003 | Paul et al. | |
| 6,520,472 B1 | 2/2003 | Manich et al. | |
| 6,524,053 B2 | 2/2003 | Hahn et al. | |
| 6,589,003 B2 | 7/2003 | Berends | |
| 6,755,433 B2 | 6/2004 | Krauss | |
| 6,773,221 B2 | 8/2004 | Belongia et al. | |
| 6,951,345 B2 | 10/2005 | Wilks | |
| 7,226,265 B2 | 6/2007 | Wilson | |
| 7,232,282 B2 | 6/2007 | Engle | |
| 7,235,896 B2 * | 6/2007 | Olijnyk | 307/9.1 |
| 7,264,092 B2 | 9/2007 | Jette | |
| 7,413,172 B2 | 8/2008 | Kanzler et al. | |
| 2001/0022731 A1 | 9/2001 | Dupay | |
| 2005/0133315 A1 | 6/2005 | Hoofard | |
| 2006/0082100 A1 | 4/2006 | Gross et al. | |
| 2006/0145460 A1 | 7/2006 | Eriksson | |
| 2007/0050999 A1 | 3/2007 | Milner et al. | |
| 2008/0095598 A1 | 4/2008 | Cotton et al. | |
| 2010/0266375 A1 * | 10/2010 | Ion | 414/401 |

FOREIGN PATENT DOCUMENTS

| | | |
|---|---|---|
| DE | 3425498 A1 | 3/1985 |
| EP | 0 510 372 A1 | 3/1992 |
| EP | 0510372 B1 | 10/1994 |
| EP | 0510467 B1 | 11/1994 |
| FR | 1334344 A | 8/1963 |
| FR | 2636717 A2 | 3/1990 |
| GB | 927806 | 6/1963 |
| GB | 2 237 329 A | 5/1991 |
| WO | WO 90/09339 | 8/1990 |
| WO | PCT/US2011/037260 | 10/2011 |
| WO | WO 2011/146787 A1 | 11/2011 |
| WO | PCT/US2011/037260 | 11/2012 |

* cited by examiner

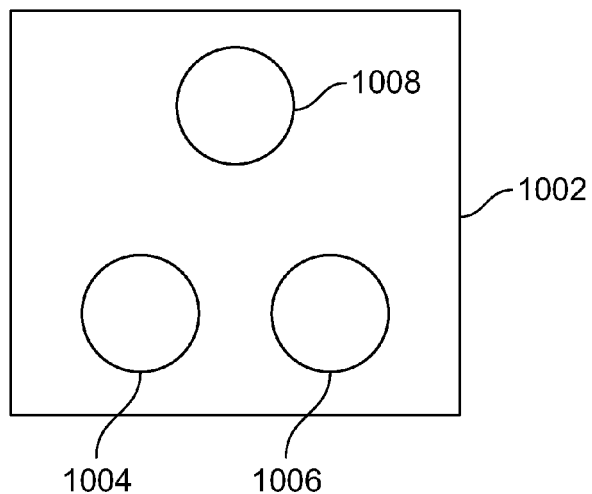
FIG. 39
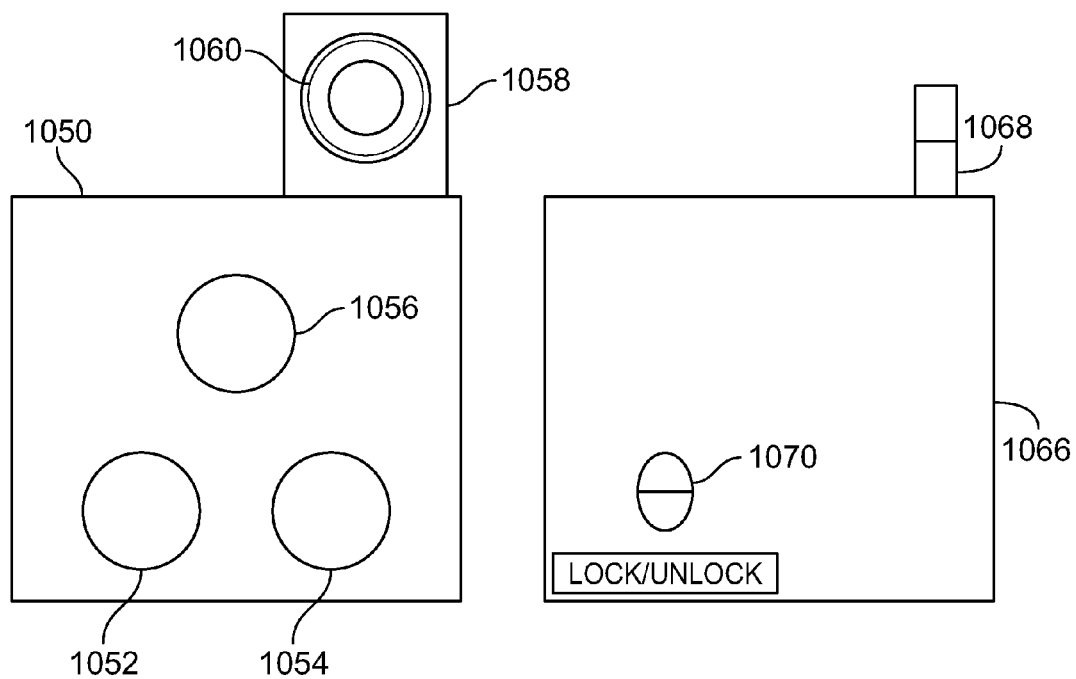
FIG. 40
FIG. 41

TRAILER STABILIZER

CROSS REFERENCE TO RELATED APPLICATIONS

This application is a continuation of U.S. patent application Ser. No. 13/316,801, filed Dec. 12, 2011 now U.S. Pat. No. 8,286,997, which was a continuation of Patent Cooperation Treaty Application Ser. No. PCT/US11/37260, filed May 19, 2011; which claimed the benefit of U.S. Provisional Patent Application Ser. No. 61/346,143, filed May 19, 2010, entitled "TRAILER DOCKING REPOSITIONABLE SUPPORT" and U.S. Provisional Patent Application Ser. No. 61/438,232, filed Jan. 31, 2011, entitled "TRAILER STABILIZER," the disclosure of each is incorporated herein by reference.

RELATED ART

1. Field of the Invention

The present disclosure is directed to supports utilized to secure freight trailers at a loading dock while dock personnel load and/or unload cargo from the freight trailers.

2. Related Art of Interest

Distribution warehouses are a necessary component of commerce in the twenty-first century. These warehouses may act as a clearinghouse for shipments from various product suppliers and centralize the distribution of goods. Large chain retailers utilize warehouses to generate shipments to particular points of sale that are specific to the needs of consumers in that area, without requiring the original manufacturer of the goods to identify consumer demand at each point of sale and correspondingly deliver the particular goods to each point of sale.

An exemplary distribution warehouse generally includes fifteen or more loading docks, with each loading dock adapted to receive a single freight trailer of a semi truck. A loading dock typically includes an opening elevated above ground level to match the height of the floor of the freight trailer. The relatively equal height between the floor of the loading dock and the floor of the trailer enables lift trucks (i.e., forklifts) and other material handling devices to move freely back and forth between the warehouse and interior of the freight trailer.

In an exemplary sequence, a loading dock opening of a warehouse is initially unoccupied by a freight trailer. Thereafter, a semi trailer driver or yard truck driver backs the rear opening of a freight trailer into alignment with the opening of the dock. After the rear of the freight trailer is properly aligned and positioned adjacent to the dock opening, the driver will either continue the engagement between the truck and trailer, or discontinue the engagement and relocate the truck to a remote location. In the context of yard trucks, the yard truck is only connected to the freight trailers long enough to position it adjacent to the loading dock opening. In an exemplary day, the yard truck may connect to and disconnect from one hundred or more freight trailers.

In summary fashion, a yard truck is a dedicated tractor that stays at the warehouse location and is only used to reposition freight trailers (not to tow the trailers on the open highways). By way of example, a warehouse may have ten dock openings, but have fifty trailers waiting to be unloaded. In order to expedite freight unloading and loading, as well as the convenience of the semi truck drivers that deliver to or pick up the freight trailers from the warehouse, the freight trailers need to be shuffled. This means that freight trailers do not include dedicated semi tractors continuously connected to them. Instead, because no semi truck is connected to many, if not all, of the freight trailers at a warehouse location, a yard truck is necessary to reposition the freight trailers while at the warehouse location.

An exemplary process for discontinuing engagement between the yard truck and the freight trailer includes initially raising a hydraulic fifth wheel on the yard truck to raise the front end of the trailer above its normal ride height. While the front end is raised, the yard truck driver lowers landing gear of the freight trailer, which comprises a pair of equal length jacks permanently mounted to the trailer, so that lowering of the fifth wheel is operative to set down the freight trailer on its landing gear. When the freight trailer is set down on its landing gear, the freight trailer is freestanding (i.e., without a mechanical connection between the king pin of the freight trailer and the fifth wheel of the yard truck). After the freight trailer is freestanding, associated pneumatic and electrical connections between the yard truck and trailer are disconnected so that the brakes of the freight trailer are locked. Thereafter, the yard truck pulls out from under the freight trailer, thereby leaving the trailer adjacent to the dock opening and being supported at the front end using only the trailer's landing gear.

When loading and unloading cargo from a freestanding freight trailer, the movement of the lift truck along the floor of the freight trailer causes the freight trailer to move as well. While some movement of the freight trailer is inevitable, considerable movement can result in the trailer becoming separated from the dock or possibly tipping over. More importantly, the landing gear of the freight trailer is not designed to accommodate the weight of a fully loaded trailer, let alone the dynamic forces generated by a lift truck moving through a partially loaded freight trailer. Even further, the high center of gravity associated with most trailers makes the likelihood of tipping over a real possibility. The obvious implications of a freight trailer tipping over include damage to the goods within the trailer, the trailer itself, and the lift truck, not to mention the possible serious injury to or death of the lift truck operator.

There is a need in the industry for a reliable support that maintains the relative position of the freight trailer with respect to the dock and inhibits the trailer from tipping over, possibly causing serious bodily injury or death, which does not rely solely on the landing gear of the freight trailer.

INTRODUCTION TO THE INVENTION

The present disclosure is directed to supports associated with a loading/unloading dock and, more specifically, to repositionable supports that secure freight trailers in position at a loading dock while dock personnel load and/or unload cargo from the trailers. The present disclosure includes a repositionable structure having a fifth wheel to capture the king pin of a freight trailer, thereby securing the repositionable structure to the trailer. The repositionable support may also include one or more of an electrical, a hydraulic, and a pneumatic interface for coupling directly to the yard truck or other truck using conventional connections, such as glad hands and electrical disconnects. Unlike conventional stabilizing products, the exemplary embodiments of the instant disclosure may provide support for the front end of a parked freight trailer without the need for deployment of the landing gear (i.e., the landing gear touching the ground). After the repositionable structure has been mounted to the trailer by way of the king pin and fifth wheel interface, wheel chocks may be deployed and brakes associated with the repositionable device may be locked to inhibit horizontal movement of the trailer away from the loading dock. In exemplary form, the repositionable structure may include a winch that is adapted to engage a pavement cleat, thereby forming a compression fit between the king pin and fifth wheel of the repositionable support using the tension from the winch cable. The repositionable support may also include a communicator operative to relay a communication to an internal display within the warehouse that indicates whether the repositionable support is properly mounted to the freight trailer.

An exemplary repositionable structure includes a frame and an axle mounted to the frame. By way of example, the axle includes a pair of tandem wheels, with brakes, mounted proximate opposite ends of the axle. However, the wheels may be single wheels and not include brakes. A vertically repositionable fifth wheel is also mounted to the frame and is adapted to receive the king pin of a freight trailer. A pair of repositionable wheel chocks may also be mounted to the frame. Also on board the frame may be a freight trailer positioning communicator adapted to signal a warehouse display indicating whether the trailer has been secured while at the loading dock. Pneumatic, hydraulic, and electrical lines may also be associated with the frame that are in communication with any wheel brakes, the repositionable fifth wheel, and any positioning communicator. The foregoing lines may be powered directly from the yard truck, or the frame may include individual power sources for one or more of the foregoing lines.

After the yard truck has positioned the repositionable support into engagement with the king pin of the freight trailer, the brakes (if included) are applied and the winch (if included) is deployed to lock the support in position below a frontal portion of the trailer. Thereafter, the support remains under the frontal portion of the trailer as the trailer is loaded or unloaded. Similarly, after the support is secured in position beneath the frontal portion of the freight trailer, the yard truck disconnects from the repositionable structure and continues jockeying the remaining freight trailers at the warehouse location.

BRIEF DESCRIPTION OF THE DRAWINGS

FIG. 39 is a frontal view from a stabilizer housing for transmitters and receivers in accordance with the instant disclosure.

FIG. 40 is a frontal view from a dock cabinet for transmitters, receivers, and displays in accordance with the instant disclosure.

FIG. 41 is a frontal view from an interior warehouse cabinet in accordance with the instant disclosure.

DETAILED DESCRIPTION

Figure 1:
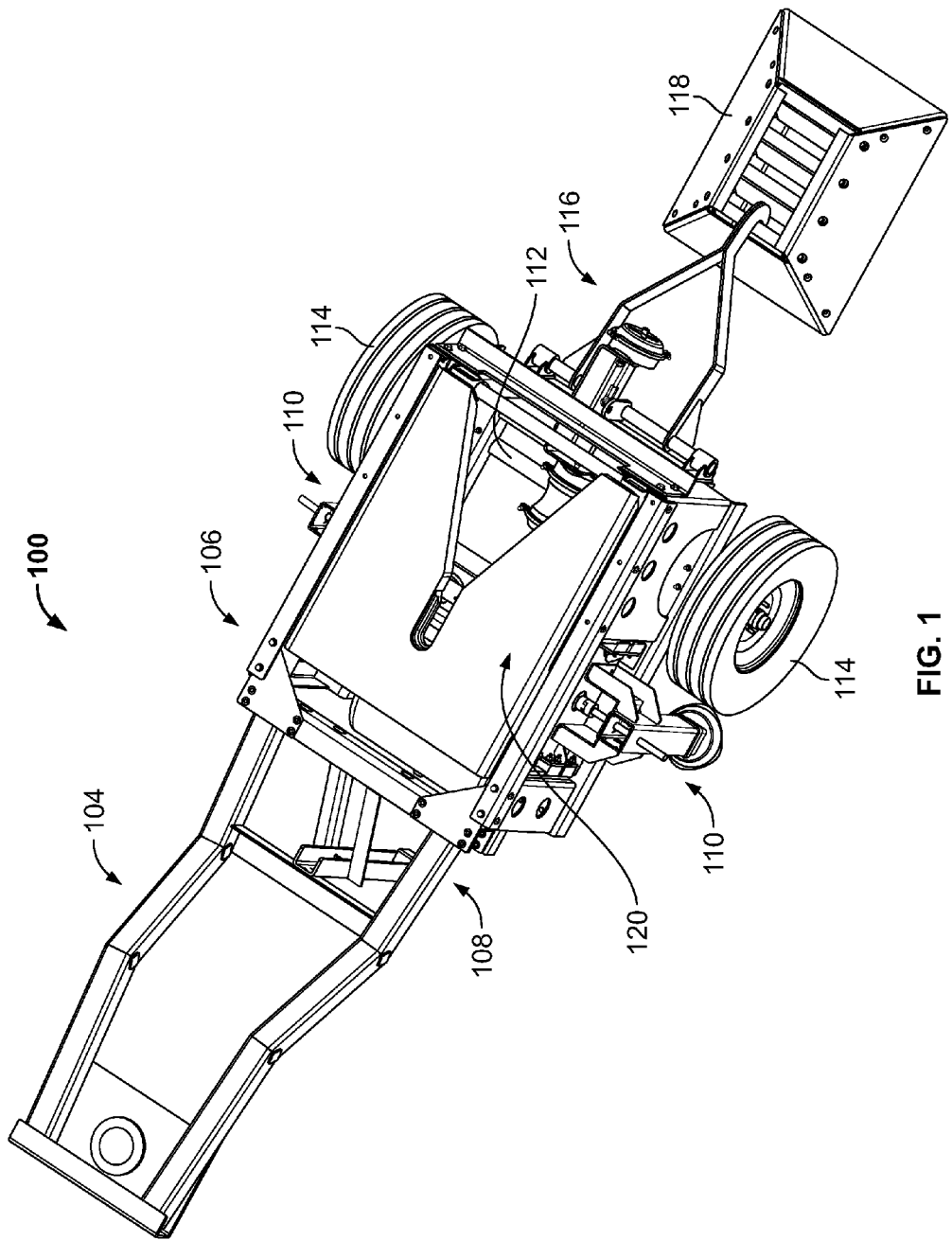
FIG. 1 is an elevated perspective view of an exemplary trailer stabilizer in accordance with the instant disclosure.
Figure 2:
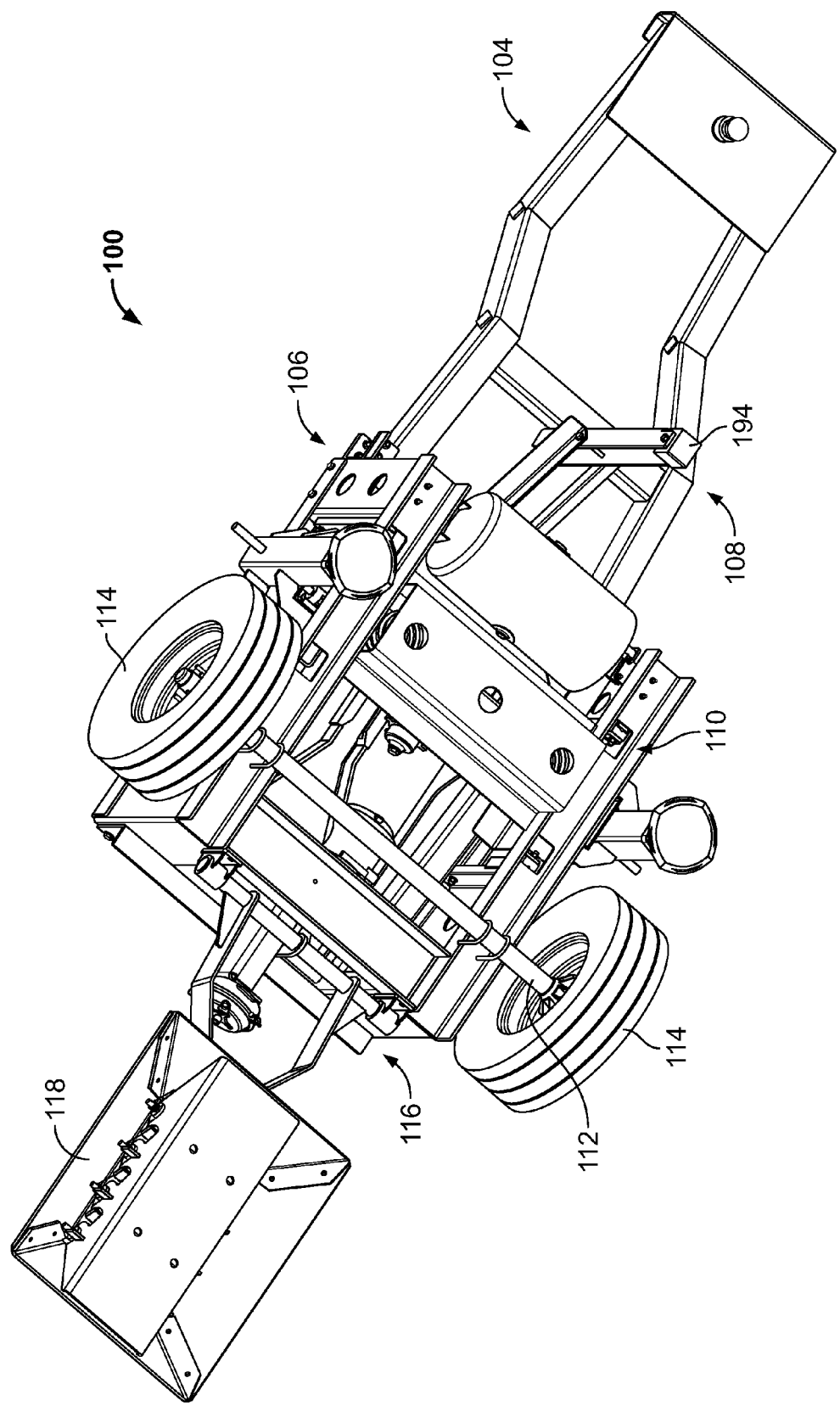
FIG. 2 is a bottom perspective view of the exemplary trailer stabilizer of FIG. 1.
Figure 3:
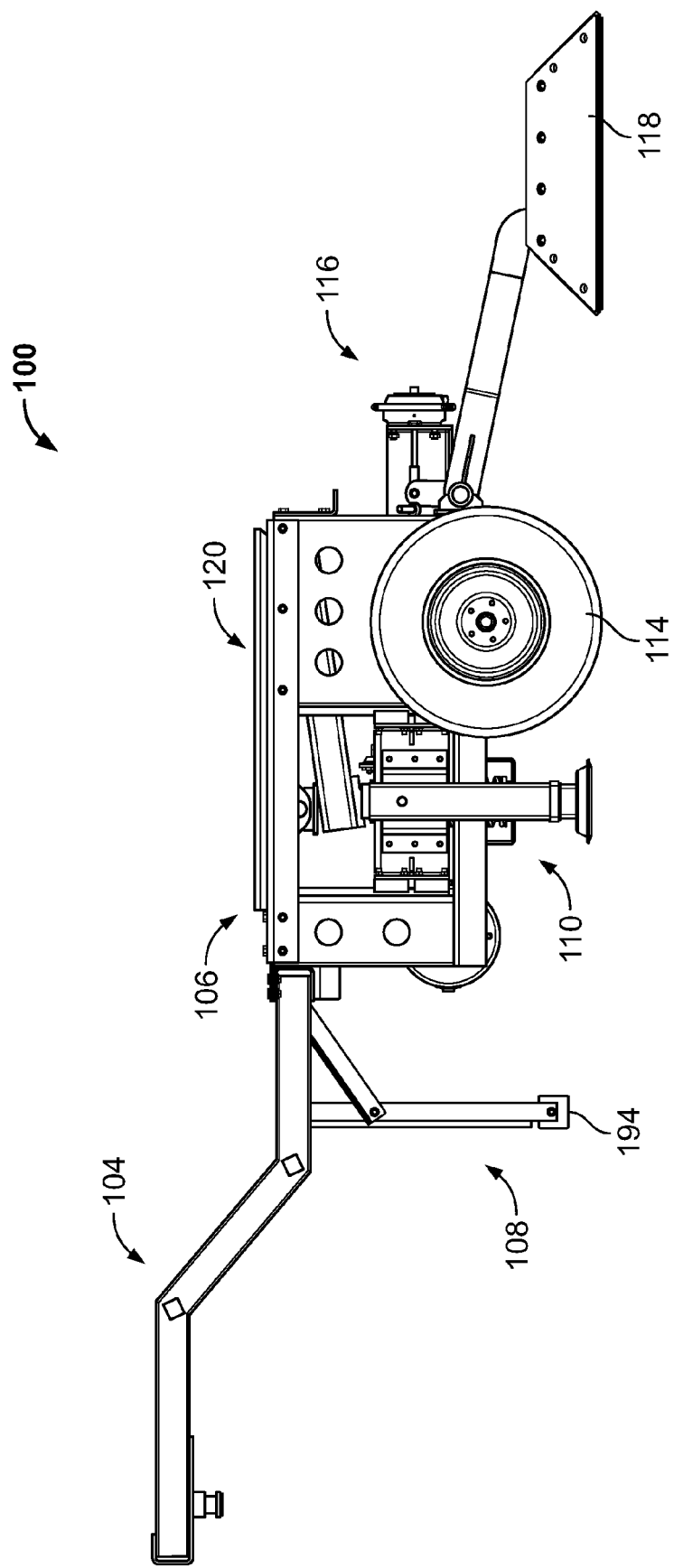
FIG. 3 is a left side profile view of the exemplary trailer stabilizer of FIG. 1.
Figure 4:
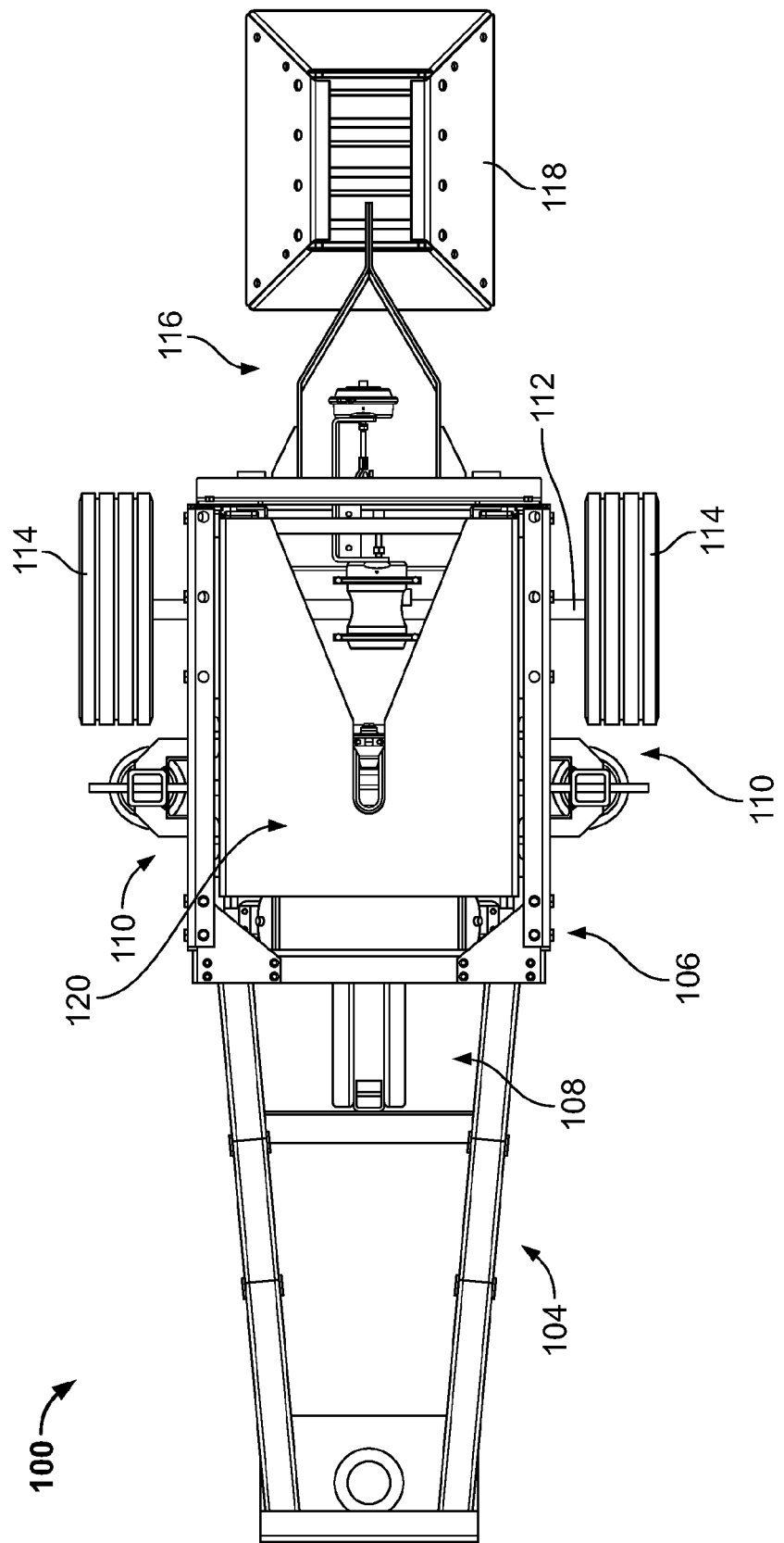
FIG. 4 is a top view of the exemplary trailer stabilizer of FIG. 1.
Figure 5:
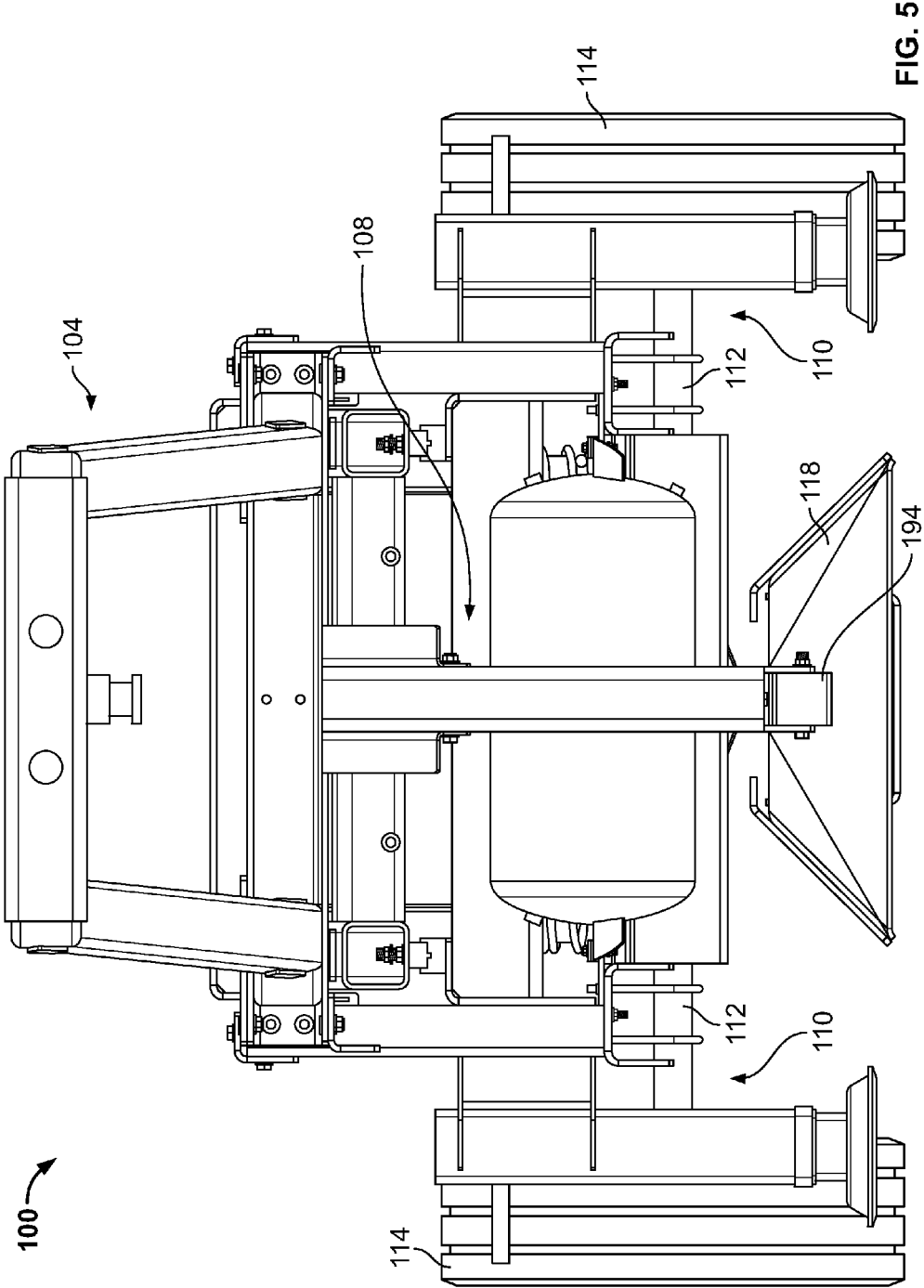
FIG. 5 is a front view of the exemplary trailer stabilizer of FIG. 1.
Figure 6:
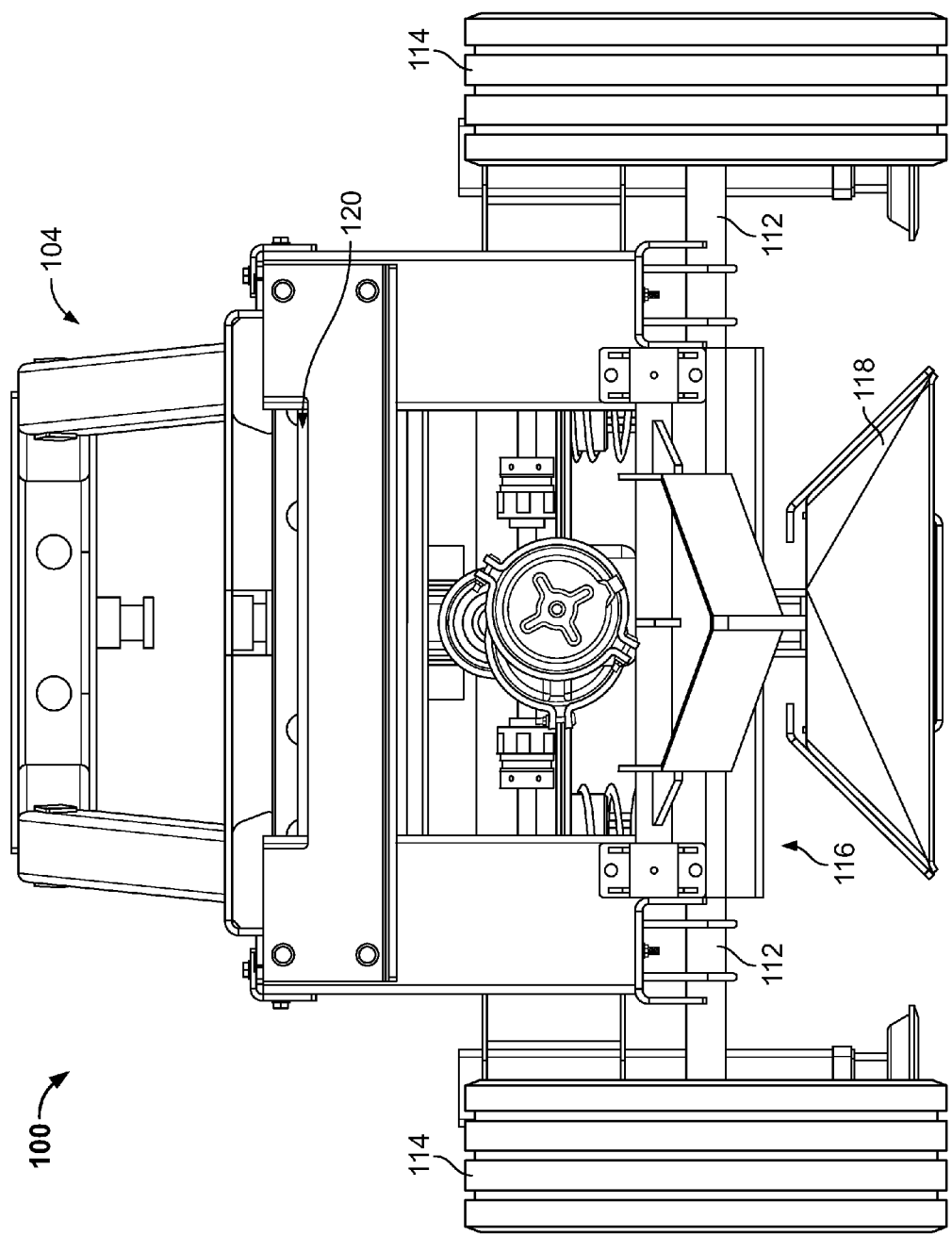
FIG. 6 is a rear view of the exemplary trailer stabilizer of FIG. 1.
Figure 7:
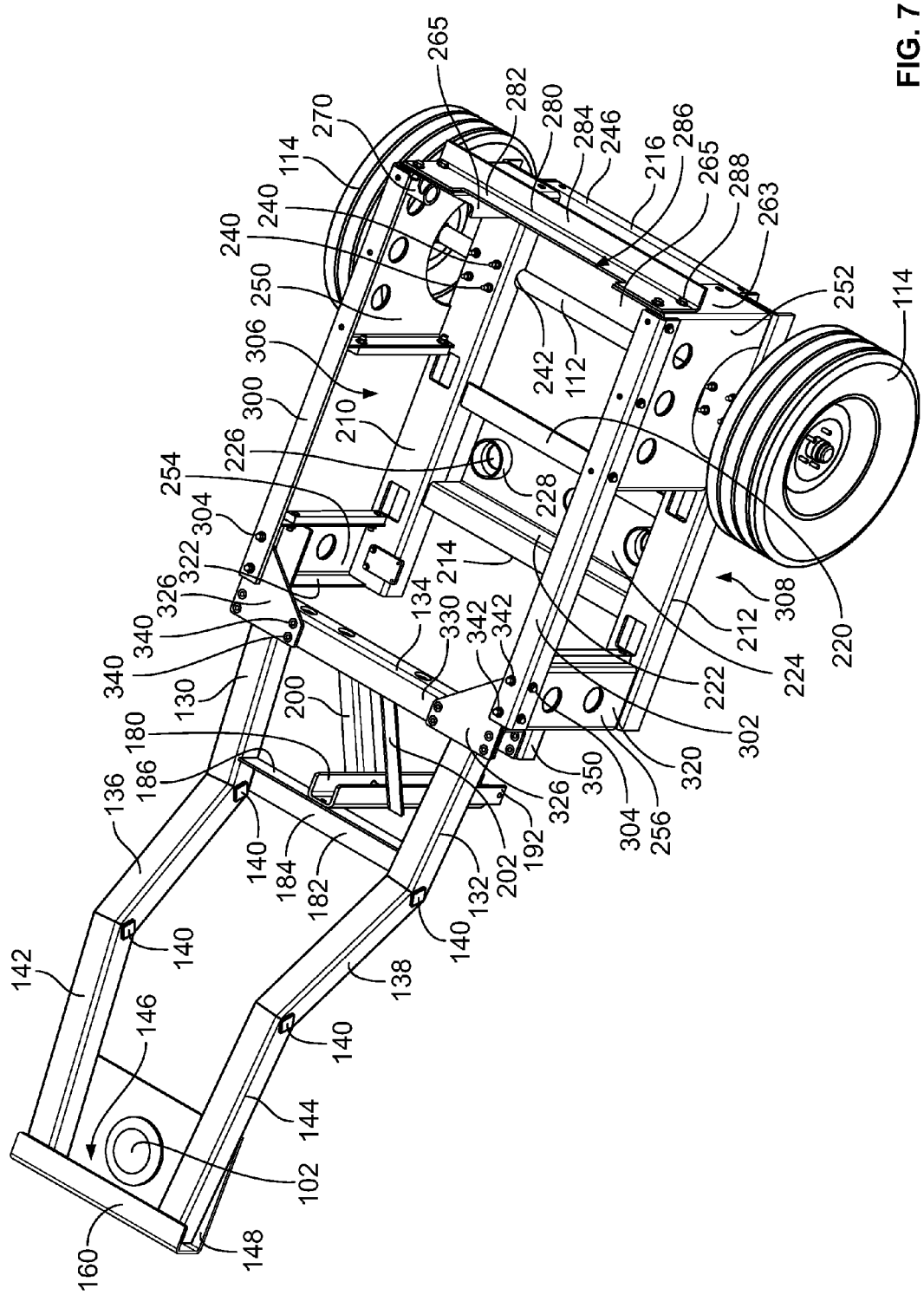
FIG. 7 is an elevated perspective view, from the left rear, of an exemplary gooseneck frame and cart frame in accordance with the instant disclosure.
Figure 8:
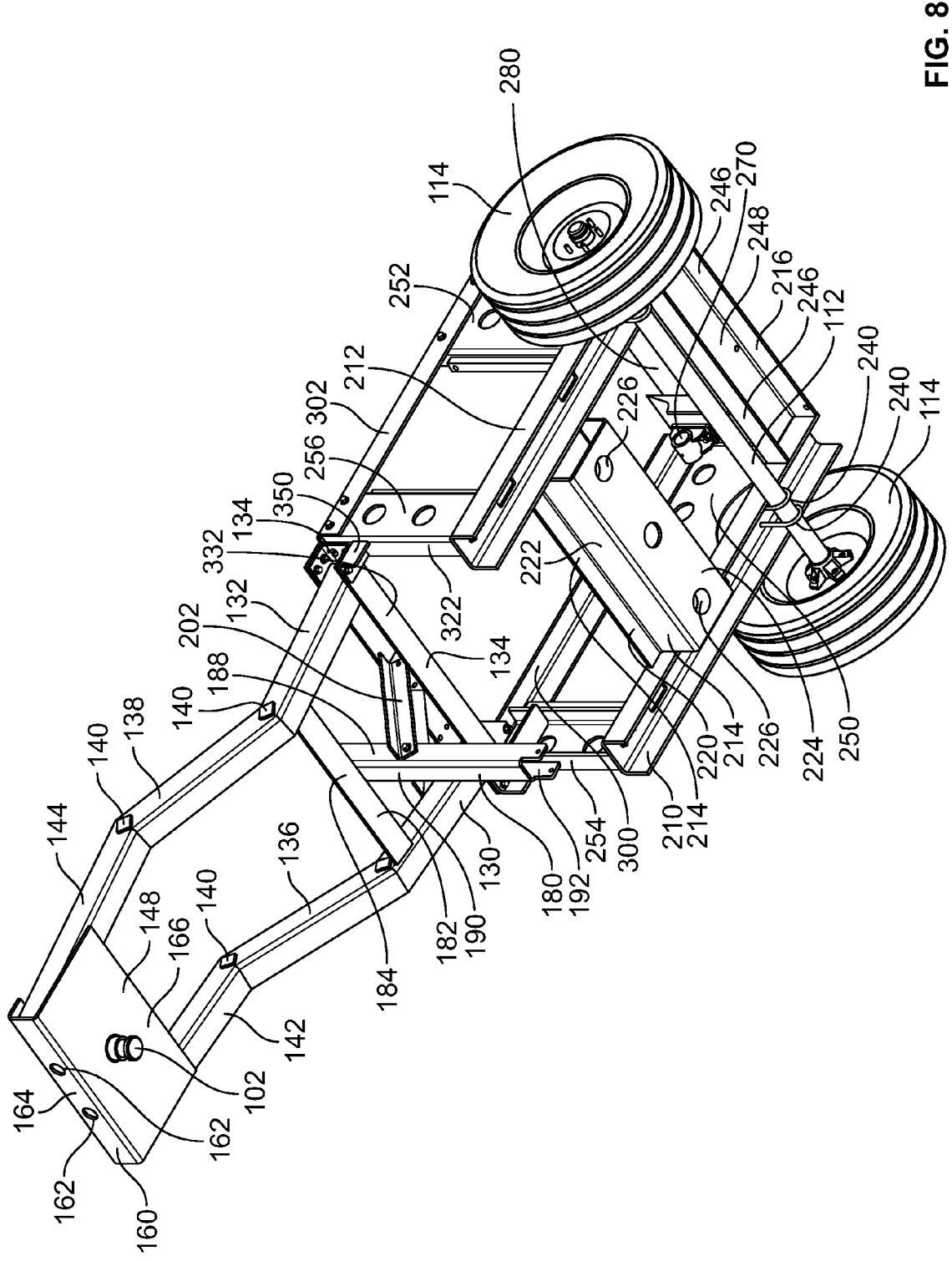
FIG. 8 is a bottom perspective view of the exemplary gooseneck frame and cart frame of FIG. 7.
Figure 9:
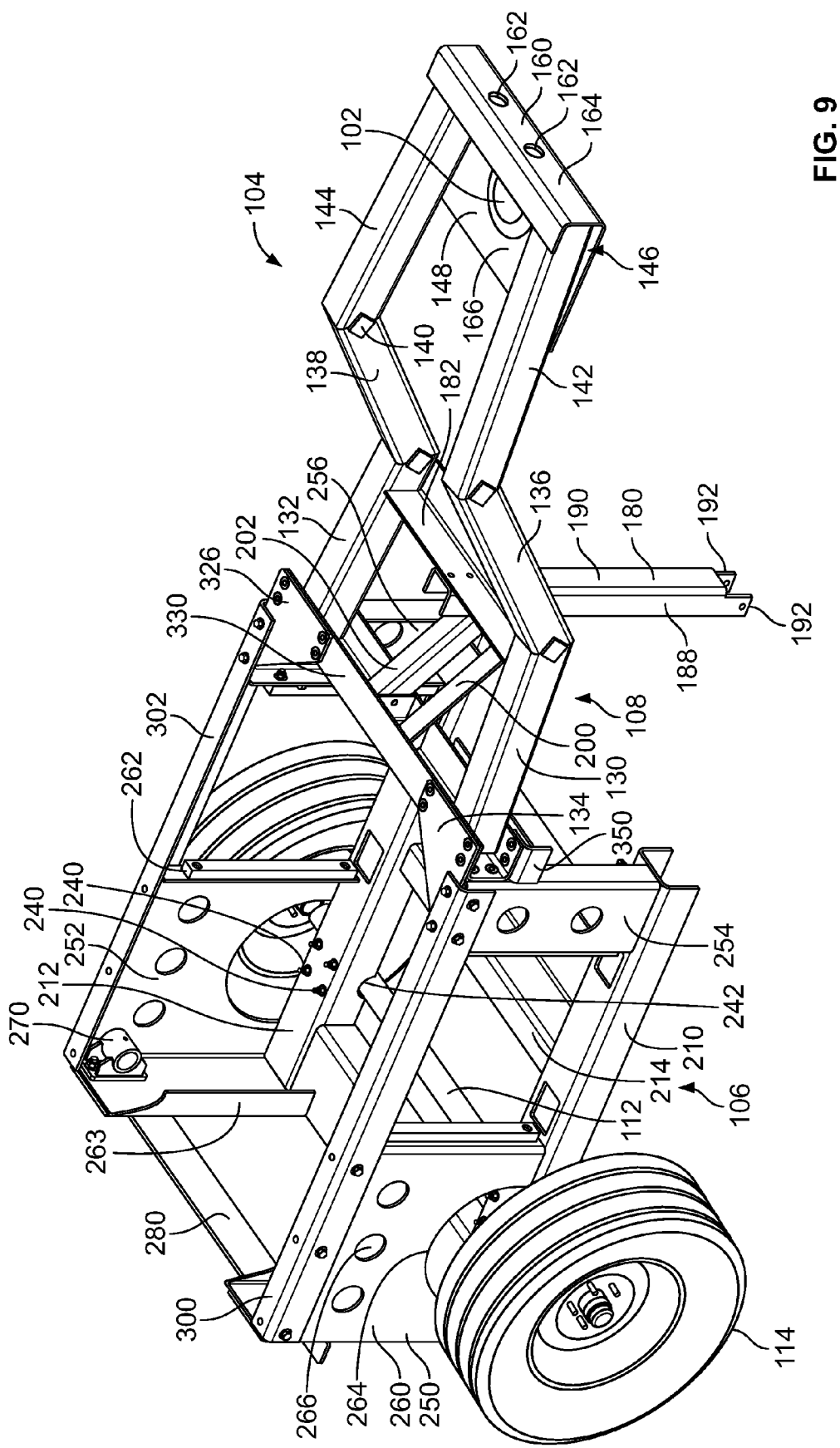
FIG. 9 is an elevated perspective view, from the front right, of the exemplary gooseneck frame and cart frame of FIG. 7.
Figure 10:
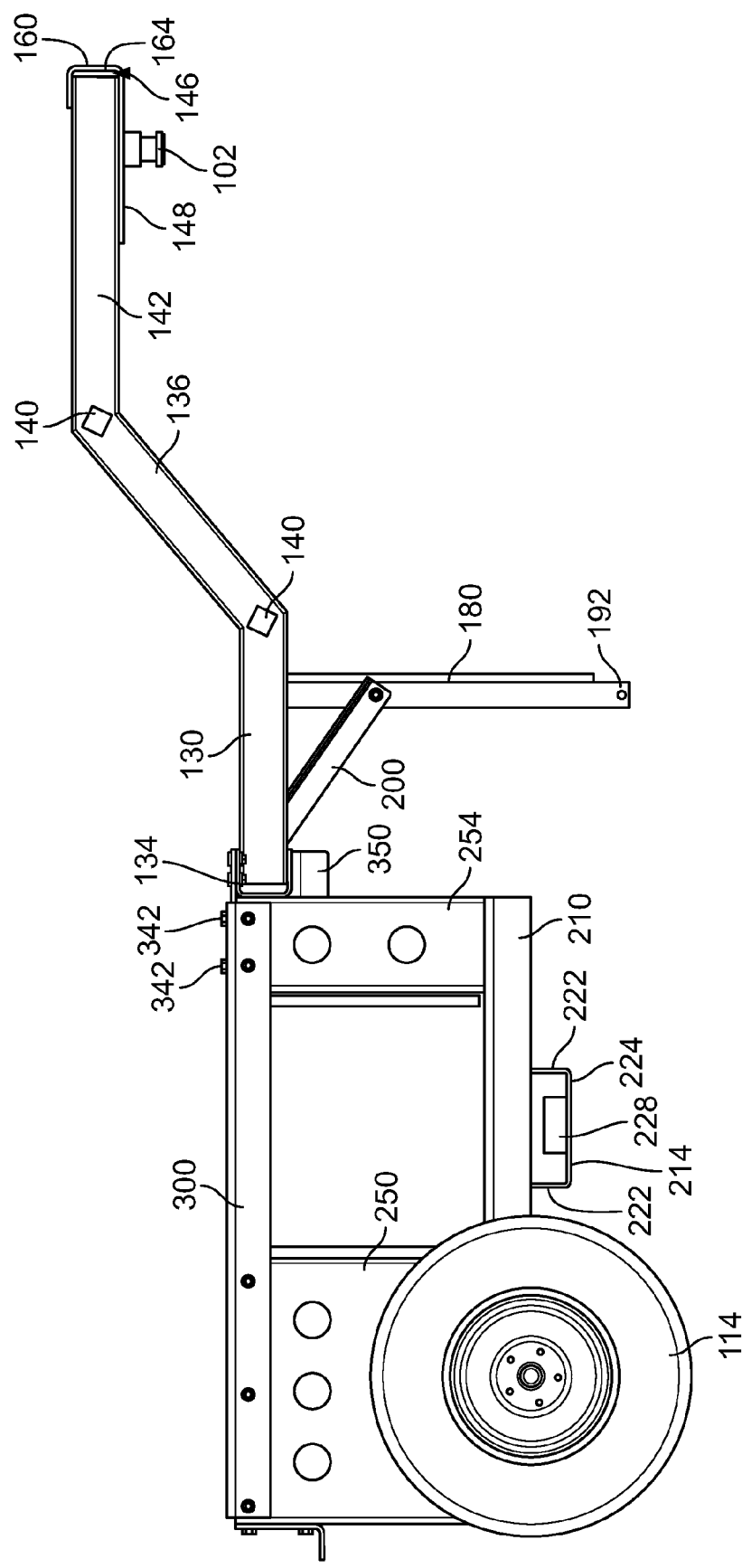
FIG. 10 is a right side profile view of the exemplary gooseneck frame and cart frame of FIG. 7.
Figure 11:
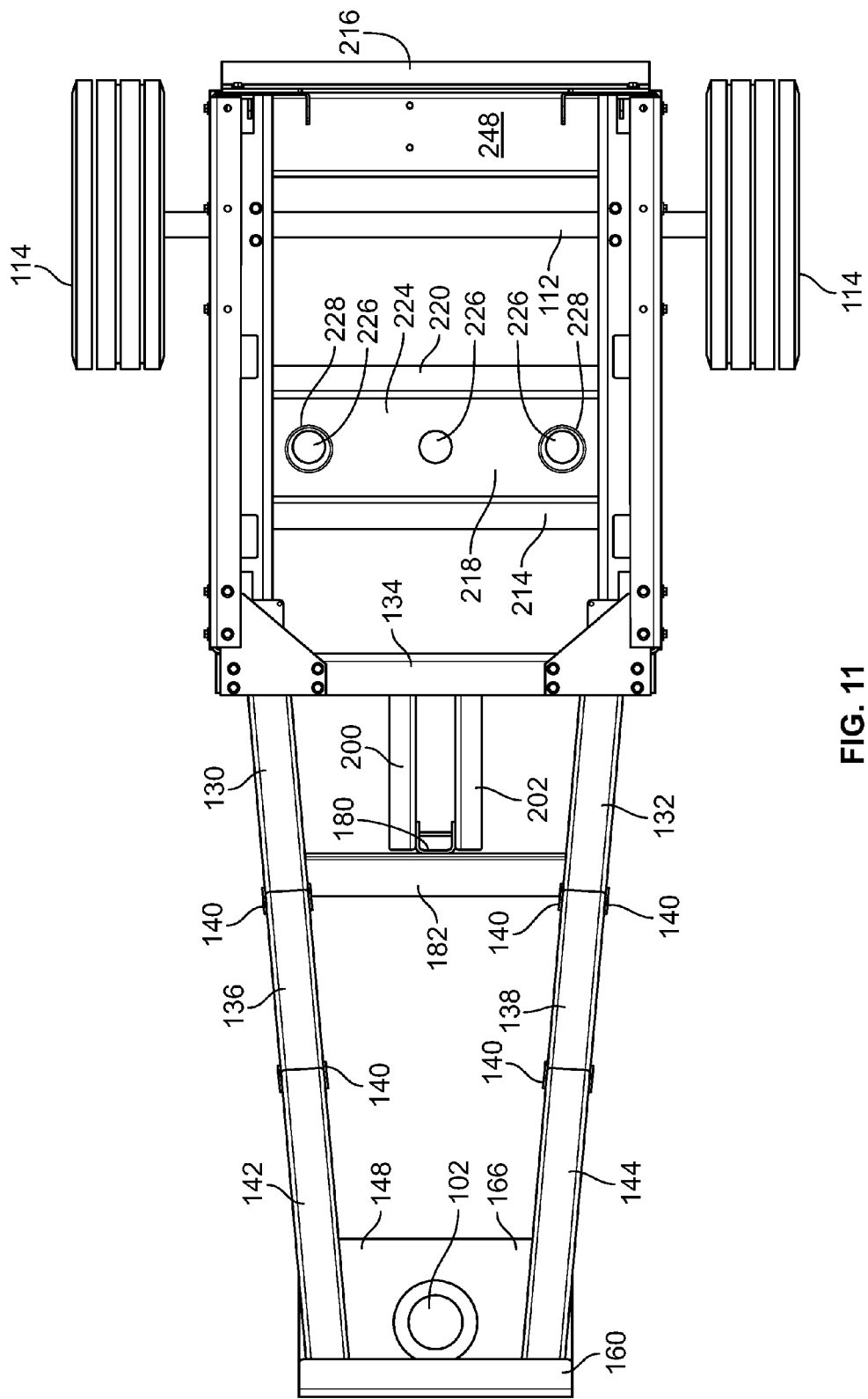
FIG. 11 is an overhead view of the exemplary gooseneck frame and cart frame of FIG. 7.
Figure 12:
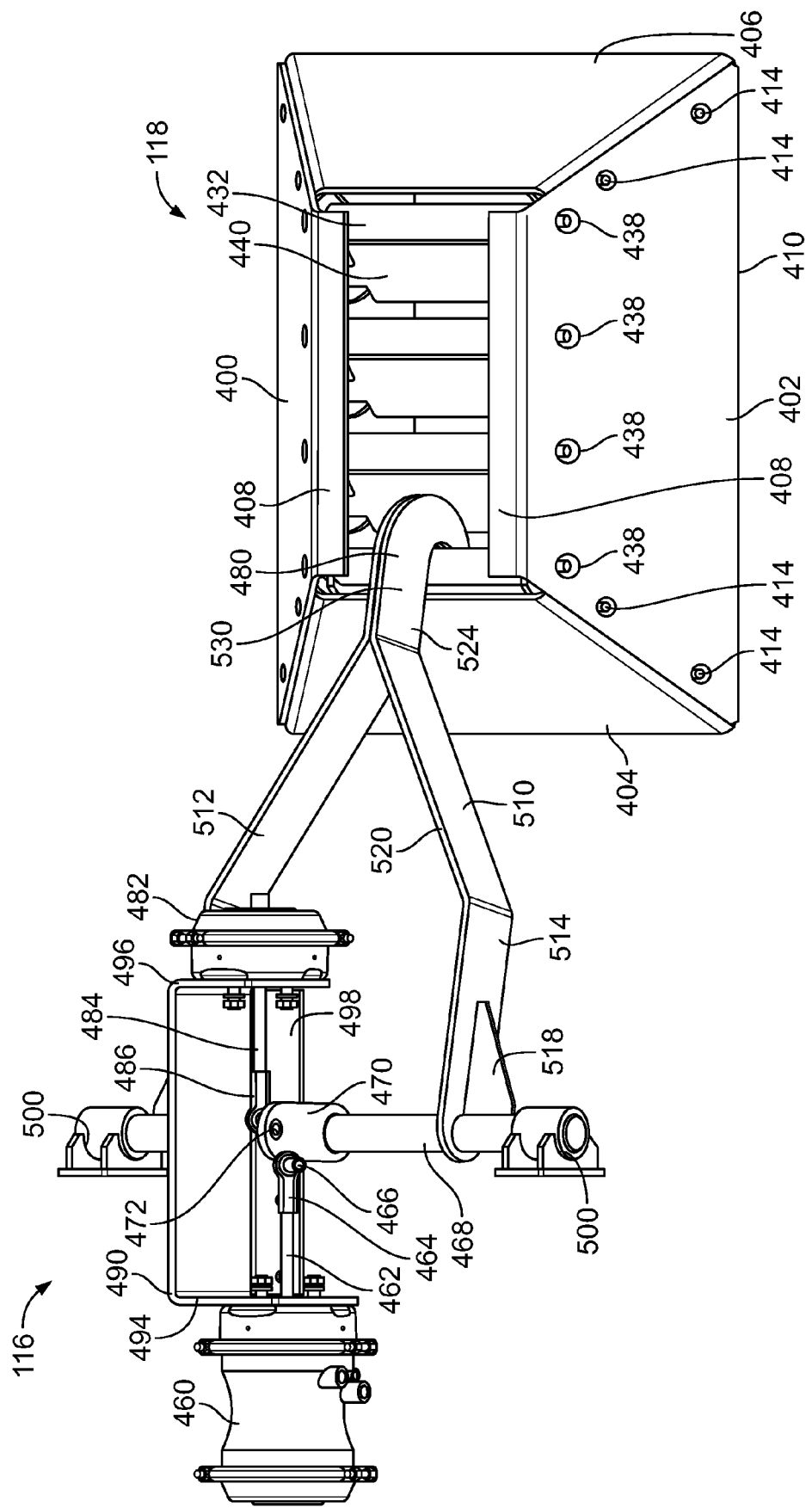
FIG. 12 is an elevated perspective view, from the left side, of the exemplary repositionable hook assembly and lock box in accordance with the instant disclosure.

The exemplary embodiments of the present disclosure are described and illustrated below to encompass apparatuses and associated methods to secure a freight trailer in position at a loading dock while the trailer is loaded or unloaded. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps and features that one of ordinary skill should recognize as not being a requisite to fall within the scope and spirit of the present disclosure.

Referencing FIGS. 1-6, a first exemplary freight trailer stabilizer 100 includes an elevated king pin 102 operatively coupled to a gooseneck frame 104. This gooseneck frame 104 is concurrently operatively coupled to cart frame 106 and a stiff leg assembly 108. Operatively coupled to the cart frame 106 are repositionable jack assembly 110, an axle 112 and wheels 114, as well as a repositionable hook assembly 116. As will be discussed in more detail hereafter, the repositionable hook assembly 116 is adapted to interact with a lock box 118 in order to secure the stabilizer 100 to the ground. In addition, the trailer stabilizer 100 includes a fifth wheel assembly 120 that is adapted to engage a king pin of a parked freight trailer to mount the stabilizer 100 to the trailer. Once mounted to the trailer, the hook assembly 116 may be utilized, as well as the repositionable jack assembly 110, to provide support for the parked trailer.

Referring to FIGS. 7-11, the gooseneck frame 104 comprises lower right and left tubular supports 130, 132 fabricated from rectangular tubular steel. The supports 130, 132 are welded at one end to a block C-shaped mount plate 134 that is mounted to the cart frame 106 using nut and bolt fasteners. At the opposing end, the supports 130, 132 are beveled at approximately forty-five degrees and welded to corresponding right and left side diagonal tubular supports 136, 138. In order to reinforce the welded joints between the supports 130, 132, 136, 138, cap plates 140 are mounted over and on the outside of the diagonal weld seams. Similar to the other supports, the diagonal supports 136, 138 are fabricated from rectangular tubular steel and include generally flat end surfaces (as opposed to being beveled). The diagonal supports operate to, raise the height of the frame 104 and are coupled to corresponding right and left upper tubes 142, 144. In particular, one end of the upper tubes 142, 144 has been beveled at approximately forty-five degrees and welded to corresponding ends of the right and left side diagonal tubular supports 136, 138. As with the prior weld joints, cap plates 140 are mounted over and on the outside of the diagonal weld seams to reinforce the coupling between the supports 136, 138 and the upper tubes 142, 144. An opposite end of each tube is generally flat (as opposed to being beveled) and is seated within a cavity 146 of the king pin plate 148.

The king pin plate 148 is fabricated from a rectangular plate having been formed to have a block C-shaped end 160. Two holes 162, which are generally centered as a group, extend through the front of the block C-shaped end 160. Though not shown, these holes may accommodate one or more fluid lines (e.g., pneumatic, hydraulic, etc.) for coupling to jacks and motors associated with the stabilizer 100. It is this C-shaped end 160, which faces toward the cart frame 106, that delineates the cavity 146 receiving the corresponding ends of the upper tubes 142, 144. Each end of the upper tubes 142, 144 received within the cavity 146 may be machined so that the angle of the tubes (which taper inward) does not inhibit the entire end surface from contacting a vertical portion 164 of the block C-shaped end 160. The block C-shaped end 148 cooperates with a generally rectangular portion 166 to comprise the king pin plate 148. This rectangular portion 166 is positioned underneath and extends between the right and left upper tubes 142, 144. Each of the right and left upper tubes 142, 144 is welded to the rectangular portion 166 in order to secure the king pin plate 148 to the tubes. Centered from side to side, the rectangular portion 166 includes a hole that receives the king pin 102. In exemplary form, the king pin 102 is welded to the rectangular portion 166. The king pin 102 extends through the rectangular portion 166 and faces toward the ground in order for the king pin to be available for coupling to a fifth wheel of a tractor (not shown).

While not coupled to a tractor, the stabilizer 100 may be parked in a storage position. When parked in a storage position, the cart frame 106 of the stabilizer 100 does not bottom out to contact the ground. Rather, the stiff leg assembly 108 is operative to maintain the gooseneck frame 104 and king pin 102 at a height readily accessible by a tractor.

In exemplary form, the stiff leg assembly 108 is a fixed position device that includes a stiff leg 180 operatively coupled to the gooseneck frame 104. Specifically, the stiff leg 180 is mounted at one end to a stiff leg brace 182 that is mounted to and extends between the lower right and left tubular supports 130, 132. In this exemplary embodiment, the stiff leg brace 182 is fabricated from angle iron and has a first horizontal aspect 184 and an upstanding vertical aspect 186. The vertical aspect 186 includes at least one hole that is aligned with at least one corresponding hole extending through the stiff leg 180 so that nut a bolt fasteners mount the stiff leg to the stiff leg brace. In exemplary form, the stiff leg 180 is fabricated from block C-shaped metal stock and includes two upstanding, parallel flanges 188 that extend away from a base 190. The stiff leg 180 is positioned to extend vertically so that the flanges 188 extend toward the cart frame 106. In this manner, it is the base 190 that is adjacent and mounted to the upstanding vertical aspect 186 of the stiff leg brace 182, while the opposite end (i.e., lower end) is adapted to be proximate the ground.

The opposite, lower end of the stiff leg 180 is machined to remove a portion of the base 190. In so doing, the lower end of the stiff leg 180 includes medial and lateral rectangular flaps 192. These rectangular flaps 192 are really extensions of the two upstanding flanges 188 that remain at the lower end once a portion of the base 190 is removed. Each flap 192 includes a through hole in order to accommodate a nut and bolt fastener to secure a rubber block 194 to the stiff leg 180. In exemplary form, the rubber block 194 includes a widthwise dimension to fit between the flaps 192 and a vertical, lengthwise dimension great enough to extend outward beyond the flaps when the block is mounted to the stiff leg 180. It should be noted that materials other than rubber may be used for the block. Likewise, one may omit the block altogether and have the stiff leg itself contact the ground.

Diagonal braces 200, 202 are concurrently mounted to the stiff leg 180 and the block C-shaped mount plate 134 in order to provide additional stability to the stiff leg. In exemplary form, the diagonal braces 200, 202 each comprise angle iron and are mounted to corresponding parallel flanges 188. More specifically, one end of each diagonal brace 200, 202 is mounted to the outside of a corresponding flange 188, while the opposite end of each diagonal brace 200, 202 is mounted to a bracket 204 inset within the block C-shaped mount plate 134. In this exemplary embodiment, the flanges 188, diagonal braces 200, 202, and the brackets 204 include corresponding through holes that are aligned and receive bolts secured in place by nuts. In lieu of nut and bolt fasteners, the diagonal braces 200, 202 may be welded to the flanges 188 and the block C-shaped mount plate 134. It should be noted that the block C-shaped plate includes a plurality of through orifices 204 that may accommodate one or more fluid lines (e.g., pneumatic, hydraulic, etc.) for coupling to jacks and motors associated with the stabilizer 100.

The block C-shaped plate 134 signifies the transition between the gooseneck frame 104 and the cart frame 106. As will be described in more detail hereafter, the cart frame 106 has mounted to it the repositionable jack assemblies 110, the axle 112, and the repositionable hook assembly 116. In order to accommodate these assemblies 110, 116 and axle 112, the cart frame 106 includes right and left frame rails 210, 212 that are mounted to forward and rear cross-members 214, 216. The frame rails 210, 212 are straight, block C-shaped and extend in parallel to one another so that the side flanges are directed toward the ground and the base faces upward. Specifically, the side flanges are oriented perpendicular to the base of the frame rails 210, 212. These side flanges (on the inside that face one another) are welded to the front cross-member 214 in order to provide lateral support to the cart frame 106.

In this exemplary embodiment, the front cross-member includes a longitudinal pan 218 with integral front and rear flanges 220. It is the top of the longitudinal pan and the front and rear flanges 220 that are welded to the inside flanges of the frame rails 210, 212. The longitudinal pan 218 includes opposed vertical longitudinal walls 222 interposed by a bottom wall 224. The bottom wall 224 includes a plurality of orifices 226, where two of the orifices are surrounded by an upstanding ring 228 mounted to the bottom wall. As will be discussed in greater detail hereafter, the upstanding ring 228 is sized to be circumscribed by a coil spring that biases the fifth wheel assembly 120. In this manner, the upstanding ring 228 inhibits lateral movement at the base of the spring. In exemplary form, the vertical longitudinal walls 222 are perpendicular to the bottom wall 224 and the entire bottom wall, as well as a portion of the longitudinal walls, is positioned vertically below the height of the frame rails 210, 212.

Also positioned vertically below the height of the frame rails 210, 212 are the axle 112 and the wheels 114. In this exemplary embodiment, the axle 112 is mounted to the frame rails 210, 212 using corresponding pairs of U-bolts and nuts 240. More specifically, the U-bolts 240 extend around the axle and are received through corresponding holes in the base of the frame rails 210, 212 and mounted thereto using the nuts. In order to increase the forward-to-rearward stability of the axle 112, each frame rail 210, 212 includes a semi-circular cutout 242 formed at the bottom of each flange. These semi-circular cut-outs 242 are linearly aligned in the medial-lateral direction and operate to seat the axle 112 within the frame rails 210, 212. As would be expected, the axle 112 is generally centered in the medial-lateral direction underneath the cart frame 106. And the axle 112 interposes the forward and rear cross-members 214, 216.

In this exemplary embodiment, the rear cross-member 216 comprises a block C-shaped plate. The cross-member 216 includes a pair of vertical walls 246 perpendicular to a base wall 248, where the vertical walls are parallel to one another. In exemplary form, the vertical walls 246 are closer to the ground than is the base wall 248, where the height of the vertical walls 246 is substantially the same as the flanges for the frame rails 210, 212. Specifically, the rear cross-member 216 is positioned in between the frame rails 210, 212 at the rear of each of each frame rail to be substantially flush with the rear of the frame rails. More specifically, the exposed ends of the flanges of the frame rails 210, 212 lie along the same plane as the exposed ends of the vertical walls 246. When the frame rails 210, 212 are welded to the rear cross-member 216, the flanges of the frame rails cap the longitudinal ends of the cross-member 216.

In order to complete the cart frame 106, a number of vertical walls and elevated walls are mounted to the frame rails 210, 212. In exemplary form, the cart frame 106 also includes right and left rear frame walls 250, 252 and right and left front frame walls 254, 256. The right and left rear frame walls 250, 252 comprise a rectangular plate 260 having a perpendicular vertical flange 262 at one end and an associated rectangular wall 263 with its own perpendicular flange 265 at the opposite end. The plate 260, flanges 262, 265, and wall 263 all have the same vertical dimension and vertical ends that lie along the same corresponding planes (top and bottom). The plate 260 embodies the greatest width of the frame walls and includes a semicircular cut-out 264 and various through holes 266. These cutouts 264 and holes 266 may be included to provide openings for various electrical wirings and/or fluid conduits. At the same time, these cutouts 264 and holes 266 may reduce the operating weight of the stabilizer 100 without sacrificing load bearing potential.

The right and left rear frame walls 250, 252 are mounted to the top of the base of the frame rails 210, 212 and the base wall 248 of the rear cross-member 216. Specifically, the frame walls 250, 252 are oriented so that the right angle corner formed by the intersection of the plate 260 and the wall 263 overlies a rear corner of a corresponding frame rail. In this manner, the plate 260 extends toward the front of the cart frame 106 so that its edge sits upon the outer edge of the base of a respective frame rail 210, 212. Concurrent with this positioning, the wall 263 is positioned to overlay the rear edge of the cart frame 106. This rear edge is cooperatively formed by the rear edge of the base of a corresponding frame rail 210, 212 in combination with outside edge of the base wall 248 of the rear cross-member 216. When in this position, the right and left rear frame walls 250, 252 are welded to the frame rails 210, 212 and rear cross-member 216. On the interior of each right and left rear frame walls 250, 252, proximate the top upper corner where the plate 260 and wall 263 intersect, are tubular brackets 270. As will be discussed in more detail hereafter, the tubular brackets 270 receive a hitch plate pivot shaft as part of the fifth wheel assembly 120.

At the rear of the cart frame 106, a rear brace 280 extends between and is mounted to the wall 263 of both frame walls 250, 252. The rear brace 280 comprises a vertical wall 282 that is perpendicularly oriented with respect to a horizontal extension 284 that extends from the vertical wall. The vertical wall 282 has a cut-out 286 in order to ensure the brace 280 does not contact a king pin from a parked trailer. In this exemplary embodiment, nut and bolt fasteners 288 are utilized to mount the rear brace 280 to the frame walls 250, 252. It should also be noted that, as with the foregoing use of nut and bolt fasteners, the exemplary embodiment may utilize other means of fastening such as, without limitation, welding.

Extending from the rear to the front of the cart frame 106, are a pair of frame links 300, 302 that are positioned above and run in parallel with the frame rails 210, 212. The right link 300 is concurrently mounted to the right rear frame wall 250 and right front frame wall 254. Similarly, the left link 302 is concurrently mounted to the left rear frame wall 252 and left front frame wall 256. Each link 300, 302 comprises angle iron that is mounted to a respective side's frame walls using nut and bolt fasteners 304. In exemplary form, the right link 300 cooperates with the right frame rail 210 and the right front and rear frame walls 250, 254 to delineate a generally rectangular right side opening 306. Likewise, the left link 302 cooperates with the left frame rail 212 and the left front and rear frame walls 252, 256 to delineate a generally rectangular left side opening 308. As will be discussed in more detail below, these openings 306, 308 are utilized to link components of the repositionable jack assemblies 110.

The right and left front frame walls 254, 256 are mounted to the base of respective frame rails 210, 212. More specifically, each frame wall 254, 256 comprises a block C-shape with a base wall 320 and two corresponding side walls 322 that expend parallel to one another. In this exemplary embodiment, the side walls 322 are perpendicular to the base wall 320 and are substantially shorter in width that the base wall. In order to mount the right and left front frame walls 254, 256 are mounted to the base of respective frame rails 210, 212, the frame walls are oriented so that the base wall 320 is aligned with the outside edge of the frame walls. At the same time, the side walls 322 are positioned to sit on top of the base wall of the frame rails 210, 212. More specifically, the forward most corner (where the side wall 322 and the base wall 320 intersect) of each frame wall 254, 256 is oriented to overly the outermost corner of a respective frame rail 210, 212. In this orientation, the bottom edge of the side wall 322 sits upon the front top edge of a respective frame rail 210, 212, while the base wall 320 sits upon the outer top edge of the same frame rail, and the frame walls 254, 256 are welded to the frame rails 210, 212.

In order to couple the remainder of the cart frame 106 to the gooseneck frame 104, the cart frame also includes gussets 326 concurrently mounted to respective right and left front frame walls 254, 256 and the block C-shaped mount plate 134. Specifically, the block C-shaped mount plate 134 includes two, spaced apart horizontal walls 330, 332 linked together by a vertical wall 334. In exemplary form, the vertical wall is positioned adjacent to the forward most side wall 322 of each right and left front frame wall 254, 256 so that the ends of the block C-shaped mount plate 134 do not extend laterally beyond the base walls 320. Likewise, the block C-shaped mount plate 134 is positioned so that the top edge of the right and left front frame walls 254, 256 is at the same vertical height as the upper horizontal wall 330. When in this position, respective gussets 326 lie flush on top of the respective right and left front frame walls 254, 256 and the upper horizontal surface 330 of the block C-shaped mount plate 134. In particular, the gussets 326 interpose the links 300, 302 and the right and left front frame walls 254, 256. The gussets 326 are then mounted to the block C-shaped mount plate 134 using a first set of fasteners 340 and also mounted to the links 300, 302 using a second set of fasteners 342. Complementary brackets 350 are also mounted to the forward most side wall 322 of each right and left front frame wall 254, 256 to wedge the block C-shaped mount plate 134 in between the gussets 326 and the brackets. By way of example, the brackets may be welded to the forward most side wall 322 of each right and left front frame wall 254, 256 or coupled thereto using any conventional fastener or fastener technique. Likewise, the brackets 350 are mounted to the block C-shaped mount plate 134 and may be mounted thereto by welding or using any conventional fastener (e.g., nut and bolts fasteners) or fastener technique.

Referring to FIGS. 12-16, the repositionable hook assembly 116 is mounted to the cart frame 106 and adapted to interact with the lock box 118 in order to fasten the stabilizer to the ground. The lock box 118 is adapted to be mounted securely to the ground using ground spikes, nails, or other similar fasteners (not shown) so that the lock box is not readily repositionable.

In exemplary form, the lock box 118 includes corresponding right and left side ramps 400, 402 that cooperate with corresponding front and rear ramps 404, 406 to provide a frustopyramidal structure. More specifically, the ramps 400, 402 are comprised of generally flat metal plates having an upper lip 408 opposite a substantially wider base 410. The front and rear ramps 404, 406 comprise generally flat metal plates but for angled flanges 411 at opposing lateral ends. The angle of the flanges 411 is adapted to match the angle of incline of the right and left side ramps 400, 402. Moreover, the flanges 411 include orifices 412 that overlap countersunk orifices 414 formed through the lateral sides of the right and left side ramps 400, 402. More specifically, the medial and lateral sides of the right and left side ramps 400, 402 overly the flanges 411 of the front and rear ramps 404, 406 so that the orifices 412, 414 overlap in order to receive nut and bolt fasteners to mount the ramps to one another. When assembled, the ramps 400, 402, 404, 406 provide an incline on all four sides without appreciable seams for large objects (such as snow plows) to catch the seams and rip apart the ramps. In addition, the lips 408 are oriented in parallel with the ground when the ramps 400, 402, 404, 406 are assembled in order to provide overhead protection for components on the interior of the lock box that are not intended to be contacted by the hook assembly 116.

The interior of the lock box 118 includes an anchor 420 having one or more holes (not shown) to receive ground spikes, nails, or other similar fasteners (not shown) in order to secure the lock box to the ground. In exemplary form, the anchor 420 comprises an elongated rectangular plate 422 having upstanding medial and lateral walls 424, 426. Each wall 424, 426 is oriented generally perpendicular to the plate 422 and is beveled at its ends to match the intended incline of the front and rear ramps 404, 406. The medial and lateral walls 424, 426 include four identical cutouts 430 having rounded, cupped shape (and may be semicircular) to act as a seat in order to receive a cylindrical anchor bar 432. The cutouts 430 are generally evenly spaced apart and cooperate with anchor bar orifices 438 extending through the right and left side ramps 400, 402 in order to secure the cylindrical anchor bars 432 in position, but also allow the anchor bars to axially rotate. Each anchor bar 432 includes an outer cylinder 434 having a length at least long enough to laterally span corresponding cutouts 430. The outer cylinder 434 may be machined to include cylindrical extensions 436 from each end that are of a smaller diameter. Alternatively, the outer cylinder 434 may have an internal cylindrical cavity that is occupied by a cylindrical insert 436 having an overall length long enough to extend axially outward from the outer cylinder. In either circumstance, the cylinders 434, 436 are mounted to one another so that rotation of one results in rotation of the other. A trap door 440 is mounted to three of the four outer cylinders 434.

Interposing the four cutouts 430 are three identical cutouts 444 having a generally arcuate path with a flat end. The three cutouts 444 receive corresponding ends of each trap door 440. In this manner, as the outer cylinder 434 is rotated, so too is the trap door rotated, thus the arcuate path of the cutout 444. In exemplary form, the lengthwise dimension of each trap door 440 approximates the horizontal distance between adjacent outer cylinders 434. Likewise, the widthwise dimension of each trap door 440 approximates the lateral distance between the medial and lateral walls 424, 426. In this way, the trap door 440 attempts to prohibit foreign debris of problematic size from entering the lock box 118 and inhibiting its operation.

Figure 13:
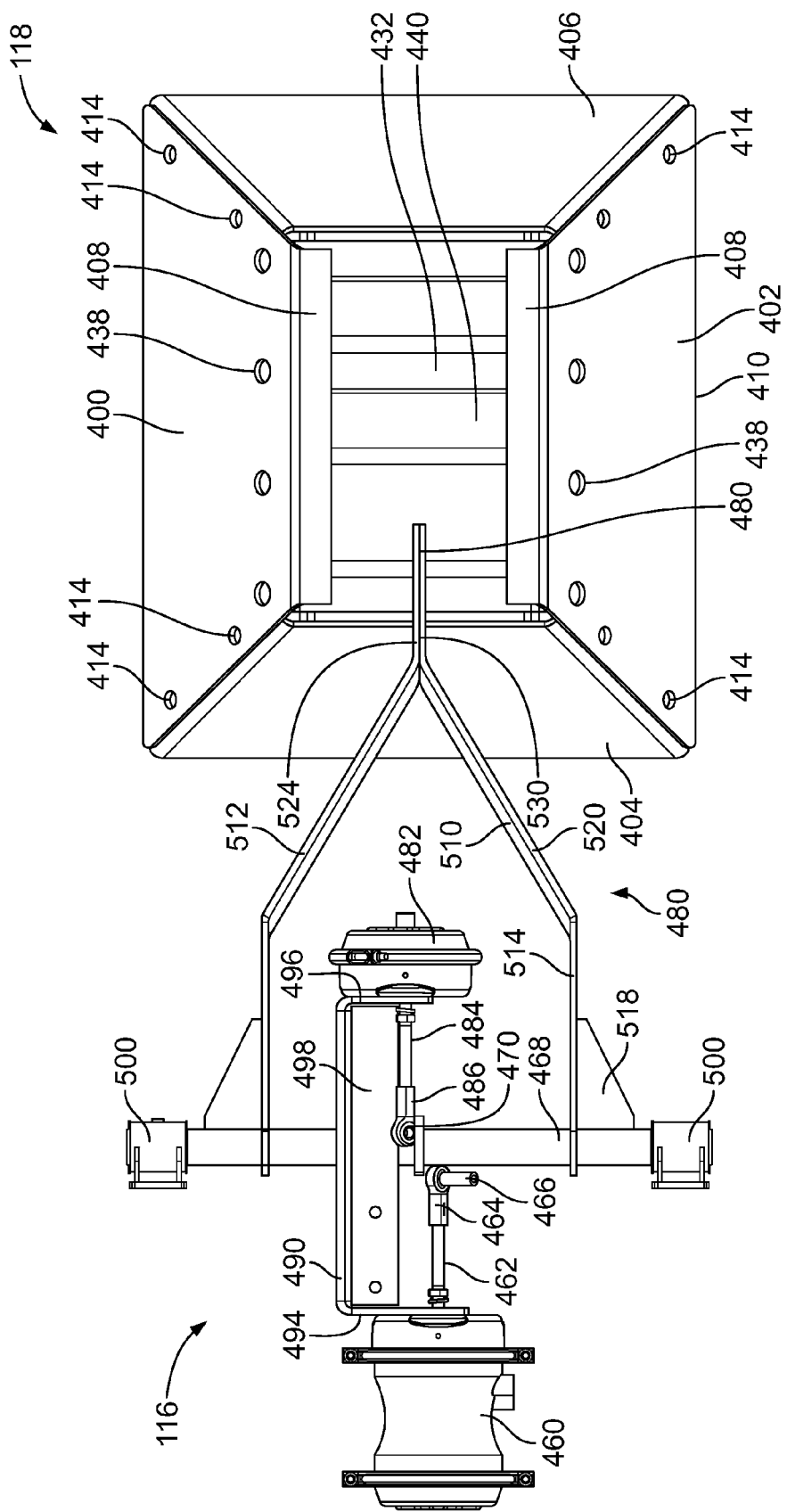
FIG. 13 is a top view of the exemplary repositionable hook assembly and lock box of FIG. 12.
Figure 14:
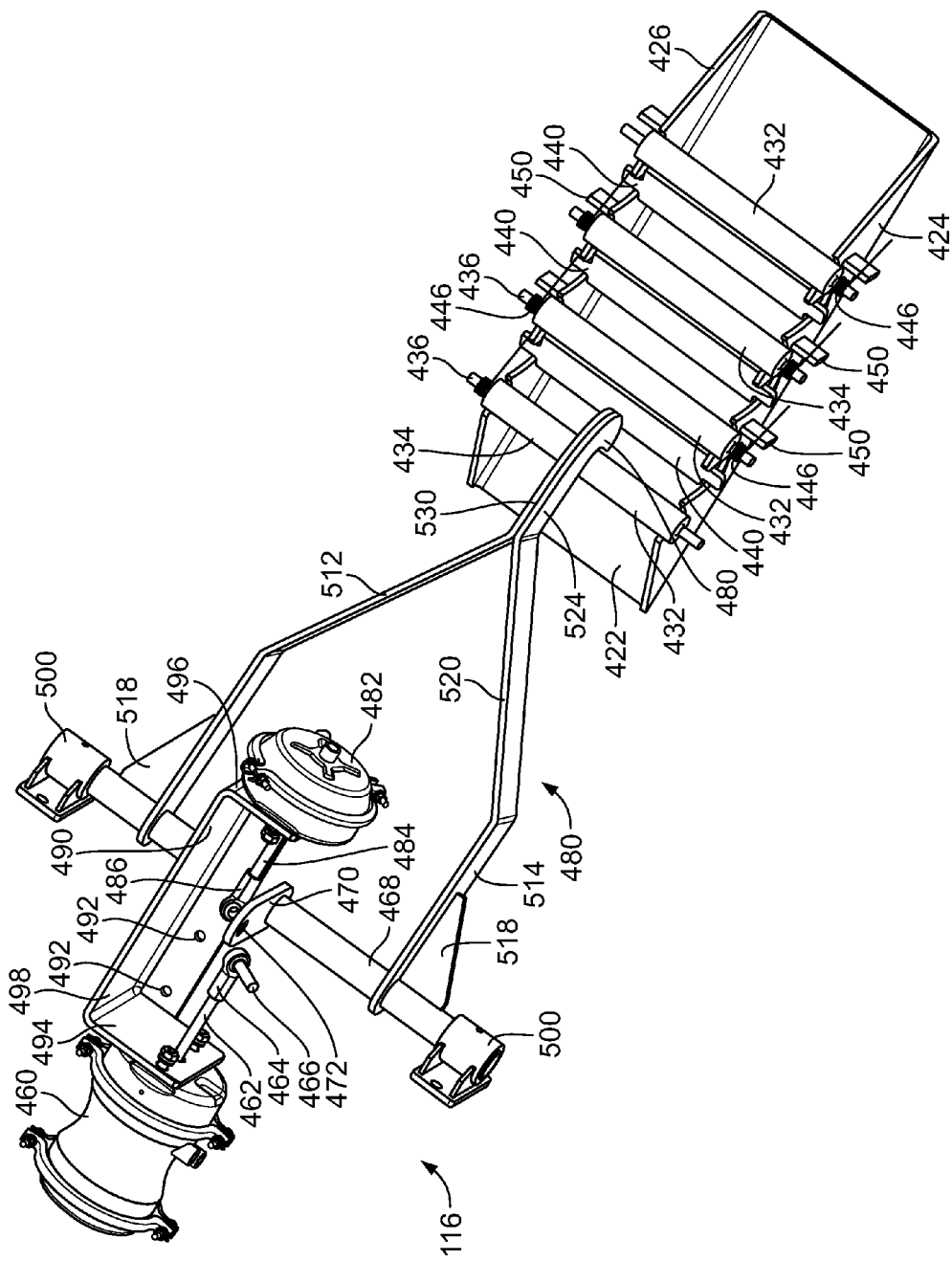
FIG. 14 is an elevated perspective view of the exemplary repositionable hook assembly and internal components of the lock box of FIG. 12.
Figure 15:
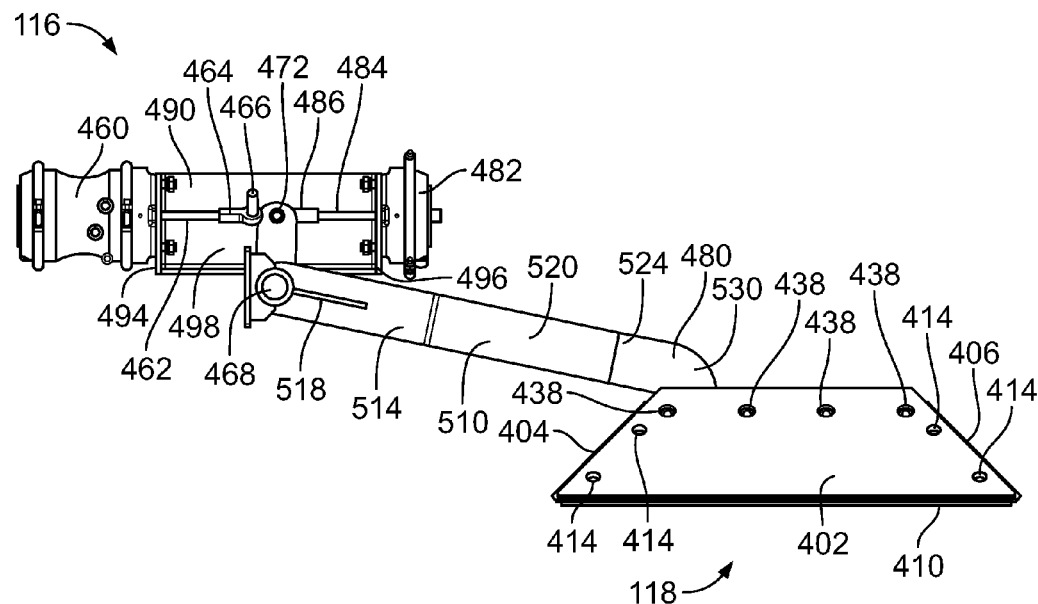
FIG. 15 is a left side profile view of the exemplary repositionable hook assembly and lock box of FIG. 12.
Figure 16:
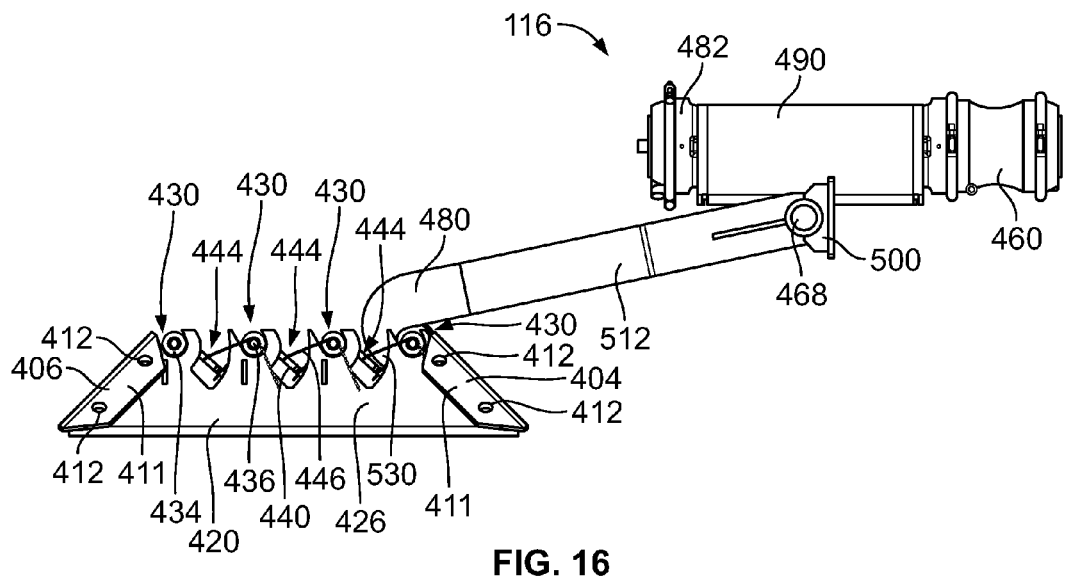
FIG. 16 is a right side profile view of the exemplary repositionable hook assembly and internal components of the lock box of FIG. 12.
Figure 17:
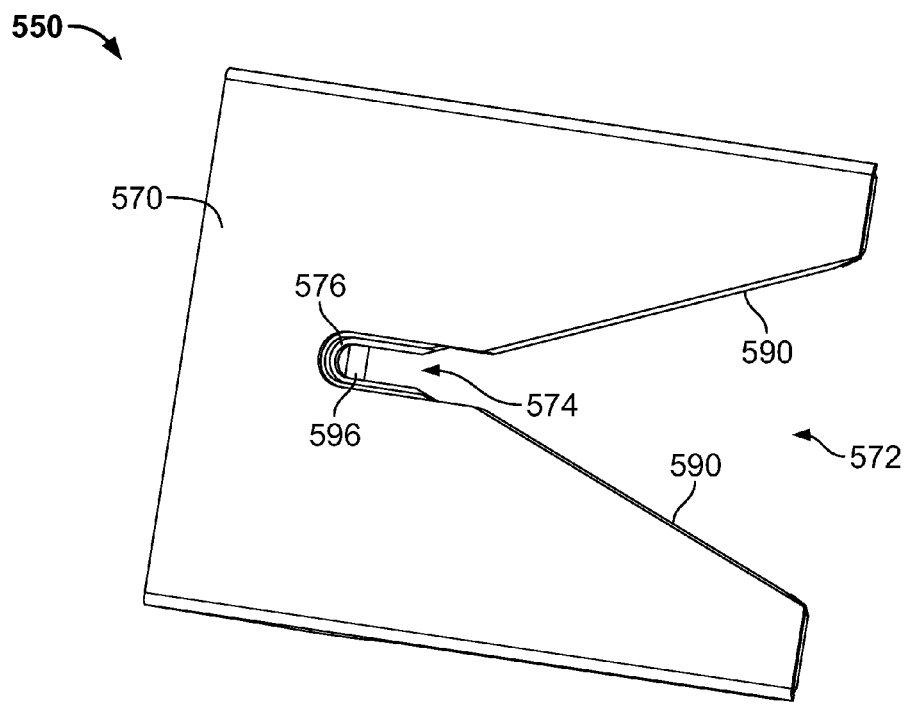
FIG. 17 is a top view of an exemplary tilt subassembly of an exemplary fifth wheel assembly in accordance with the instant disclosure.
Figure 18:
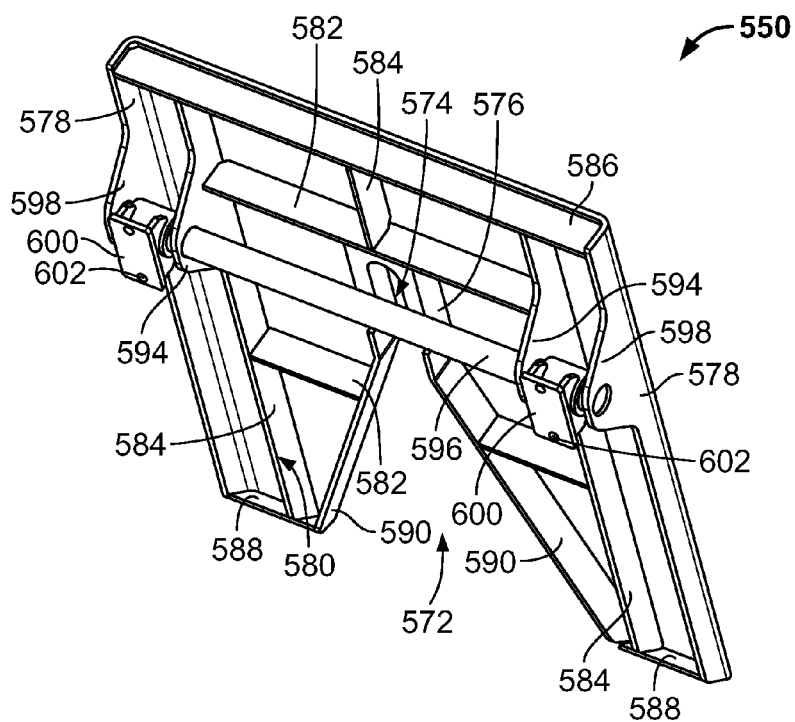
FIG. 18 is a bottom perspective view, from the front, of the exemplary tilt subassembly of the exemplary fifth wheel assembly of FIG. 17.
Figure 19:
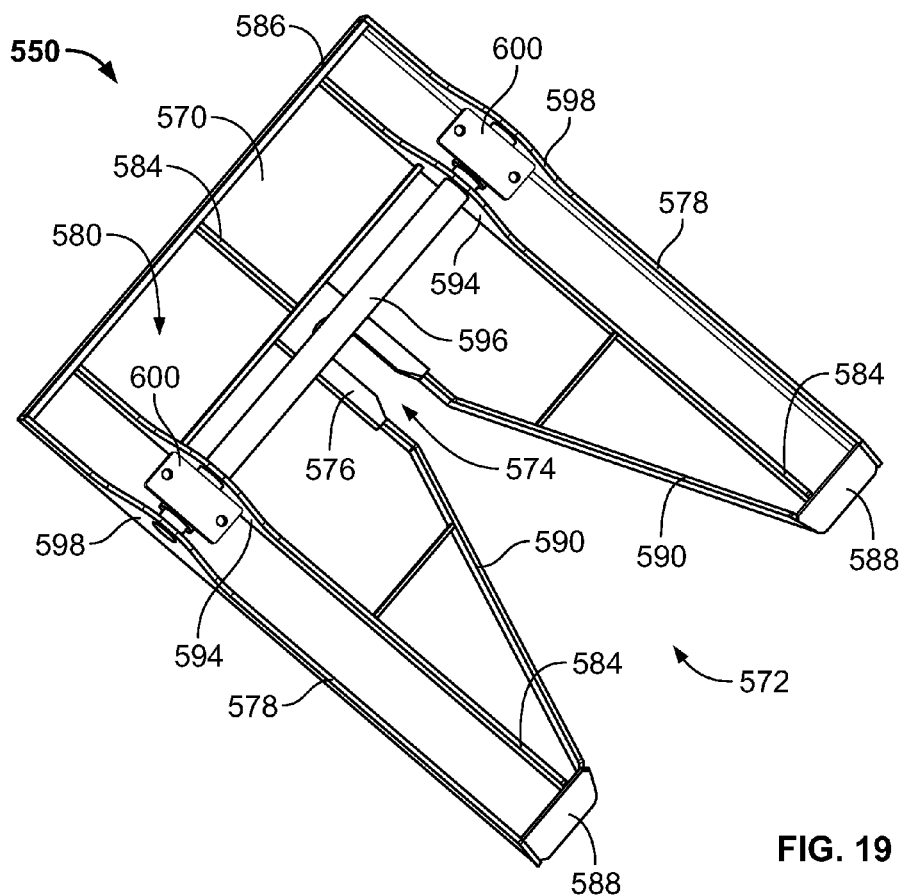
FIG. 19 is a bottom view of the exemplary tilt subassembly of the exemplary fifth wheel assembly of FIG. 17.
Figure 20:
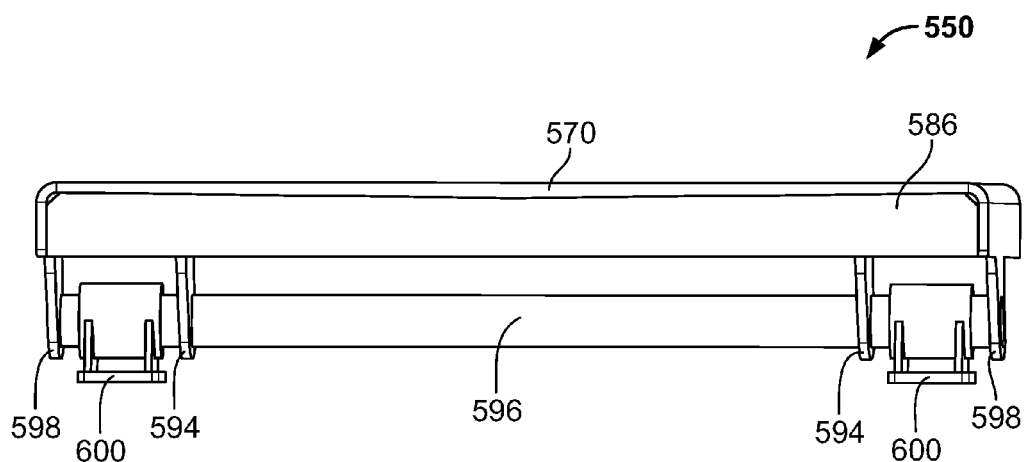
FIG. 20 is a profile view, from the front, of the exemplary tilt subassembly of the exemplary fifth wheel assembly of FIG. 17.

For the three outer cylinders 434 that includes a trap door 440, a spring 446 (e.g., a torsion spring) is mounted to the smaller cylinder 436 and is operative to bias the trap door in the horizontal, blocking position (see FIG. 13). Thought not necessary, at least one of the medial and lateral walls 424, 426 includes a stop 450 mounted to the anchor 420 that is adapted to engage a spring, such as a torsion spring, in order cooperate with the spring to bias the trap door 440 to the blocking position. But, when contacted by the hook as will be described hereafter, the hook is operative to overcome the bias and force the trap door downward so the hook can couple to a corresponding outer cylinder 434.

The repositionable hook assembly 116 includes an airbag 460 operatively coupled to a linear rod 462. The linear rod 462 includes a fitting 464 having a ball joint that receives a clevis pin 466 in order to transfer motion from the airbag 460 to a pivot shaft 468. The pivot shaft 468 includes a pivot arm 470 having a hole 472 therethrough. This hole 472 receives the clevis pin 466, where motion of the clevis pin is transferred to the pivot shaft 468 by way of the pivot arm 470. Specifically, the airbag 460 is operative to expand (i.e., inflate) and turn the pivot arm 470 and pivot shaft 468 in the clockwise direction that is operative to lower a hook 480. Alternatively, the airbag 460 may be omitted and the hook 480 may be lowered using gravity. But the hook assembly 116 also includes a second airbag 482 having a linear rod 484 and a fitting 486 with a ball joint to receive the clevis pin 466. This second airbag 482 is operative to expand (i.e., inflate) and turn the pivot arm 470 and pivot shaft 468 in the counterclockwise direction to raise the hook 480 or retain the hook in a raised position. Both of the airbags 460, 482 are mounted to a bracket 490 that is mounted to the top of the rear cross-members 216. Specifically, the bracket 490 includes a pair of holes 492 that receive nut and bolt fasteners to mount the bracket to the rear cross-member. In exemplary form, the bracket 490 includes a pair of opposed flanges 494, 496 having corresponding holes that receive nut and bolt fasteners to couple the airbags 460, 482 to the respective flanges 494, 496. Interposing the flanges 494, 496 is a section of angle iron 498 that includes the pair of holes 492 used to mount the bracket 490 to the rear cross-member 216. A pair of shaft brackets 500 is utilized to mount the pivot shaft 468 to the rear cross-member 216 and the rectangular wall 263 of the right and left rear frame walls 250, 252.

The hook 480 is mounted to the pivot shaft 468 so that rotation of the pivot shaft results in arcuate movement of the hook, generally in an upward and downward direction. In this exemplary embodiment, the hook 480 comprises mirror image hook halves 510, 512. Each hook half 510, 512 comprises a first bar stock section 514 having a rounded proximal end 516 and a through orifice allowing throughput of the pivot shaft 468. Specifically, the bar stock section 514 is welded to the pivot shaft 468 and gussets 518 are concurrently welded to the bar stock section and the pivot shaft. A distal end of the bar stock section 514 includes a bend that transitions into a second bar stock section 520. Alternatively, the bar stock sections 514, 520 may be separate pieces that are welded together. This second bar stock section 520 includes a distal bend and comprises a hook section 524. In exemplary form, the hook sections 524 from each hook half 510, 512 are welded together to create a two-ply end hook 530.

Referring to FIGS. 17-20, the fifth wheel assembly 120 comprises two primary subassemblies, the tilt subassembly 550 and the pivot subassembly 560. The tilt subassembly 550 includes a tilt plate 570 having a generally rectangular shape, but for a tapered cutout 572 that leads into a king pin cavity 574. The king pin cavity 574 is adapted to be occupied by the king pin of a parked freight trailer. In this exemplary embodiment, the king pin cavity 574 is partially defined by the tilt plate 570 and partially defined by a king pin block 576 mounted to the underside of the tilt plate. The lateral sides 578 of the tilt plate 570 are formed by lateral extensions of the plate having been rounded over to form perpendicular flanges. A frame 580 is mounted to the underside of the tilt plate 570 and includes lateral and vertical cross members 582, 584. The frame also includes a front plate 586 that spans a proximal portion of the tilt plate 570, as well as distal plates 588 that span between angled frame members 590 and the lateral sides 578. The angled frame members 590 lie along the cutout 572 in order to reduce wear upon the tilt plate where the king pin from the freight trailer would otherwise contact.

As will be described in more detail hereafter, the tilt plate 570 is repositionable with respect to the pivot subassembly 560. In particular, parallel, vertical cross members 584 each include extensions 594 through which holes are bored to receive a tilt shaft 596. The sides 578 of the tilt plate 570 also include extensions 598 through which holes are bored to receive the tilt shaft 596. In this exemplary embodiment, the tilt shaft 596 is welded to the extensions 594, 598 so that rotation of the shaft results in corresponding movement of the tilt plate 570. Interposing the extensions 594, 598 are a pair of brackets 600 that are mounted to the pivot subassembly 560. These brackets 600 allow the tilt shaft 596 to rotate so that tilting of the tilt plate 570 is possible with respect to the pivot subassembly 560 is possible, but to a limit. The brackets 600 each have corresponding holes adapted to overlap with holes in the pivot subassembly and receive nut and bolt fasteners to repositionably mount the tilt subassembly 550 and the pivot subassembly 560.

Figure 21:
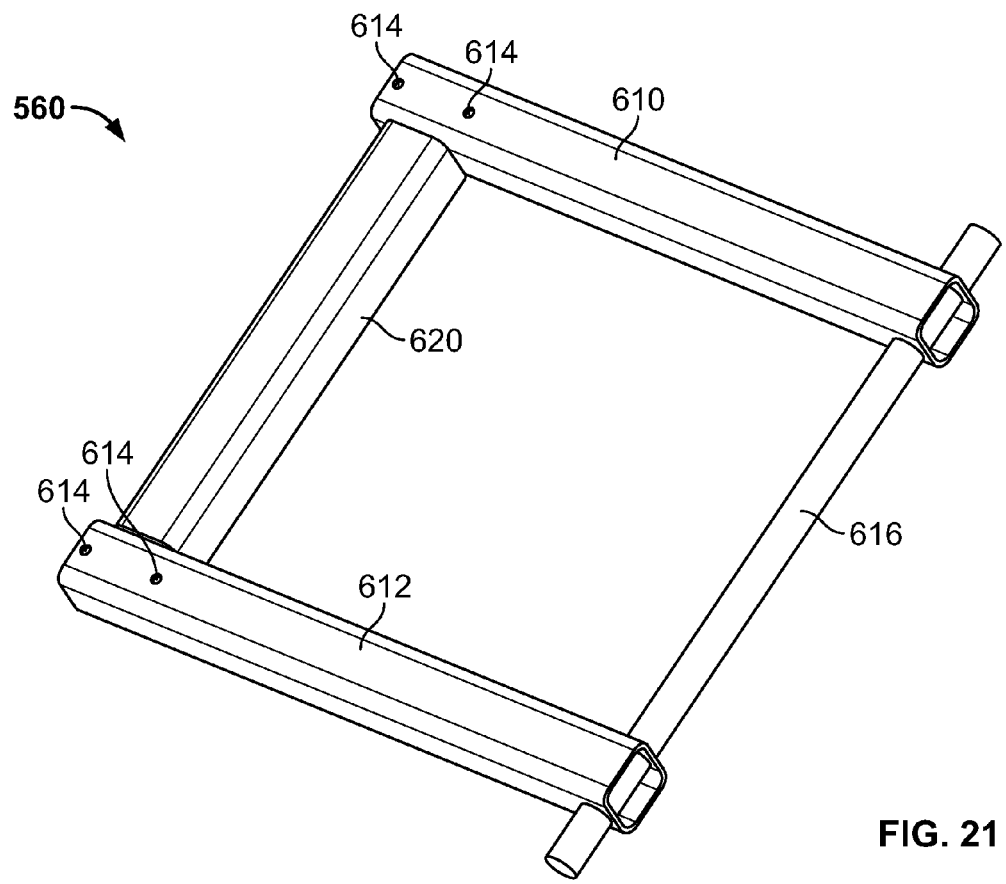
FIG. 21 is an elevated perspective view, from the left rear, of an exemplary pivoting subassembly of an exemplary fifth wheel assembly in accordance with the instant disclosure.
Figure 22:
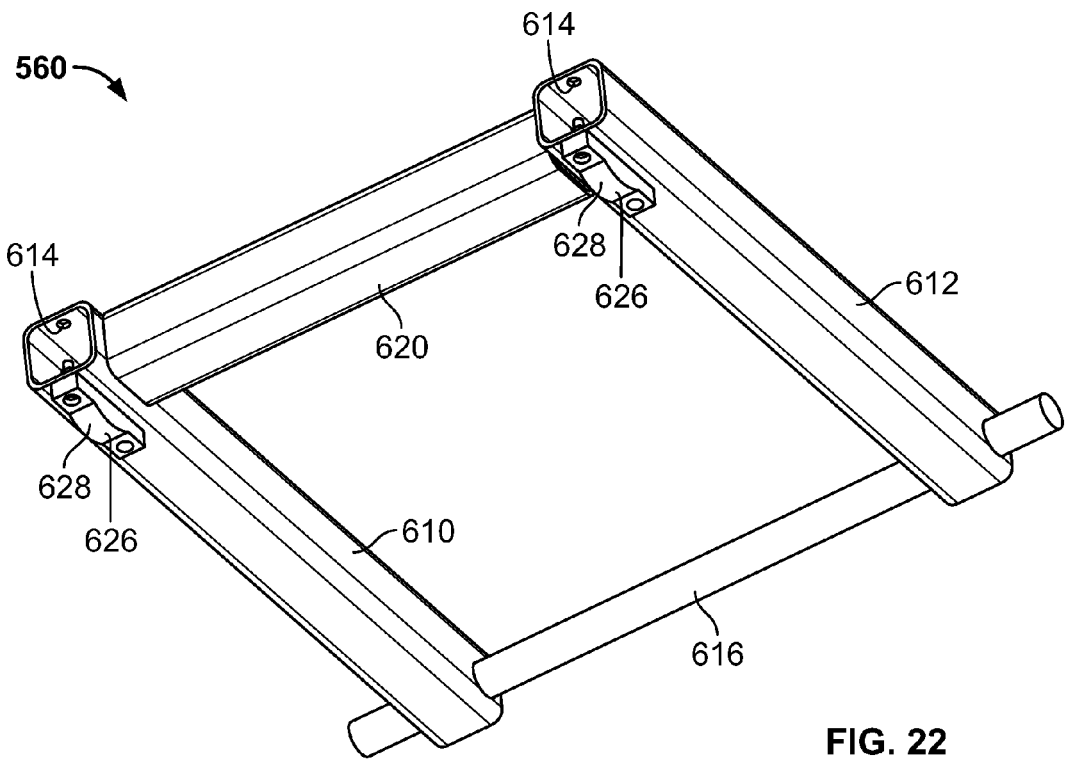
FIG. 22 is a bottom perspective view, from the left front, of the exemplary pivoting subassembly of the exemplary fifth wheel assembly in accordance with the instant disclosure.
Figure 23:
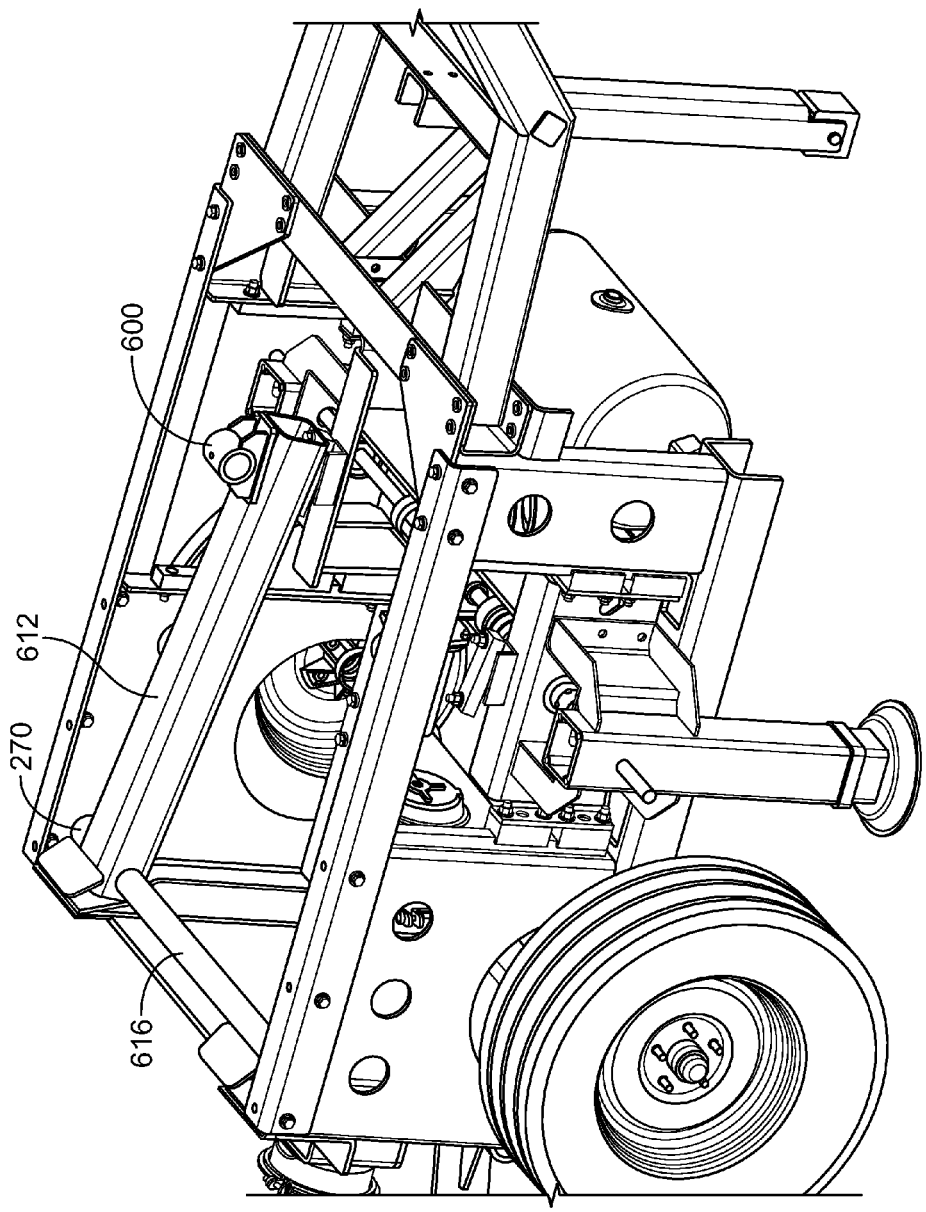
FIG. 23 is an elevated perspective view, from the right front, of a portion of the exemplary pivoting subassembly of the exemplary fifth wheel assembly in the context of the cart frame.
Figure 24:
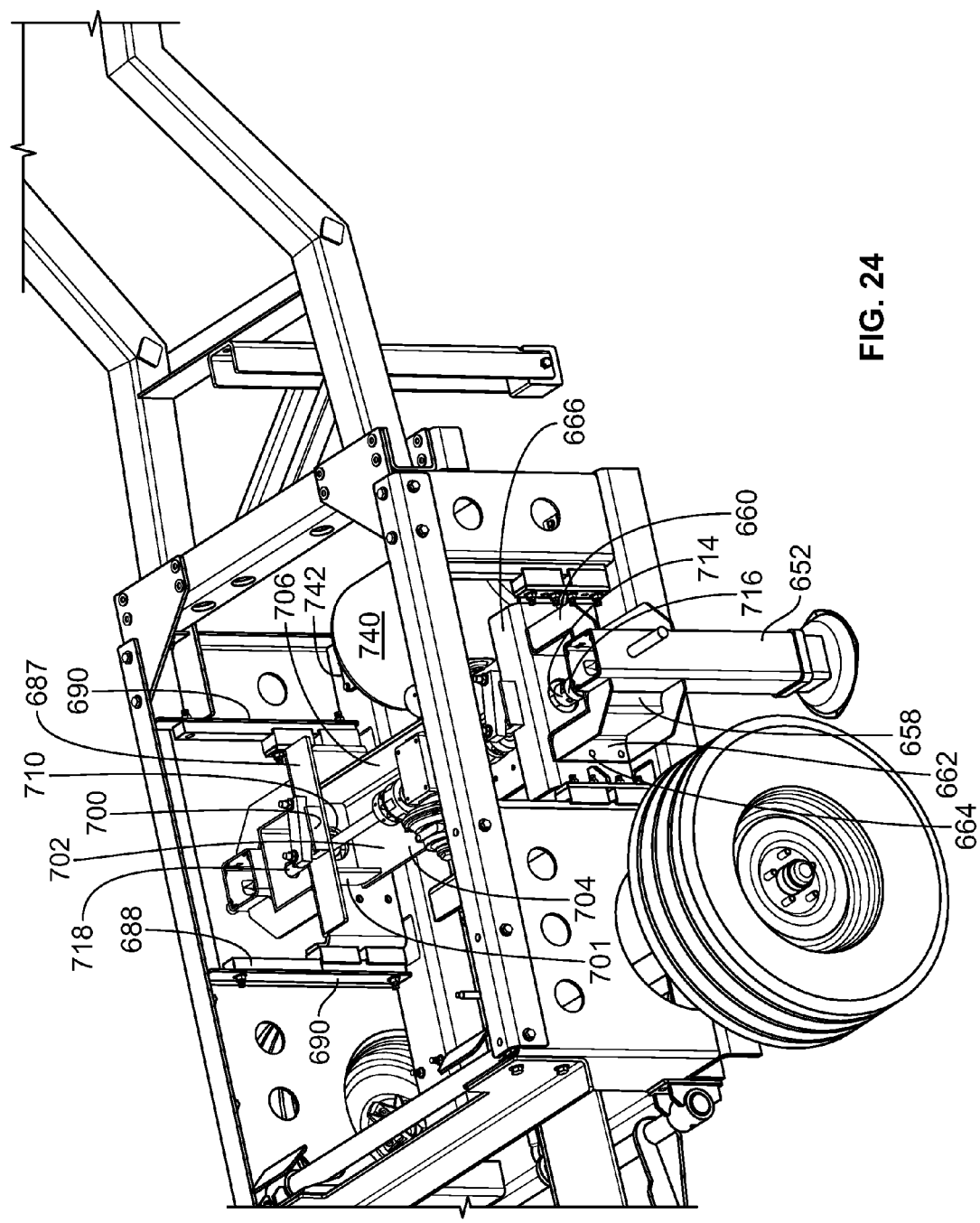
FIG. 24 is an elevated perspective view, from the right rear, of an exemplary repositionable jack assembly in the context of the cart frame in accordance with the instant disclosure.
Figure 25:
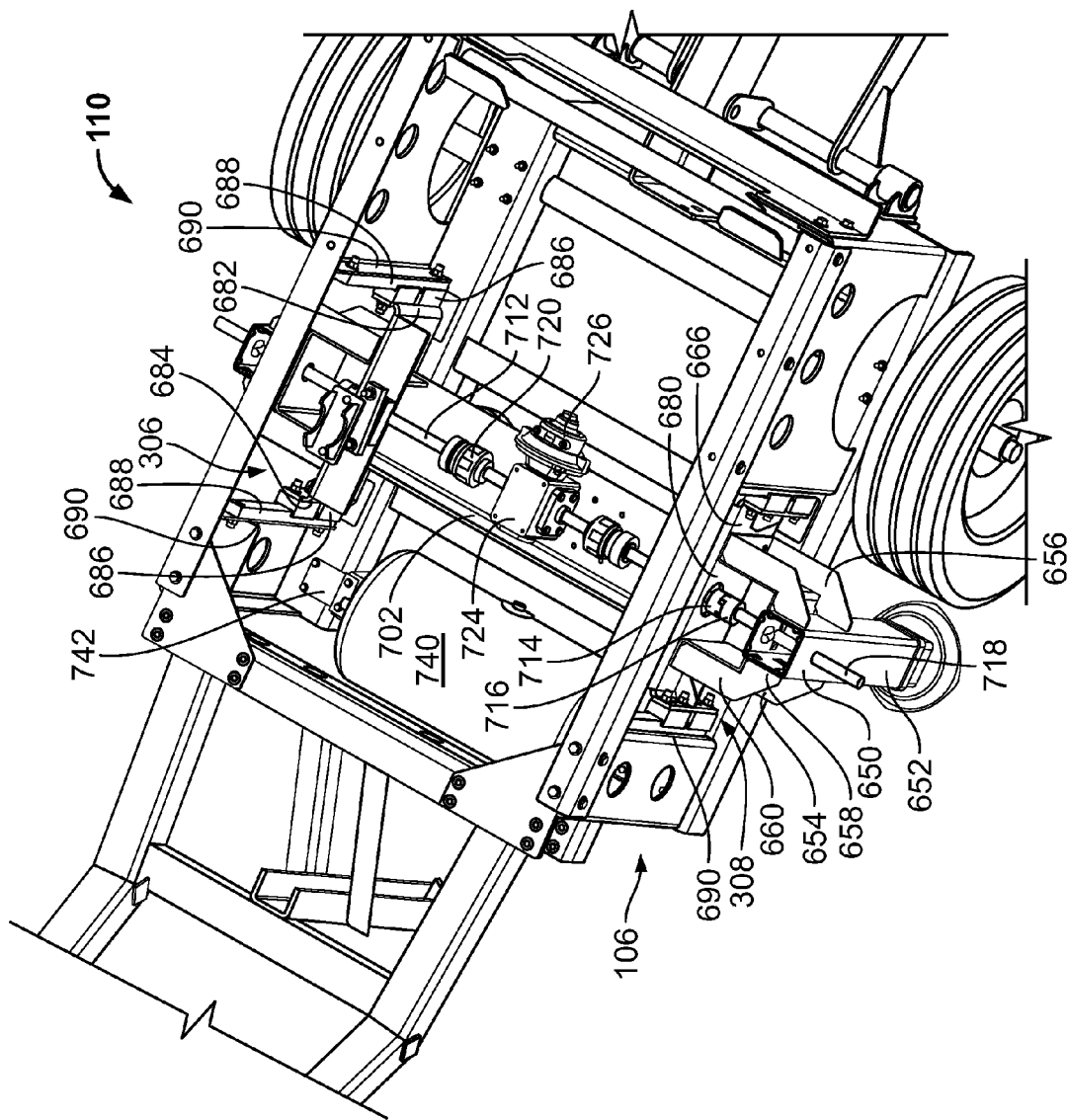
FIG. 25 is an elevated perspective view, from the left side, of the exemplary repositionable jack assembly in the context of the cart frame shown in FIG. 24.
Figure 26:
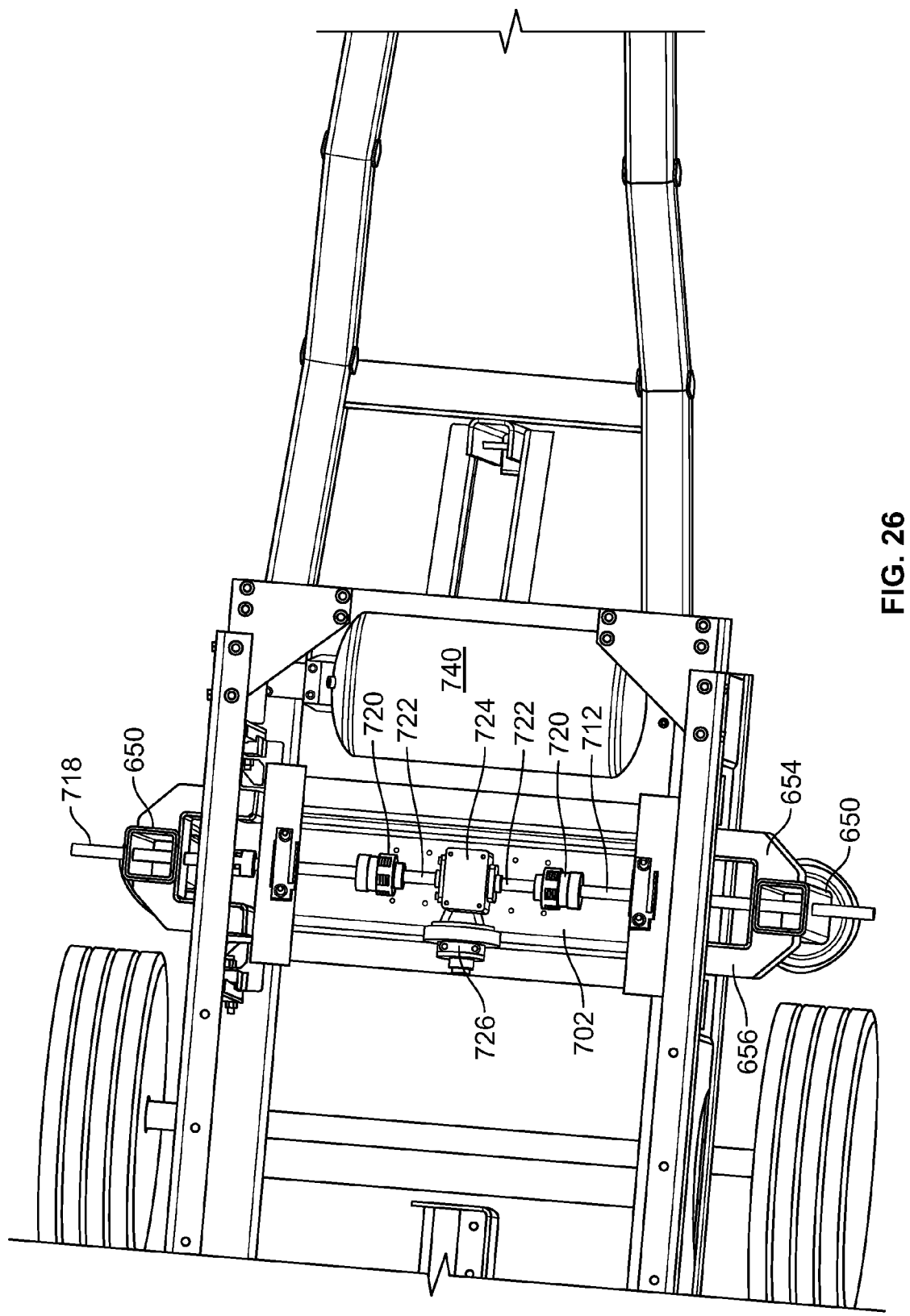
FIG. 26 is an overhead view of the exemplary repositionable jack assembly in the context of the cart frame shown in FIG. 24.
Figure 27:
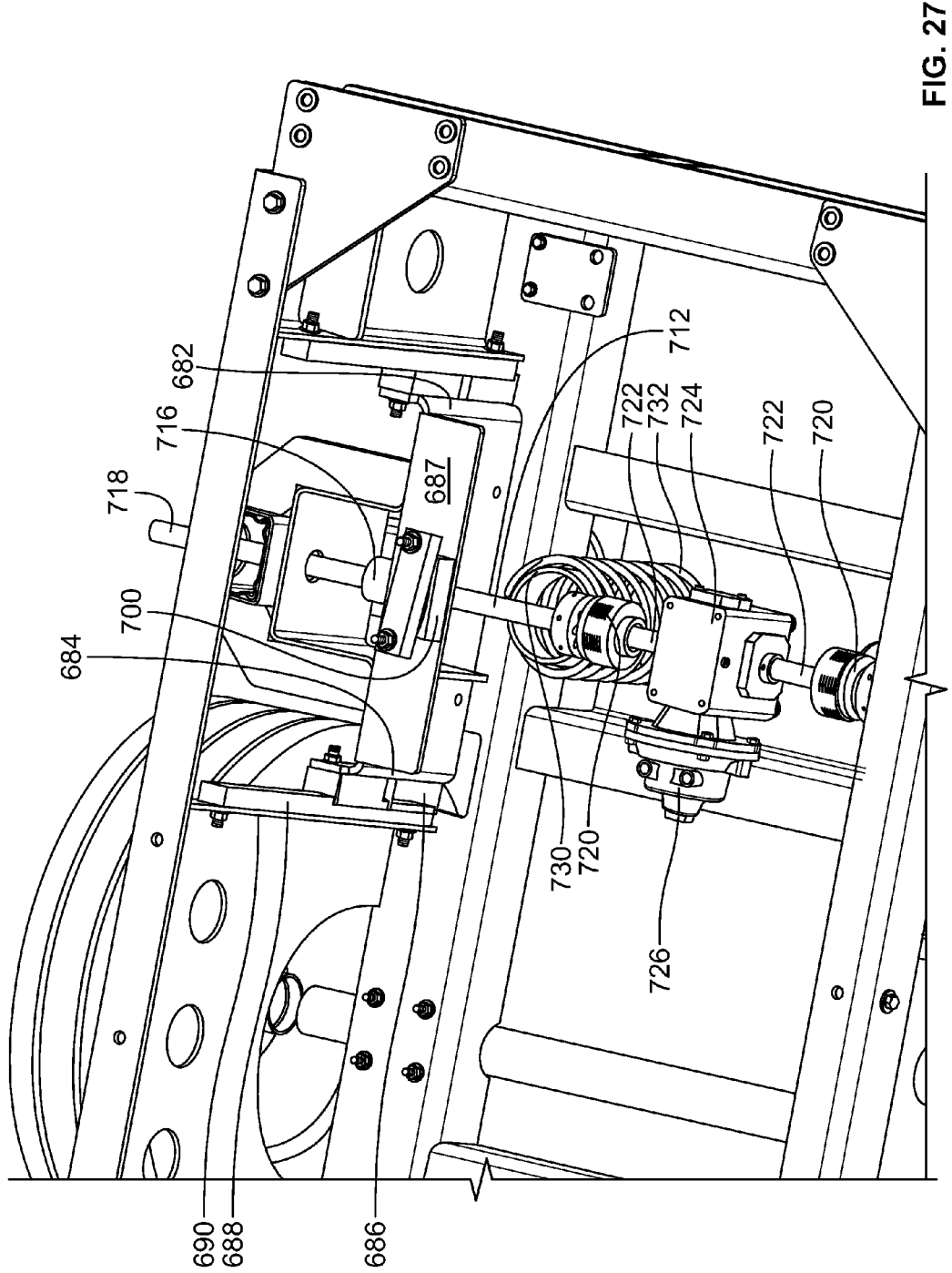
FIG. 27 is a magnified view of a left half of the exemplary repositionable jack assembly of FIG. 24, shown without the cross-plate.
Figure 28:
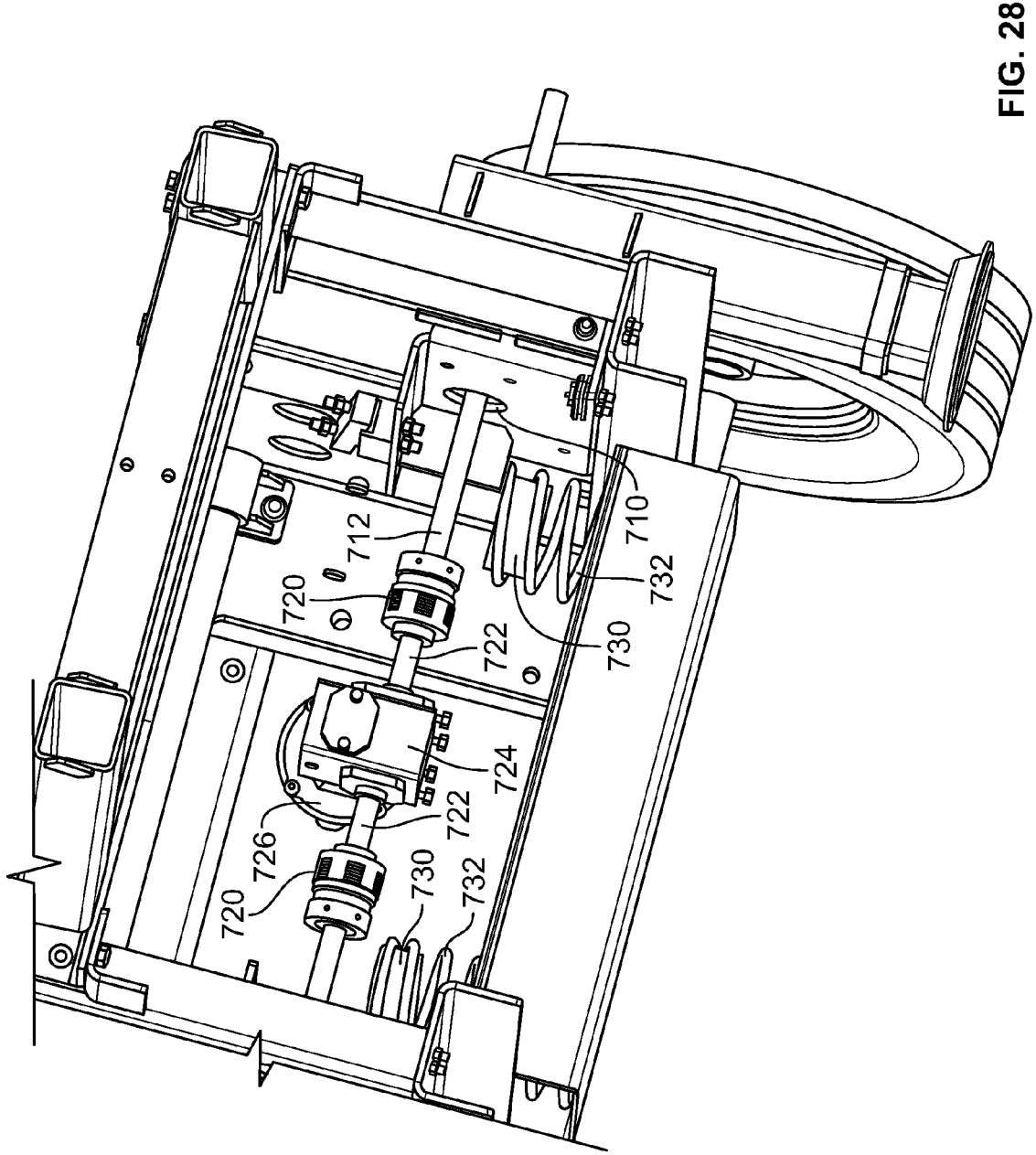
FIG. 28 is a forward view of the left half of the exemplary repositionable jack assembly of FIG. 24, shown without the cross-plate.
Figure 29:
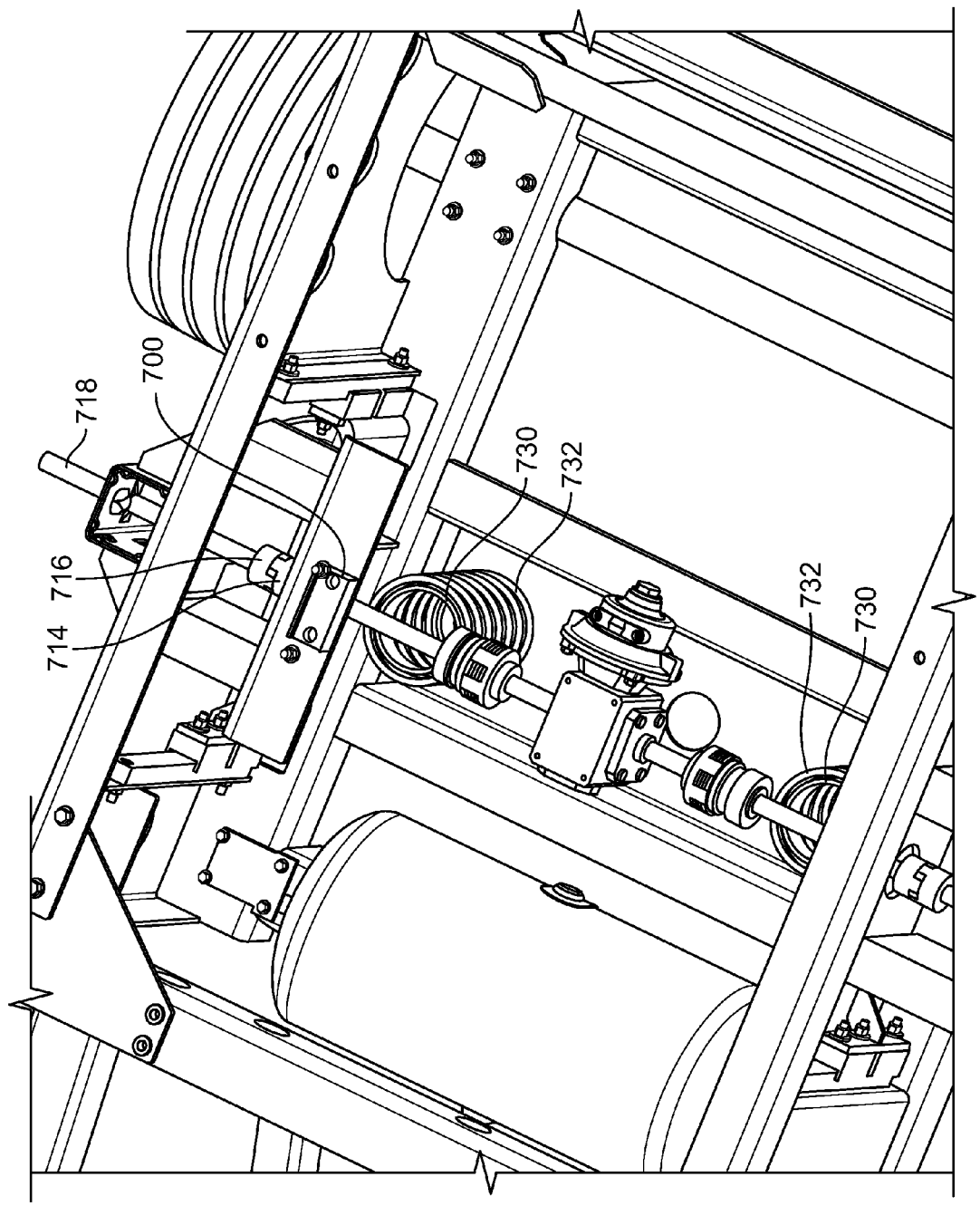
FIG. 29 an elevated perspective view of the right half of the exemplary repositionable jack assembly of FIG. 24, shown without the cross-plate.

Referring to FIGS. 21-23, the pivot subassembly 560 includes a right and left side pivot tubes 610, 612 fabricated from rectangular metal tubing. Each tube 610, 612 includes corresponding holes 614 that overlap with the holes 602 in the brackets to receive nut and bolt fasteners to repositionably mount the tilt subassembly 550 and the pivot subassembly 560. At the rear of each tube 610, 612 are a pair of circular openings that allow throughput of a pivot shaft 616. In exemplary form, the pivot shaft 616 extends through each tube 610, 612 a predetermined distance and is welded to each tube. At the front of each tube 610, 612 is a cross-tube 620 that is positioned between the tubes and is welded thereto. By way of example, the tubes 610, 612, 620, and the shaft 616 form a rectangle. It should be noted that the extension of the pivot shaft 616 extending beyond the tubes 610, 612 is at least partially received within the tubular brackets 270 of the cart frame 106 to allow the pivot subassembly 560 to pivot with respect to the cart frame. Finally, each tube 610, 612 includes a rocker 626 mounted to the front of each tube on the opposite side as the brackets 600. The rocker 626 comprises arcuate projection 628 that is received within a corresponding bracket of the repositionable jack assemblies 110 to that the rocker can move in a rocking motion when the pivot subassembly 560 pivots with respect to the cart frame 106.

Referring to FIGS. 24-29, the repositionable jack assembly 110 is operative to deploy a pair of jacks 650 mount on the medial and lateral sides of the cart frame 106 to at least partially support some of the weight at the front of the freight trailer and provide greater lateral stability than is possible using the freight trailer's landing gear. In this exemplary embodiment, the jacks 650 are screw jacks. Those skilled in the art are familiar with the operation of screw jacks and therefore the internal structure and operation of screw jacks will not be discussed for purposes of brevity.

Each screw jack 650 includes a telescopic screw jack leg 652 mounted to front and rear brackets 654, 656. Each bracket 654, 656 comprises an I-beam construction with a first section 658 that is welded to the jack leg and extends laterally outward therefrom. A second I-beam section 660 is welded to the first section 658 and is oriented perpendicularly with respect to the first section and extends through a corresponding side opening 306, 308 in the cart frame 106. The end of the second section 660 not mounted to the first section 658 includes a vertical end plate 662 that spans between the top and bottom of the I-beam on one side of the vertical wall of the I-beam. The vertical end plate is welded in position and includes a plurality of orifices 664 for mounting to a side plate 666.

The side plate 666 extends parallel with the plane of the opening 306, 308 and includes a vertical wall 680 that is rounded over to provide a pair of vertical flanges 682, 684 that are oriented generally perpendicular to the vertical wall. Each flange 682, 684 is mounted to at least one follower 686 that follows a respective section of vertical track 688 mounted to a vertical flange 690 of one of four frame walls (right rear frame wall 250, left rear frame wall 252, right front frame wall 254, left front frame wall 256). In this fashion, as the screw jack leg 652 is extended and eventually contacts the ground, the screw jack leg 652 will operate to push upward on the jack, which will push upward on the brackets 654, 656, thereby pushing upward on the side plate 666 so the side plate travels vertically in a straight path as dictated by the followers 686 following the track 688.

The side plate 666 also includes a third flange 687, also rounded over from the vertical wall 680, that extends horizontally toward the center of the cart frame 106. This flange 687 has mounted to it a guide track 700 that receives the arcuate projection of the rocker 626 so the pivot subassembly 560 can rock with respect to the side plate 666.

Underneath the third flange 687 is a welded gusset 701 that contacts a cross-plate 702. The cross-plate 702 includes a horizontal plate 704 that extends laterally (i.e., medial to lateral direction) in between opposing side plates 666 and is spaced apart from the third flange 687 by the gusset 701. The cross-plate 702 also includes a vertical plate 706 that extends perpendicularly from the horizontal plate 704 at a front edge of the horizontal plate. In exemplary form, the gusset 701 is welded to the horizontal plate 704, while the end of the vertical plate 706 is welded to the underside of the third flange 687.

The side plate 666 also includes a lateral orifice 710 to allow throughput of a rotating shaft. In this exemplary embodiment, the rotating shaft comprises a drive shaft 712 coupled to a first jaw coupling 714. This first jaw coupling 714 is coupled to a second jaw coupling 716, which is itself coupled to a screw jack shaft 718 that extends through the jack leg 652. An opposite end of the drive shaft 712 is coupled to a clutch 720. The clutch 720 receives an output shaft 722 from a gearbox 724 coupled to an air motor 726. In exemplary form, the gearbox 724 is mounted to the horizontal plate 704, while the air motor 726 is mounted to the gearbox. The other components such as the drive shaft 712, the jaw couplings 716, 718, the clutch 720, and the output shaft are 722 suspended in the air.

Underneath the cross-plate 702 are two upstanding rings 730 that are vertically aligned with the two upstanding rings 228 mounted to the forward cross-member 214. Circumscribing these upstanding rings 228, 730 are two coil springs 732. In this manner, the repositionable jack assembly 110 floats on top of the two coil springs when the screw jack legs 652 are raised. This means that the amount of force required to position the fifth wheel assembly 120 underneath a parked trailer is only as great as the bias exerted by the springs. But after the stabilizer 100 is coupled to the parked trailer and the jack assembly is operative to extend the jack legs 652, it is the jack legs that are bearing the weight of the fifth wheel assembly 120 and at least a portion of the weight of the parked freight trailer.

In order to power the repositionable jack assembly 110 and the repositionable hook assembly 116, the exemplary stabilizer 100 uses pneumatic power. Those skilled in the art are familiar with pneumatic power. Accordingly, for purposes of clarity, the pneumatic lines running to the air motor 726 and airbags 460, 482 have been omitted. Nevertheless, the stabilizer 100 includes an on-board fluid tank 740 that may be used to store compressed air to power the repositionable jack assembly 110 and the repositionable hook assembly 116. In this exemplary embodiment, the fluid tank 740 is mounted to the front ends of the right and left frame rails 210, 212 using brackets 742 and nut and bolt fasteners. It should also be noted that the fluid tank 740 may be supplemented by an air supply from a tractor or hustler. While glad-hands have not been shown in the drawings, it is understood that the instant stabilizer 100 may include pneumatic lines linking the fluid tank 740 to a glad-hand connection. Alternatively, the stabilizer may include pneumatic lines that by-pass the fluid tank and connect optionally to a glad-hand. In such a circumstance, when a by-pass approach is utilized, the stabilizer need not be supplied with a fluid tank 740.

The exemplar stabilizer 100 is adapted to be coupled to a tractor or a hustler via the king pin 102. While not required, the stabilizer may also couple to one or more power supplies on the tractor or hustler to power one or more of the foregoing assemblies. In exemplary form, the parked freight trailer would already be parked over the lock box 118. After the stabilizer 100 is coupled to the tractor or hustler, the stabilizer is backed under a parked trailer at a loading dock so that the repositionable hook assembly 116 first goes under the trailer, followed by the rear of the cart frame 106 in order for the fifth wheel assembly 120 to capture the king pin of the parked trailer. In exemplary form, the fifth wheel assembly 120 include an automatic lock that capture the king pin of the parked trailer and does not allow the stabilizer to be disengaged without affirmatively disengaging the lock.

After the stabilizer 100 captures the king pin, the repositionable hook assembly 116 is engaged to lower the hook 480 by supplying air to inflate the airbag 460. Depending upon the dimensions of the freight trailer and the position of the lock box 118, the hook 480 may contact a trap door 440 and fall in between anchor bar 432. Thereafter, the stabilizer may be repositioned forward to lock the hook 480 within the lock box 118. Alternatively, the hook 480 may contact one of the anchor bars 432, at which time the stabilizer is move slightly rearward so the hook rides upon the anchor bar and then drops down onto the next trap door 440. Thereafter, the stabilizer is pulled slightly forward to lock the hook 480 within the lock box 118.

After the repositionable hook assembly 116 has been positioned to lock the hook 480 within the lock box 118, the repositionable jack assembly 110 is engaged to deploy the jacks. In exemplary form, air is supplied to the air motor 726, which in turn turns gears within the gearbox 724 to correspondingly rotate the output shaft 722. The drive shaft 712 driven by the output shaft, interposed by the clutch 720, and operates to drive the screw jack legs 652 downward. If an impediment is sensed, such as a wood block under one of the screw jack legs, but not under the other screw jack leg, the clutch will engage to disallow further rotation of the screw jack until the resistance of both jack legs is approximately the same. It should be noted that the stabilizer, while able to accommodate the entire weight of a fully loaded trailer at the front of the trailer, is more often utilized to share the load of the loaded trailer with the trailer's landing gear. As soon as the repositionable jack assembly 110 has been positioned to transfer some of the trailer's load onto the stabilizer 100, dock personnel are notified that it is appropriate to load or unload the parked trailer. This may be done with manually operated signals or may be accomplished via automated signals associated with the stabilizer that send a signal to dock personnel as soon as the repositionable hook assembly 116 and the repositionable jack assembly 110 have been successfully deployed.

To remove the stabilizer, a similar process is followed in the opposite sequence. First, the repositionable jack assembly 110 is disengaged, followed by disengaging the repositionable hook assembly 116. Thereafter, the stabilizer 100 is removed from the parked trailer and put in a storage position or moved underneath another parked trailer.

Figure 30:
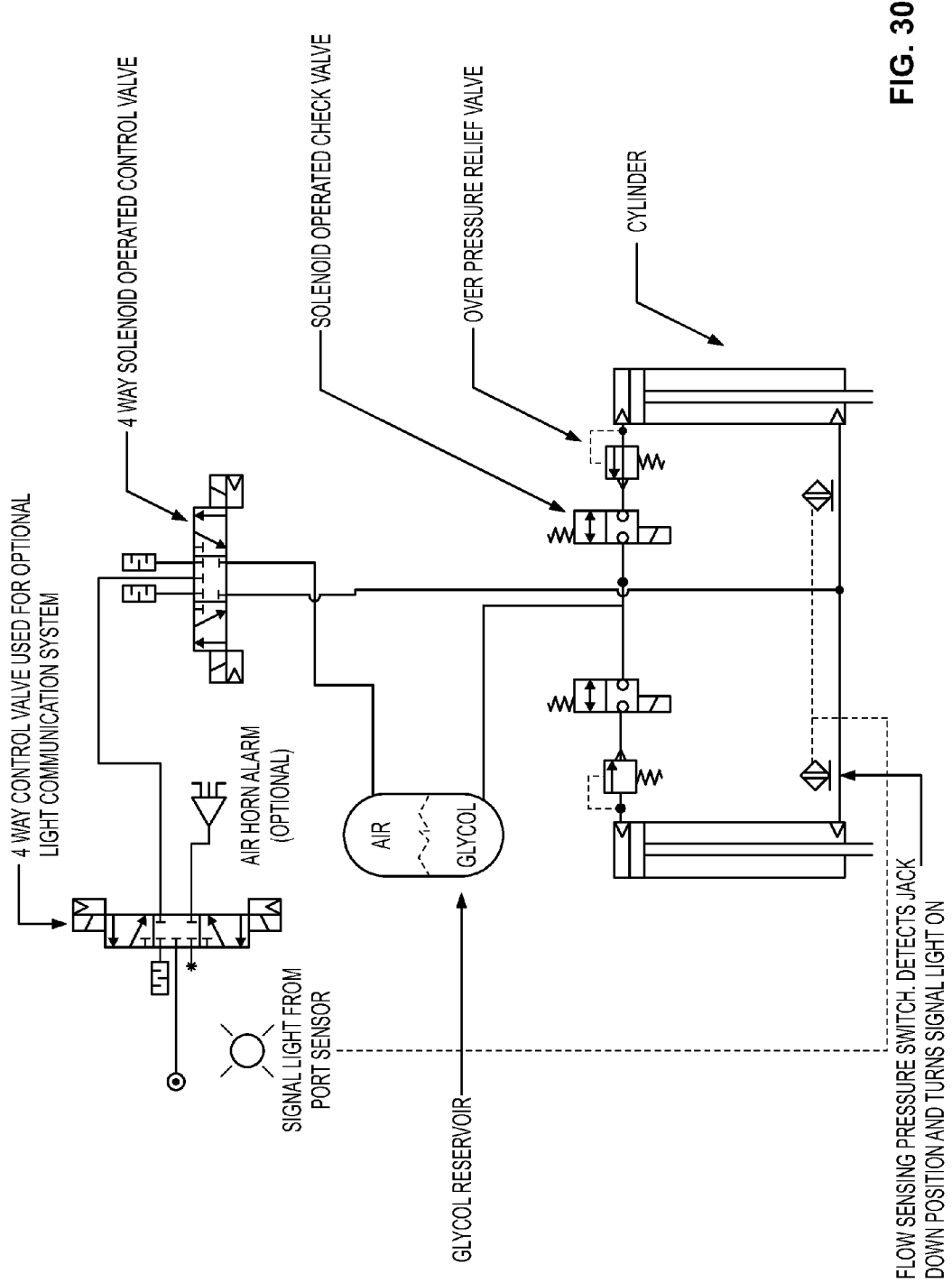
FIG. 30 is an exemplary schematic diagram showing the fluid network, using a liquid, incorporated in the alternate exemplary embodiment.

Referring to FIG. 30, while the foregoing exemplary embodiment has been explained using pneumatic power, an alternate exemplary embodiment for a trailer stabilizer is identical to the foregoing exemplary embodiment, except that the power supply, associated motors, and airbags are exchanged for hydraulic power and hydraulic cylinders. In exemplary form, the on-board fluid tank 740 of the stabilizer is at least partially filled by a glycol liquid (e.g., propylene glycol). The fluid tank 740 includes at least one outlet to a liquid supply line in order to supply glycol from inside the tank to the supply lines and to convey glycol back into the fluid tank when appropriate (such as when the hook is raised and/or when the jacks are raised. In this alternate exemplary embodiment, the jacks of the repositionable jack assembly 110 include hydraulic cylinders having a piston that extends by supplying glycol to the cylinder. Moreover, the cylinders are also operative to retract the piston when glycol is added to the other side of the seal within the cylinder. Moreover, the airbags 460, 482 of the repositionable hook assembly 116 are replaced by a single hydraulic cylinder having a piston that extends and retracts based upon the glycol supplied to the cylinder. While it is the glycol supplying the fluid to reposition the piston with respect to the cylinder, this alternate exemplary embodiment used compressed air to force the glycol through the supply lines.

Figure 31:
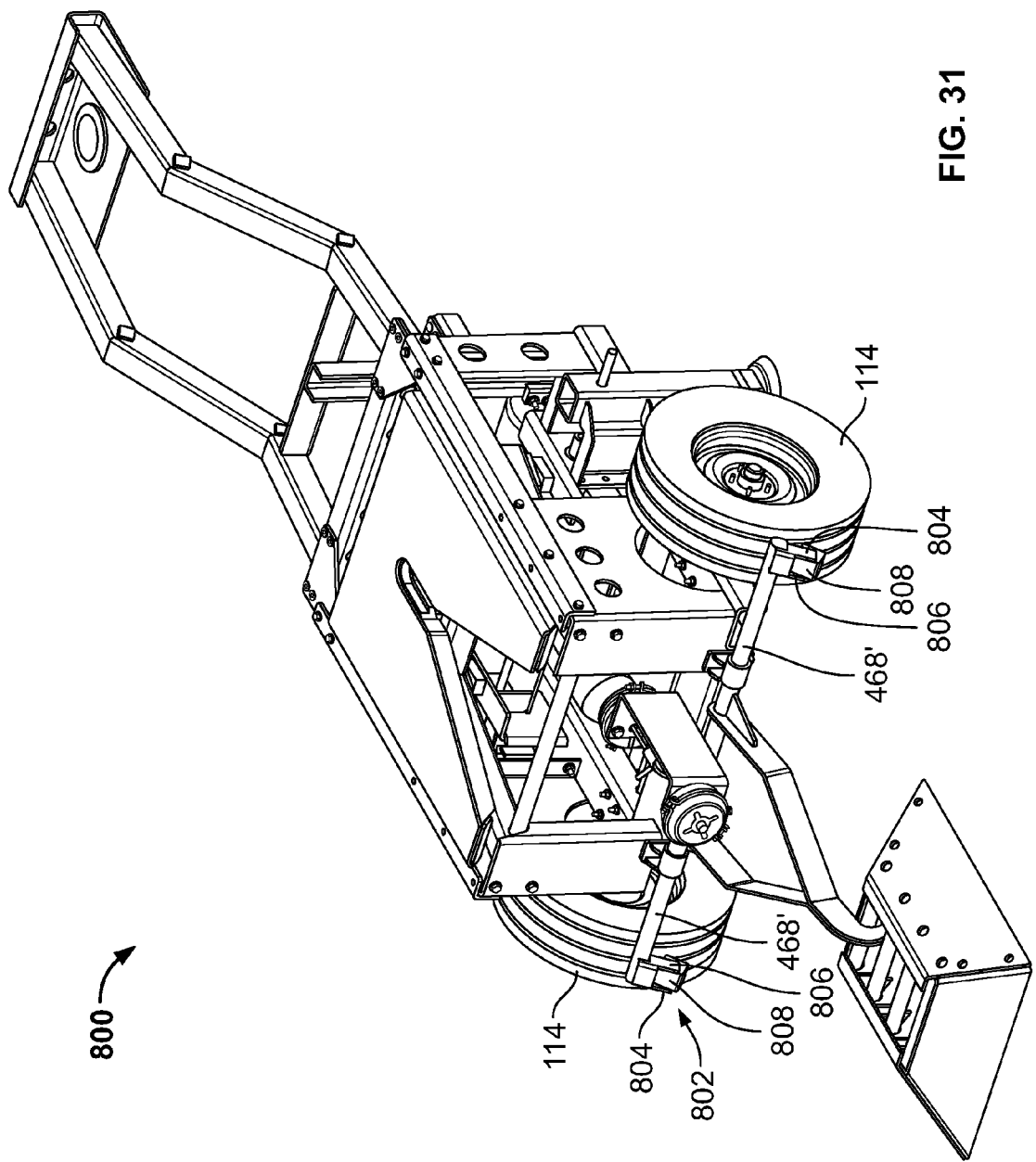
FIG. 31 is an elevated perspective view, from the right rear, of yet another alternate exemplary trailer stabilizer that includes integrated wheel stops.
Figure 32:
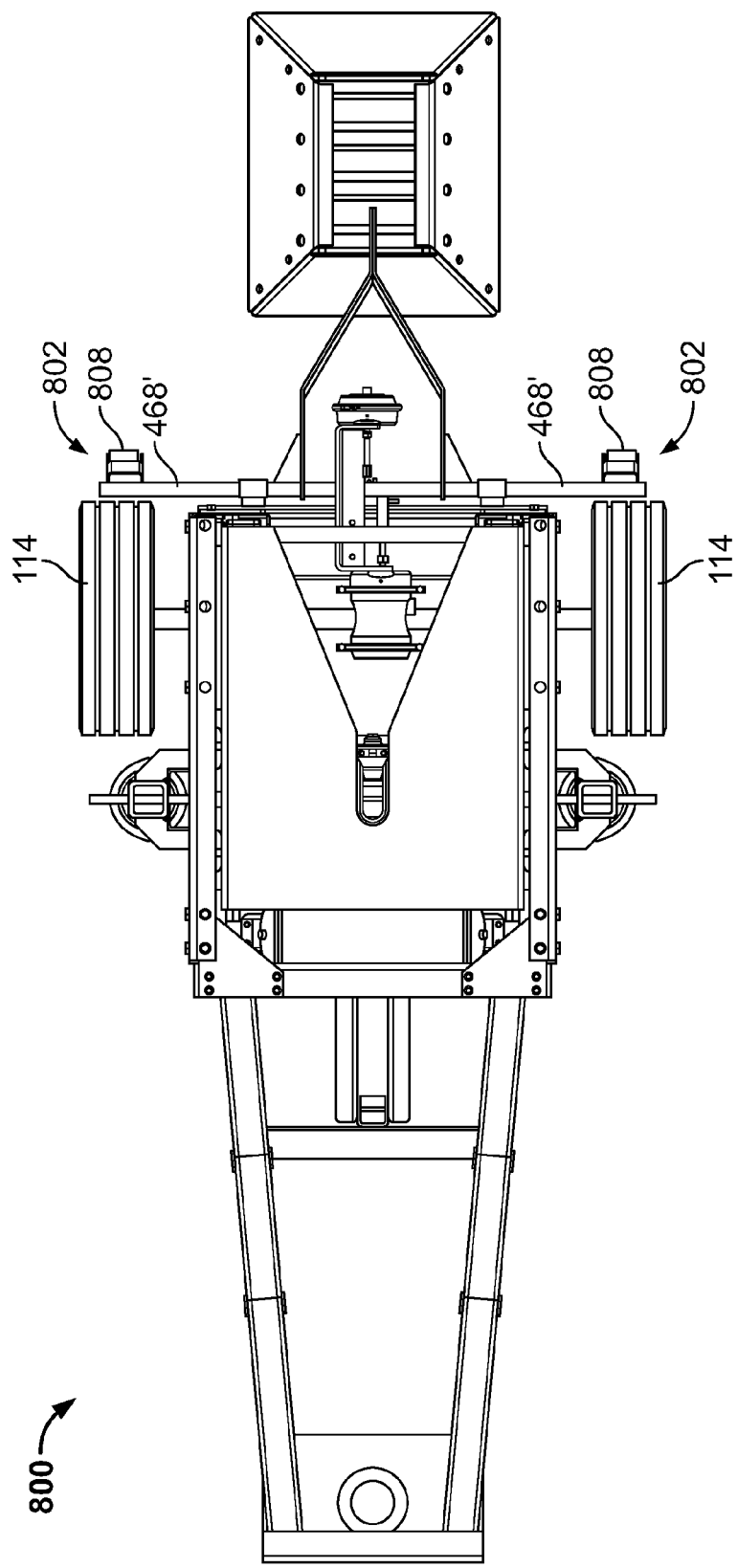
FIG. 32 is an overhead view of the alternate exemplary trailer stabilizer of FIG. 31.
Figure 33:
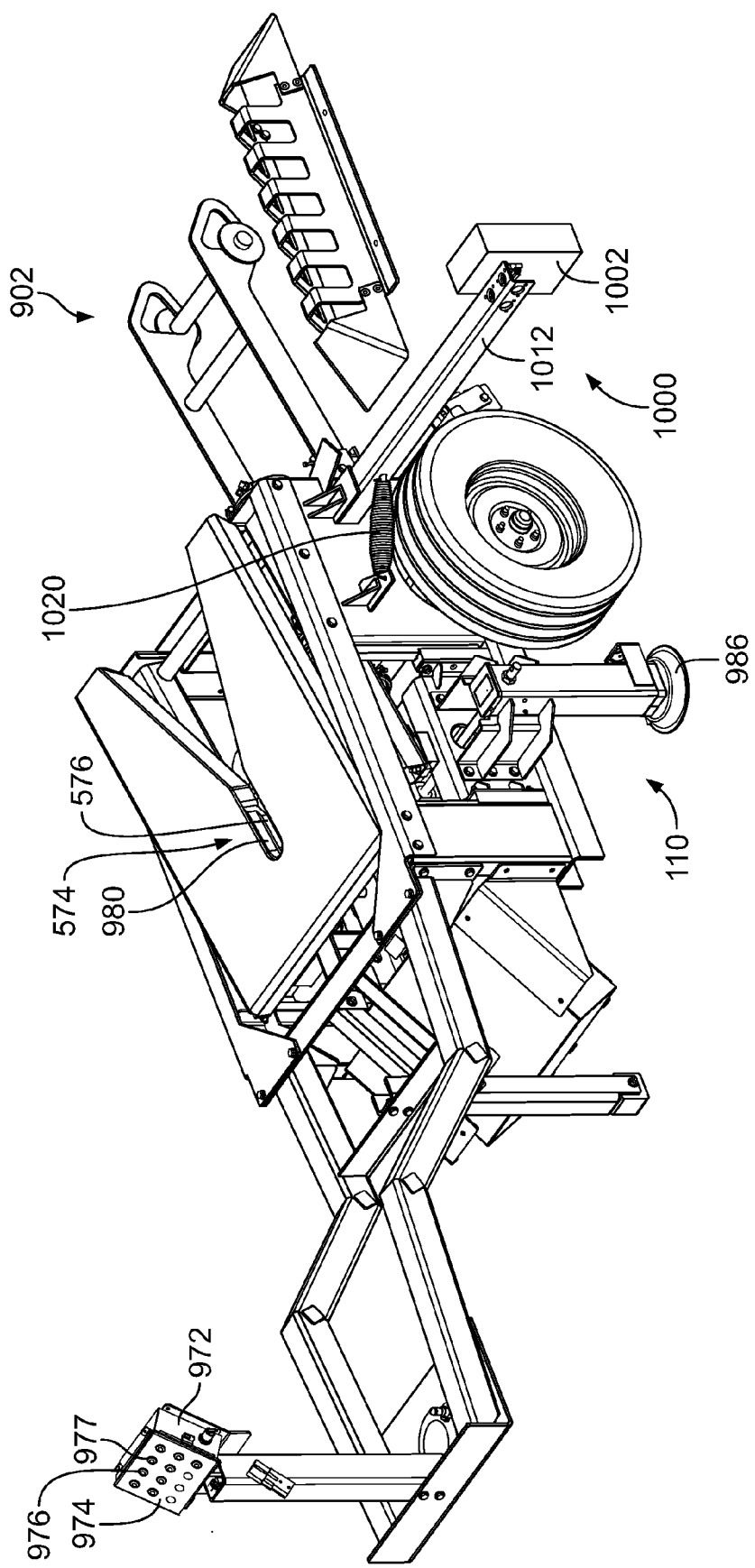
FIG. 33 is an elevated perspective view from the front left of a second exemplary trailer stabilizer in accordance with the instant disclosure showing certain features.
Figure 34:
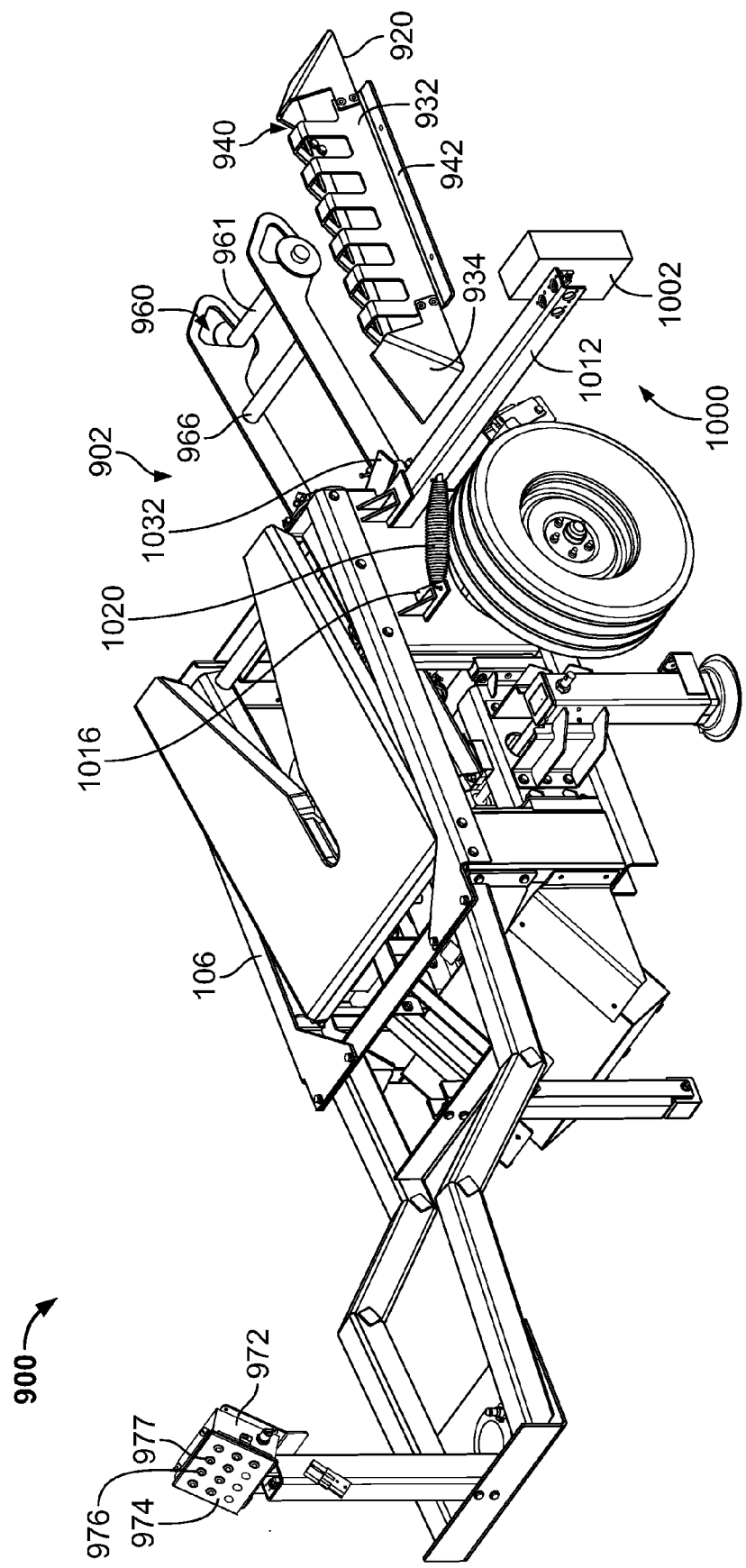
FIG. 34 is an elevated perspective view from the front left of a second exemplary trailer stabilizer in accordance with the instant disclosure showing other features.
Figure 35:
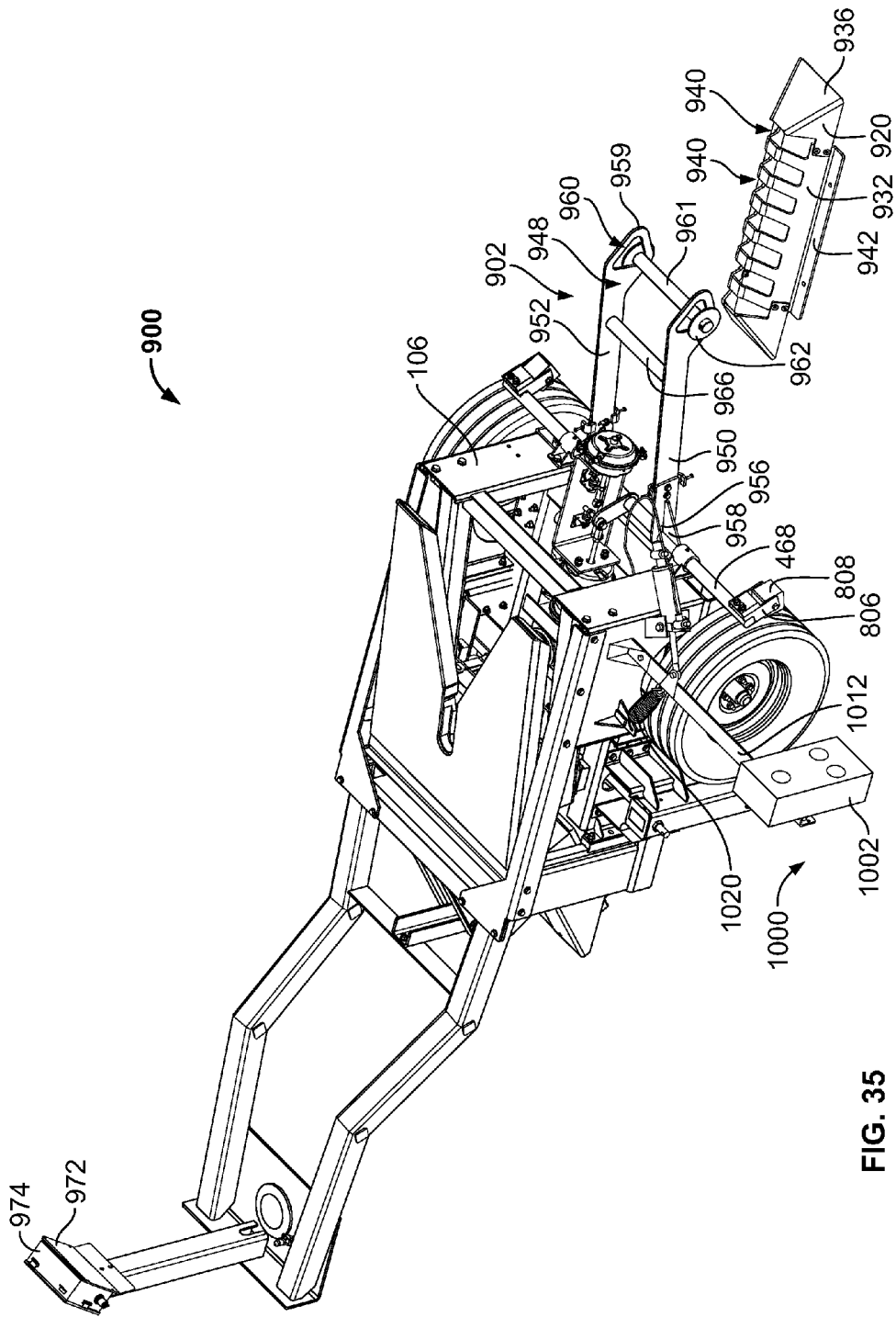
FIG. 35 is an elevated perspective view from the rear left of a second exemplary trailer stabilizer in accordance with the instant disclosure showing certain features.
Figure 36:
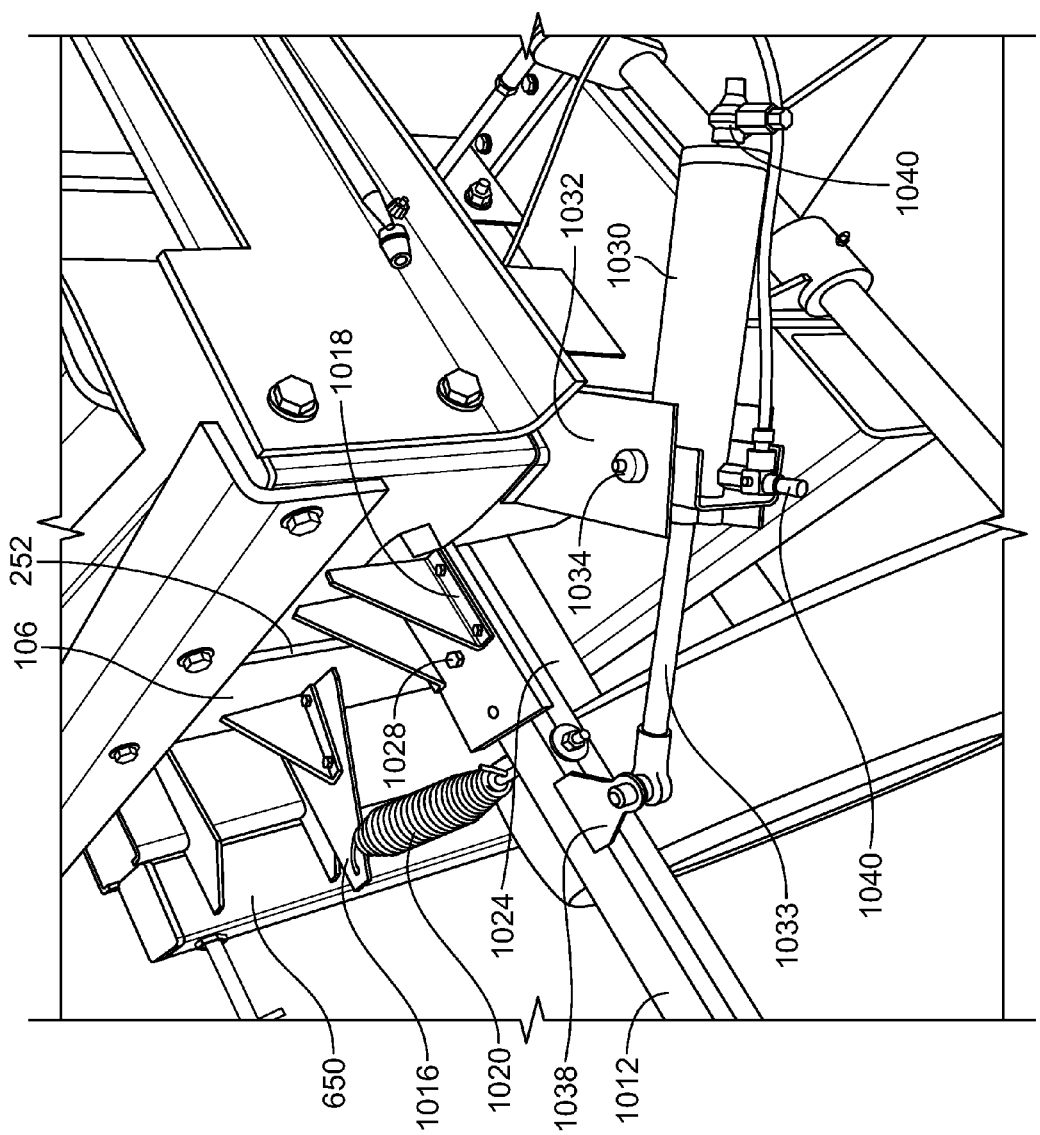
FIG. 36 is a magnified, elevated perspective view from the rear left of a second exemplary trailer stabilizer in accordance with the instant disclosure showing certain features.
Figure 37:
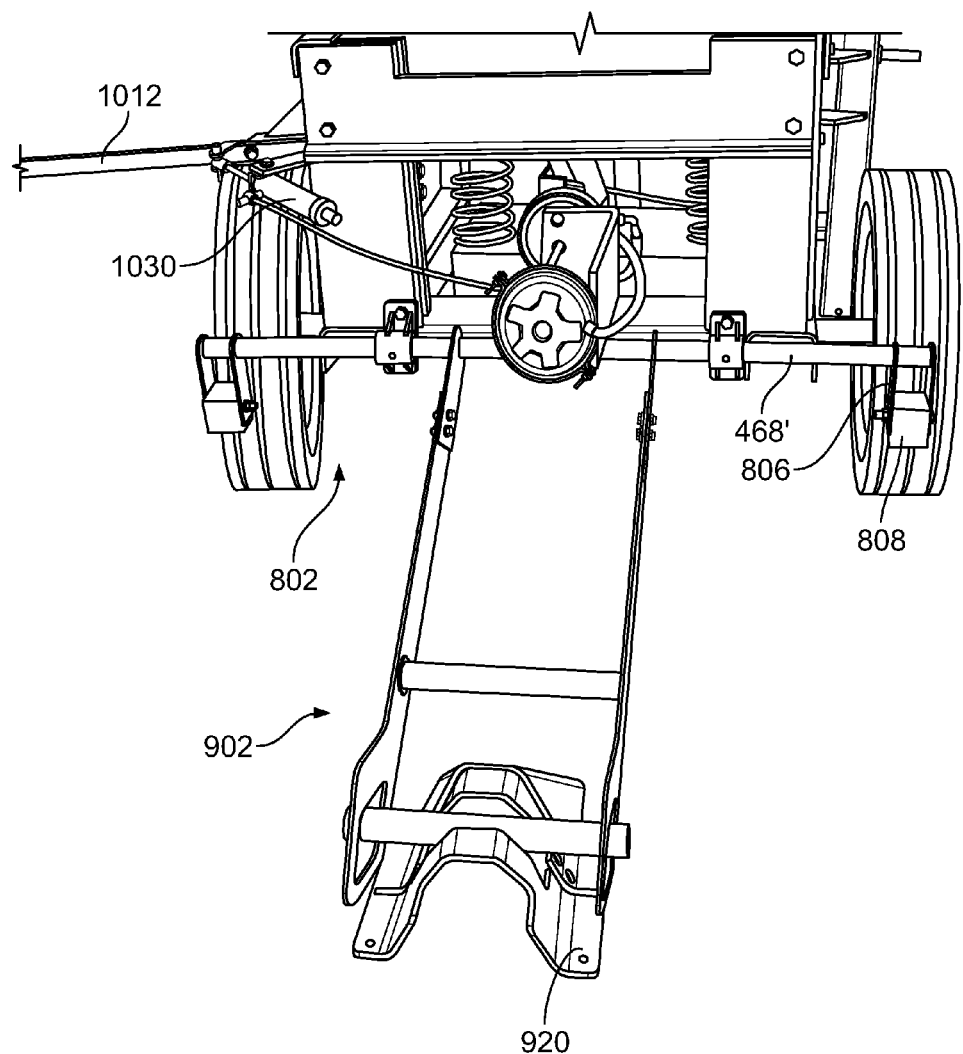
FIG. 37 is a rear view from the rear left of a second exemplary trailer stabilizer in accordance with the instant disclosure showing certain features.
Figure 38:
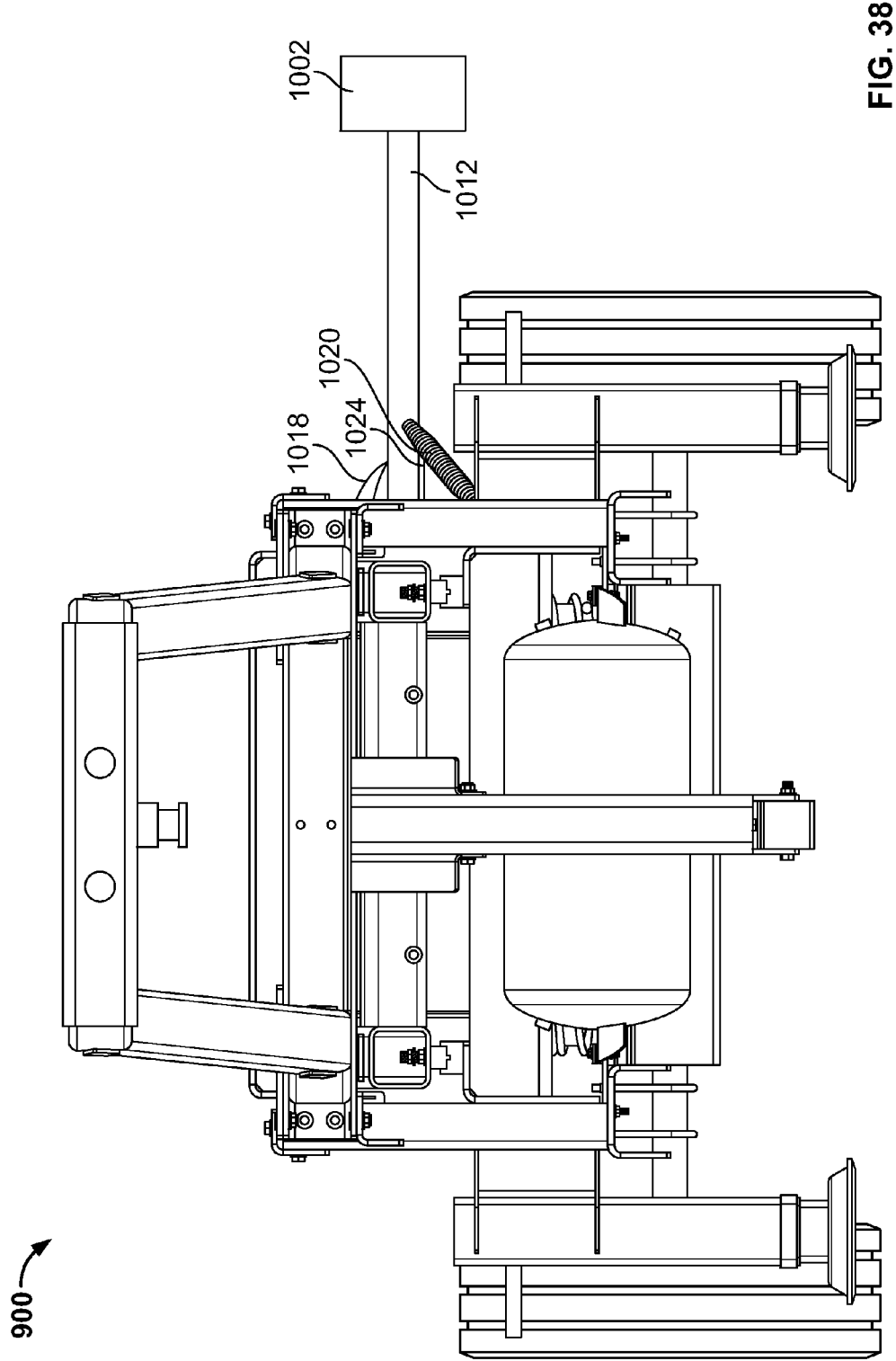
FIG. 38 is a frontal view from the rear left of a second exemplary trailer stabilizer in accordance with the instant disclosure showing certain features.
Figure 42:
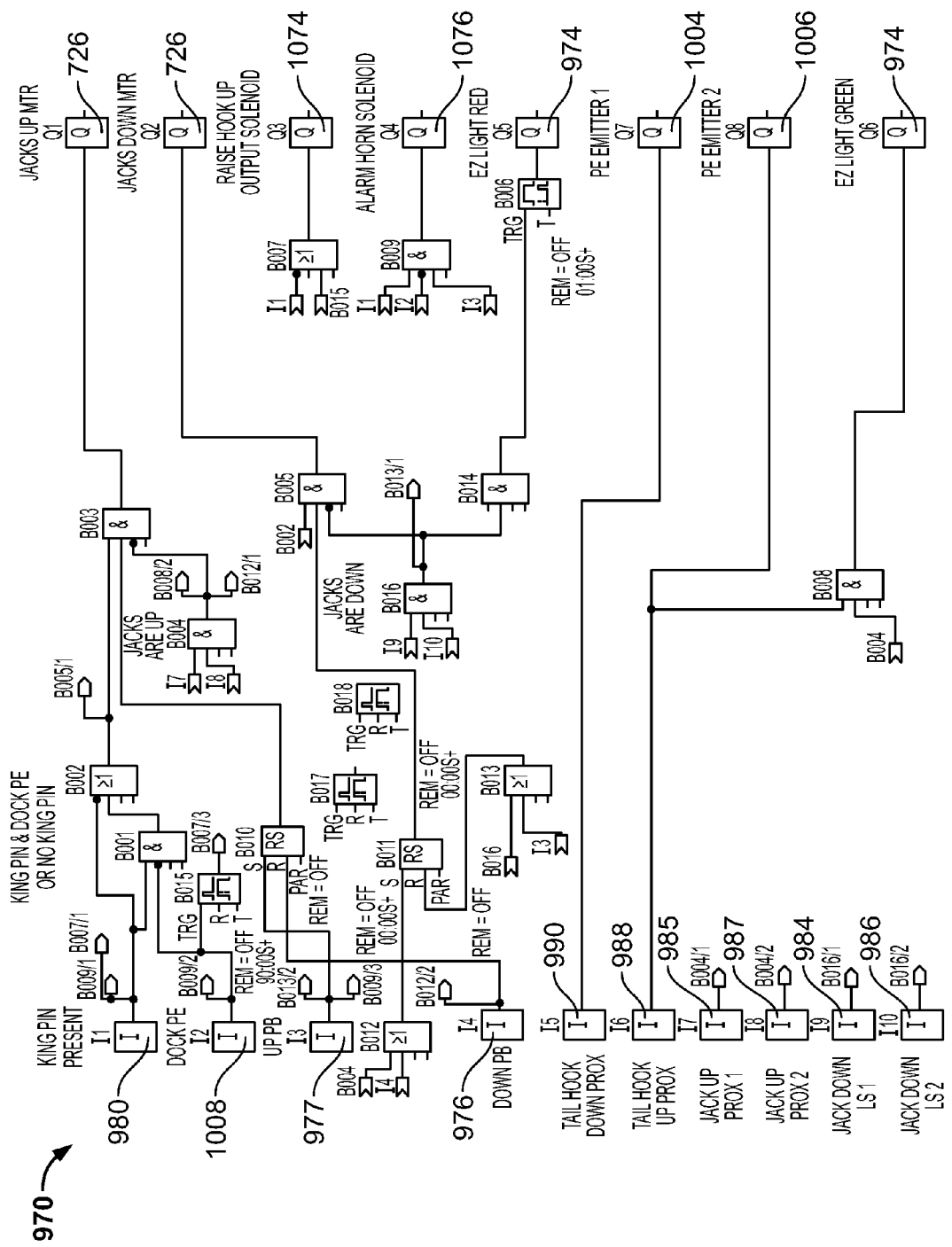
FIG. 42 is an exemplary wiring diagram showing at least a portion of the control structure of the control circuitry of the second exemplary embodiment relating to the stabilizer and the dock cabinet.
Figure 43:
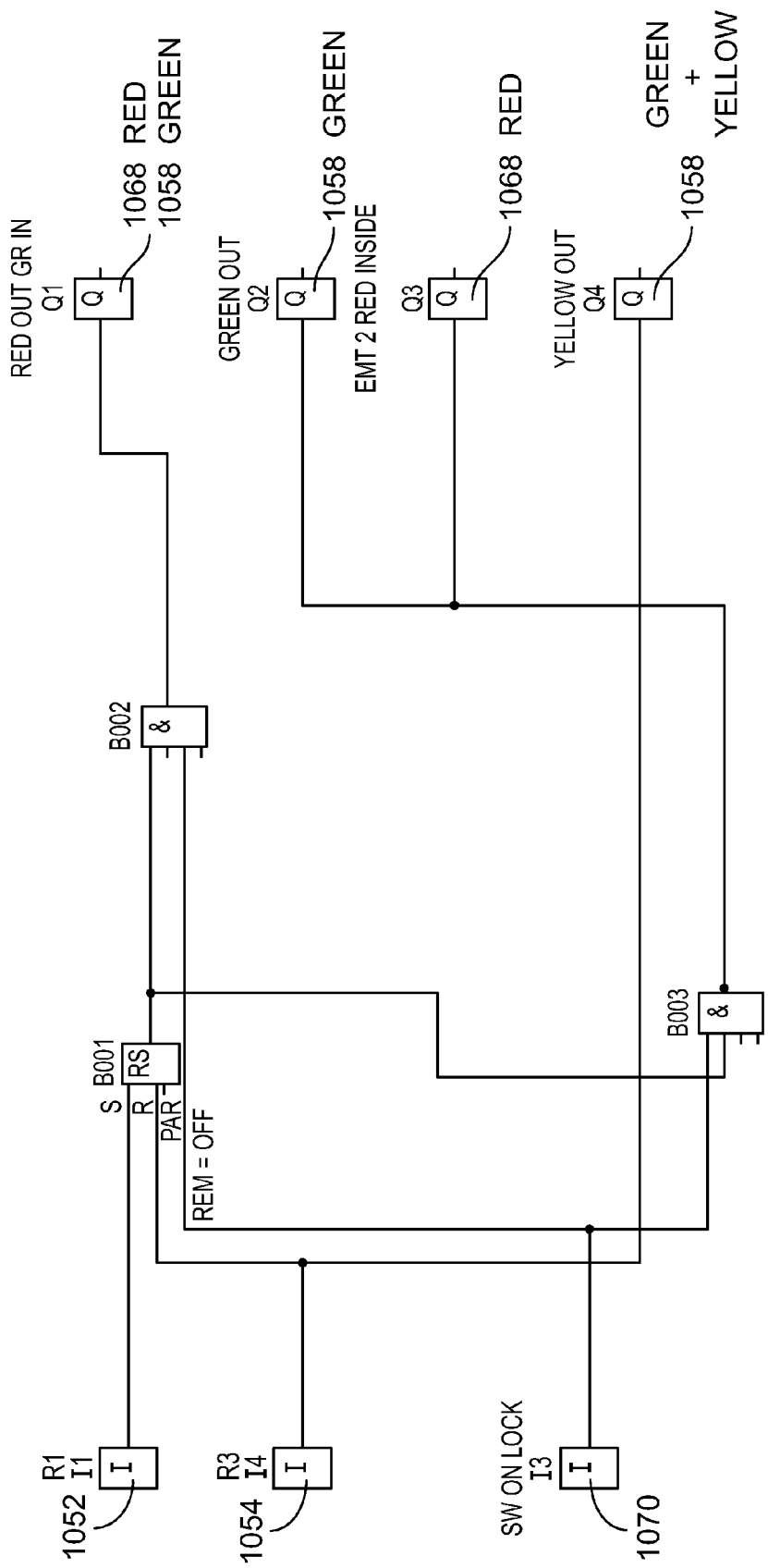
FIG. 43 is an exemplary wiring diagram showing at least a portion of the control structure of the control circuitry of the second exemplary embodiment as it relates to the interior warehouse cabinet.
Figure 44:
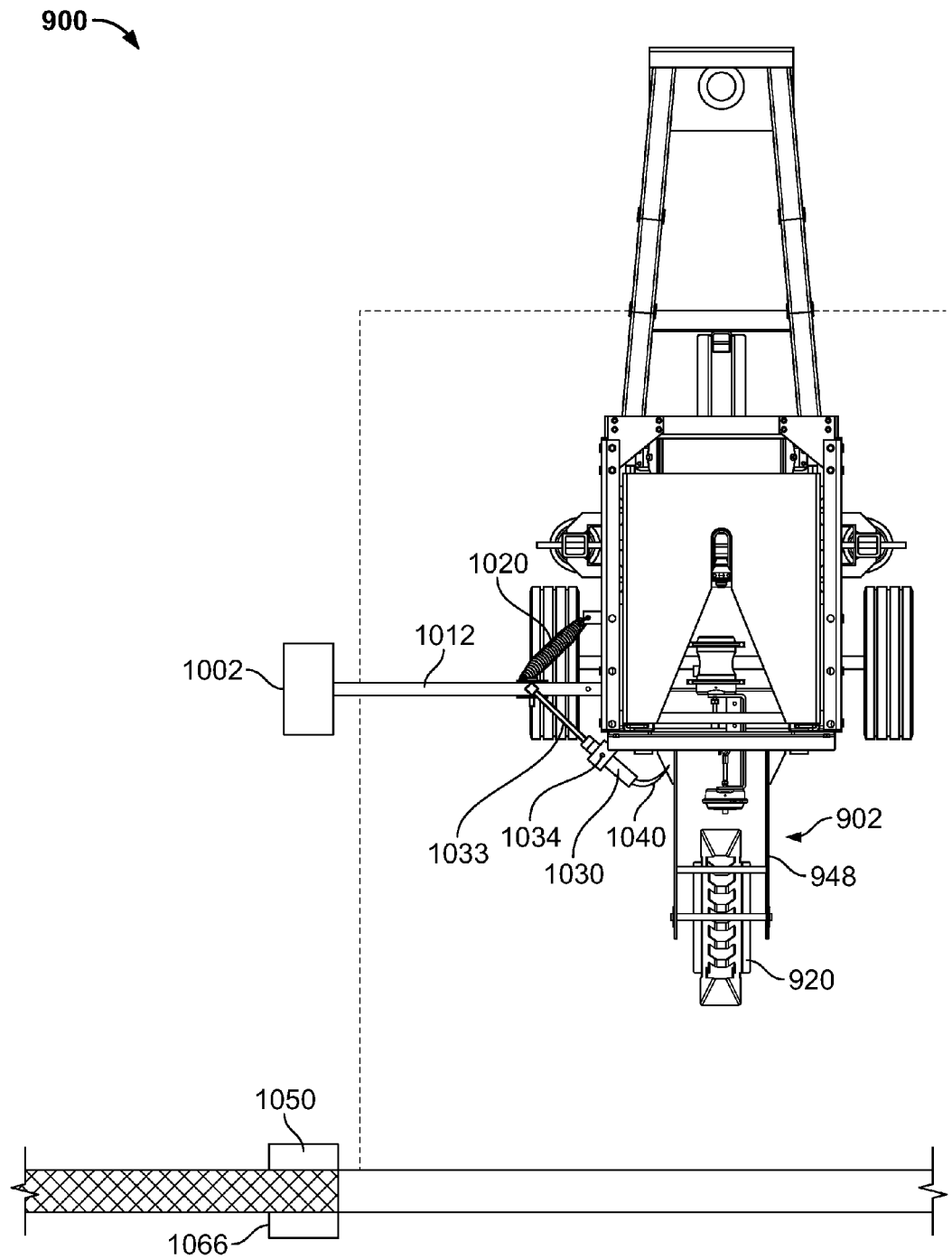
FIG. 44 is an overhead view of the second exemplary embodiment positioned underneath a parked trailer at a loading dock facility, along with an exemplary position of the dock cabinet and interior warehouse cabinet.

Referencing FIGS. 31 and 32, a further alternate exemplary embodiment 800 of a trailer stabilizer is identical to the first exemplary trailer stabilizer 100, but for wheel brakes 802. In exemplary form, the pivot shaft 468 of the repositionable hook assembly 116 is lengthened in the medial and lateral directions to extend outward to behind the wheels 114, thus forming a lengthened shaft 468'. Corresponding brackets 804 are mounted to the pivot shaft 468' right behind each wheel 114 and each include a pair of plates 806 that sandwich a rubber block 808 therebetween. The plates 804, 806 may be mounted to the rubber block 808 using any acceptable technique to retain the rubber block. In this exemplary embodiment, the plates 804, 806 include a through hole that is aligned with a through hole of the rubber block so that nut and bolt fasteners are utilized to secure the block to the plates.

In exemplary form, when the hook is in the retracted position (hook is up and disengaged from the lock box), the rubber block does not contact the wheels 114. But when the hook is in the extended position (hook is down and engaging the lock box) the rubber block comes in contact with the rear of the wheel 114. In this manner the rubber block acts as a stop to inhibit the wheels 114 from rotating when the hook is in the extended position. Those skilled in the art will realize that the brakes 802 may be employed by repositioning the hook even in the case where the hook has no lock box to interface with.

Referring to FIGS. 33-44, a second exemplary freight trailer stabilizer 900 is essentially the same as the first exemplary freight trailer stabilizer 100. However, the second exemplary trailer stabilizer 900 includes a different repositionable hook assembly 902 (as opposed to the repositionable hook assembly 116), the wheel brakes 802 discussed previously, a control system, and a dock notification and communication system. Because the trailer stabilizer includes almost all of the same structure and features as discussed with respect to the first exemplary freight trailer stabilizer 100, a detailed recitation of the features in common has been omitted for purposes of brevity. Accordingly, unless noted otherwise, the second exemplary freight trailer stabilizer 900 makes use of the same structure and features as the first exemplary freight trailer stabilizer 100.

Referring to FIGS. 33-37, the second exemplary freight trailer stabilizer 900 includes a different repositionable hook assembly 902. In exemplary form, this different repositionable hook assembly 902 is mounted to the cart frame 106 and adapted to interact with a lock box 920 in order to fasten the stabilizer 900 to the ground. The lock box 920 is adapted to be mounted securely to the ground using ground spikes, nails, or other similar fasteners (not shown) so that the lock box is not readily repositionable.

In exemplary form, the lock box 920 includes a corresponding right side ramp (not shown) and a left side ramp 932 cooperating with corresponding front and rear ramps 934, 936 to provide a frustopyramidal structure. The sides and top of the frustopyramidal structure are partially open and include a series of slots 940 that are sized to receive a drop bar of the repositionable hook assembly 902 in order to secure the repositionable hook assembly (and thus the stabilizer 900) to the ground. In particular, the slots 940 are incrementally spaced apart and inclined away from the stabilizer 900 so that once the drop bar is received initially within one of the slots 940, the trailer stabilizer may be slightly moved forward (away from the lock box 920) so that the drop bar falls down completely within a particular slot and thereafter sits upon the left and/or right side ramps. When the drop bar is captured within one of the slots 940, only minimal movement (forward or backward) of the stabilizer 900 is possible.

In exemplary form, the lock box 920 is fabricated from metal plate. However, in view of the aforementioned and following disclosure, those skilled in the art will readily understand that the described materials and techniques for forming the lock box comprises only a small subset of the materials and techniques that may be available to form a lock box 920. By way of example, the front and rear ramps 934, 936 are comprised of generally flat metal plates having a trapezoidal configuration. These plates 934, 936 are welded to a single, formed metal piece that comprises the right and left side ramps 932. In order to form the right and left side ramps 932 from a single piece of metal plate, a flat metal plate is stamped to create a series of cut-outs that will ultimately form the slots 940, as well as the general outline of the finished piece. After the plate has been stamped, the plate is bent to have a three-dimensional shape embodying the respective right and left sides interconnected by the top side. The bending of the plate is operative to convert the cut-outs into the slots 940.

Alternatively, the lock box 920 may be fabricated so the front and rear ramps 934, 936 are integrally formed with a portion of the right and left side ramps. In such a circumstance, a forwardmost and rearwardmost portion of the right and left side ramps 932 are integrally formed with the front and rear ramps 934, 936, thereby resulting in a three dimensional cap that may be welded to or otherwise fastened to the remaining portion(s) that defines the remainder of the left and right side ramps 932 and slots 940.

In order to secure the lock box 920 to the ground, a pair of pavement ties 942 are secured to opposite sides of the lock box. These pavement ties 942 may be comprised of any permanent fastener that is securely mounted to the ground and can withstand a predetermined amount of force. By way of example, the pavement ties are metal bands that are bolted to the ground using an embedded anchor (not shown). The pavement ties 942 may be welded, bolted, or otherwise fastened to the lock box 920. In exemplary form, the pavement ties 942 are removably mounted to the lock box 920 in order to allow the lock boxes to be removed for clearing operations including, without limitation, snow plowing.

The repositionable hook assembly 902 also includes a repositionable hook 948 that uses many of the same components as the first exemplary embodiment. In this case, the hook 948 is mounted to the pivot shaft 468 so that rotation of the pivot shaft results in arcuate movement of the hook, generally in an upward and downward direction. In this exemplary embodiment, the hook 948 comprises mirror image hook halves 950, 952. Each hook half 950, 952 comprises a bar stock section having a rounded proximal end 956 and a through orifice allowing throughput of the pivot shaft 468. Specifically, the bar stock sections 954 are welded to the pivot shaft 468 and gussets 958 are concurrently welded to the bar stock section and the pivot shaft. A distal end of the bar stock section includes an enlarged head 959 having a triangular opening 960. This triangular opening 960 accommodates a floating cylinder 961 that has a pair of washers 962 to inhibit substantial lateral movement of the cylinder. In other words, the washers operate to retain the cylinder 961 ends within the triangular openings 960 and thus have the cylinder spanning between the hook halves 950, 952. In this context, the term "floating" refers to the triangular openings 960 being considerably larger than the cross-section of the cylinder 961, which provides play of the cylinder within the openings as defined by the bounds of the openings. Finally, the hook halves 950, 952 are also coupled to one another using a cross-member 966 to reduce torsion between the hook halves.

Because the operation of the repositionable hook assembly 902 in terms of raising and lowering the hook 948, and the structure utilized to raise and lower the hook, is substantially the same as the structure utilized in the first exemplary embodiment, a duplication discussion has been omitted for purposes of brevity.

Referring to FIGS. 33 and 39-43, the second exemplary freight trailer stabilizer 900 includes a control system and a dock notification and communication system that work in tandem to impact the operation of the trailer stabilizer. The control system includes a control circuitry 970 housed within a control panel 972, which itself includes a visual display 974 and operator controls 976. In exemplary form, the visual display comprises a light that can be selectively illuminated, as well as illuminated in different colors. By way of example, the visual display 974 of the control panel 972 comprises a bulb housing containing a green light emitting diode (LED) and a red LED. As will be discussed in more detail hereafter, this structure provides for three options: (1) no light is illuminated; (2) the green LED is illuminated; and, (3) the red LED is illuminated.

The control panel 972 receives inputs from a plurality of different sensors. In exemplary form, the control system includes seven different sensors that provide indications about the position of various components of the second exemplary freight trailer stabilizer 900. A first of these sensors 980 is a king pin sensor. This sensor 980 comprises a proximity sensor that is positioned adjacent to a biased plunger (not shown) that extends into the portion of the king pin cavity 574 defined by the king pin block 576 (see FIG. 18). In this manner, whenever a king pin of a parked trailer is within the king pin block 576, the king pin will contact the biased plunger and displace the plunger in order that the proximity sensor 980 senses the displaced plunger and sends a signal to the control circuitry 970 indicative of the king pin being within the king pin block. Conversely, when no king pin of a parked trailer is within the king pin block 576, the plunger is biased away from the proximity switch 980 and the switch does not send a signal to the control circuitry 970 indicative of the king pin being within the king pin block. In addition to monitoring the position of a king pin, the control system also monitors the position of the jacks 650 of the repositionable jack assembly 110.

In exemplary form, the right side jack 650 includes a proximity sensor 984 mounted to the stationary portion of the screw jack leg 652 that detects when the boot (the portion of the jack contacting the ground) is fully raised. Likewise, the left side jack 650 includes a proximity sensor 986 mounted to the stationary portion of the screw jack leg 652 that detects when the boot (the portion of the jack contacting the ground) is fully raised. In this manner, both sensors 984, 986 are operative to communicate with the control circuitry 970 and indicate when each of the jacks 650 is fully raised. As will be discussed in greater detail hereafter, when the control circuitry receives signals from both sensors 984, 986 that the jacks 650 are fully raised, the control circuitry 970 turns off an electric motor 726 operatively coupled to the jacks. And the control system 970 also tracks when the jacks 650 are lowered to contact the ground.

In exemplary form, the drive shaft 712 engaging the right side jack 650 includes a magnet (not shown) being mounted thereto. The magnetic proximity sensor 985 is operative to detect the magnet as it rotates past the sensor. As discussed previously, a clutch 720 is coupled to the drive shaft 712 (see FIG. 25) so that when the jacks 650 are deployed, presuming one jack hits the ground before the other, the drive shaft to the jack hitting first will discontinue rotation, while the drive shaft to the other jack will continue to rotate until that jack reaches the ground. The sensor 985 sends a signal to the control circuitry 970 when the magnet is detected, as occurs once for each rotation of the drive shaft 712. But when the right side jack 650 reaches the ground, the drive shaft 712 no longer rotates. Based upon preprogrammed logic, the absence of a signal from the sensor 985 for a predetermined period of time is identified as the right side jack having reached the ground. Similarly, the drive shaft 712 driving the left side jack 650 also includes a magnet permanently mounted thereto and detectable by the left side magnetic proximity sensor 987. The sensor 987 sends a signal to the control circuitry 970 when the magnet is detected, as occurs once for each rotation of the drive shaft 712. But when the left side jack 650 reaches the ground, the drive shaft 712 no longer rotates. Based upon preprogrammed logic, the absence of a signal from the sensor 987 for a predetermined period of time is identified as the left side jack having reached the ground. After the control circuitry 970 determines that both jacks have reached the ground, a power source is disconnected from the motor 726, in this case an electric motor.

The control circuitry 970 is also communicatively coupled to a pair of sensors 988, 990 that indicate the position of the repositionable hook assembly 902. In exemplary form, a pair of proximity sensors 988, 990 are mounted to the bracket 490 (see FIG. 14) of the repositionable hook assembly 902 in order to track the relative position of the pivot arm 470. When the pivot arm 470 is rotated toward the airbag 460 the hook 948 is raised, while rotation of the pivot arm toward the second airbag 482 is operative to lower the hook. In this manner, a signal from the first hook sensor 988 to the control circuitry 970 indicates the hook 948 is raised, while a signal from the second hook sensor 990 to the control circuitry 970 indicates the hook is lowered (or engaged with the lock box 920). As will be discussed in more detail hereafter, the control circuitry uses the output from these sensors 988, 990 to control outputs to various output devices.

Referring to FIGS. 39-44, the dock notification and communication system interacts with the control system and vice versa to provide visual indications including, without limitation, that the stabilizer 900 is properly aligned, the jacks are or are not deployed, the hook is or is not deployed, the trailer is safe or not yet safe to load, and the parked trailer has or has not been loaded/unloaded.

Referring to FIGS. 33-44, the dock notification and communication system includes a repositionable arm 1000 that is mounted to the cart frame 106. The repositionable arm 1000 includes a sensor and transmitter housing 1002 that houses a pair of infrared (IR) transmitters 1004, 1006, and an infrared receiver 1008. In this exemplary embodiment, the IR transmitters 1004, 1006 use different frequencies to avoid information or signal crossing. An elongated, rectangular tubular pole 1012 is mounted to the housing 1002 at one end and pivotally mounted to the cart frame 106 at an opposite end. Specifically, the cart frame 106 includes a left rear frame wall 252 to which a pair of brackets 1016, 1018 are mounted. The first bracket is mounted closer to the jacks 650 and has mounted to it a damper 1020, in this case a coiled spring. The coiled spring 1020 is also mounted to the tubular pole 1012 and operates to bias the pole to the extended position (extending laterally from the stabilizer 900). As will be discussed in more detail hereafter, the pole 1012 floats with respect to the frame 106 when the stabilizer 900 is parked under the trailer and not coupled to a hustler. The second bracket 1018 is mounted closer to the hook 948 and extends laterally outward from the left side of the frame 106. The bracket includes opposing top and bottom parts that operate to sandwich an end of the pole therebetween. In exemplary form, the pole 1012 and bracket parts 1018 are fabricated from metal and a plastic bushing 1024 interposes the bracket parts and the pole to reduce friction. Each of the pole 1012, the bracket parts 1018, and the plastic bushings 1024 include an aligned through hole that receives a through pin 1028. In this manner, the pole 1012 and housing 1002 are able to pivot, about the pin, with respect to the stabilizer frame 106.

A pneumatic cylinder 1030 is concurrently mounted to the pole 1012 and the stabilizer frame 106. Specifically, a bracket 1032 is mounted to the left rear corner of the frame 106 and includes a coupling 1034 mounted to the cylinder 1030 that allows the cylinder to pivot about the coupling. The cylinder includes a piston 1033 that is coupled to the pole 1012 by way of a bracket 1038. The cylinder 1030 includes fittings 1040 operative the provide fluid delivery to the cylinder to move the piston inward and outward with respect to the cylinder. As will be discussed in more detail hereafter, the cylinder 1030 is operative to move the pole 1012 and housing 1002 between a lateral position (extending laterally out from the left side of the frame) and a storage position where the pole pivots approximately ninety degrees toward the rear of the stabilizer 900 to fold into the side and position the housing rearward.

The dock notification and communication system includes an exterior dock cabinet 1050 that houses a pair of IR receivers 1052, 1054 that are adapted to receive the IR signals sent from the IR transmitters 1004, 1006 housed within the transmitter housing 1002 of the repositionable arm 1000. As discussed previously, the first IR transmitter 1004 is transmitting at a first frequency and is oriented to align with the first IR receiver 1052. Similarly, the second IR transmitter 1006 is transmitting at a second frequency and is oriented to align with the second IR receiver 1054. In order to increase the likelihood of alignment, the IR transmitters 1004, 1006 have a predetermined spacing, while this predetermined spacing is maintained by the dock cabinet 1050 when mounting the IR receivers 1052, 1054. Moreover, the configuration of a triangular pattern is also maintained by the dock cabinet 1050. In the case of the transmitter housing 1002 associated with the stabilizer 900, the apex comprises an IR receiver 1008, while the two lower parts comprise the IR transmitters 1004, 1006. This same orientation is mirrored by the dock cabinet 1050 by orienting an IR transmitter 1056 at the apex to communicate to the IR receiver 1008, while the two lower parts comprise the IR receivers 1052, 1054 adapted to receive communication from the IR transmitters 1004, 1006.

In exemplary form, the dock cabinet 1050 is mounted to the exterior of a loading dock facility or similar building in a fixed orientation. In other words, the dock cabinet 1050 is adapted to maintain its position with respect to the loading dock facility, regardless of the position of the parked trailers or the position of the stabilizer 900. In this manner, it is the job of the hustler operator to ensure that the stabilizer is properly aligned so that the transmitters 1004, 1006, 1056 can send signals and be received by the receivers 1052, 1054, 1008. In this manner, the circuitry of the stabilizer is able to communicate with loading dock circuitry and vice versa. It should be noted that each loading dock bay would have its own dock cabinet 1050.

The dock cabinet 1050 may also include, or have remotely positioned from the cabinet, a visual display 1058 for the hustler operator. In exemplary form, the visual display includes a plurality of lights that are able to be selectively illuminated. By way of example, the visual display 1058 may include, without limitation, (1) a green pattern of LEDs; (2) a yellow pattern of LEDs; and, (3) a red pattern of LEDs. The pattern may take on any form such as, without limitation, geometric forms including a circle, a square, a triangle, and written text including "caution," "stop," and "go." In exemplary form, the visual display 1058 includes the ability to flash the lights or maintain the illumination. In this exemplary embodiment, the visual display includes three concentric circles 1060 of yellow, green, and red LEDs. As will be discussed in more detail hereafter, the LEDs are selectively illuminated to provide various information to the hustler operator.

The dock cabinet 1050 is also in communication with an internal cabinet 1066 on the inside of the loading dock facility or similar building. This internal cabinet 1066 includes a visual display 1068 and a lock/unlock switch 1070 to be manipulated by a dock worker inside of the loading dock facility or similar building. In this exemplary embodiment, the visual display 1068 comprises an illuminated tower having a red light and a green light. When the red light is illuminated, dock workers inside the loading dock facility or similar building know what it is not safe to load or unload the parked trailer at the loading dock opening. Conversely, when the light is green, workers know that it is safe to load or unload the parked trailer. It should be noted that each loading dock bay would have its own internal cabinet 1066.

An exemplary sequence for using the second exemplary freight trailer stabilizer 900 in conjunction with the operation of the control system and the dock notification and communication system will now be explained. Initially, the parked trailer is spotted at a loading dock facility or similar building so that the rear of the trailer is aligned with and against a loading dock bay. At this time, the landing gear of the trailer are down and the trailer king pin is exposed.

An exemplary sequence begins by a hustler operator coupling to the stabilizer 900 and coupling an air supply and an electrical supply to the stabilizer and putting the stabilizer in transport mode. It should be noted that in this exemplary sequence, the stabilizer 900 is not under a trailer but is simply sitting out in the yard. Mounting the stabilizer 900 to the hustler includes coupling the fifth wheel of the hustler with the king pin 102 of the stabilizer. After coupling to the king pin 102 of the stabilizer, the hustler operator couples air and electric supplies to the stabilizer 900 using electric and pneumatic adapters (glad-hands). Supplying electricity to the control circuitry and air via the glad-hands is operative to raise the hook 948, release the wheel brakes 802, and ensure the repositionable arm 1000 is folded against the frame 106. Thereafter, the hustler operator is dispatched to position the stabilizer underneath a trailer so it can be unloaded. And the hustler operator visually confirms that he is at the right bay by confirming that the visual display 1058 of the dock cabinet 1050 is displaying a green light.

In exemplary form, the hustler operator backs the stabilizer 900 underneath the trailer so that the king pin of the trailer is aligned with the tapered cutout 572 and ultimately the king pin enters the king pin cavity 574. In particular, the stabilizer 900 is adapted to be backed under the trailer in a straight line with the hook pointing toward the rear of the parked trailer. In this orientation, the stabilizer 900 should be longitudinally aligned with the trailer. As the hustler operator back the stabilizer 900 underneath the parked trailer, ultimately, the kingpin of the trailer will reach the stop at the proximal end of the cavity 574, thereby limiting the distance underneath the trailer that the stabilizer 900 may be positioned. After reaching this point, the hustler operator will realize that the stabilizer cannot be backed any farther underneath the parked trailer and begin to disengage from the stabilizer. At the same time, presuming the king pin remains within the cavity 574, the king pin sensor 980 sends a signal to the control circuitry 970 that the kingpin is within a predetermined tolerances for disengaging the stabilizer 900 from the hustler. At the same time, the visual display 1058 of the dock cabinet 1050 continues to display a green light, while the visual display 1068 of the internal cabinet 1066 displays a red light.

The hustler operator then disengages or disconnects the air supply from the hustler to the stabilizer 900. This action causes a series of events. One such event is that the absence of positive pressure on the hook 948 is operative to lower the hook so that that hook engages the lock box 920. Unless the hook 948 falls to the bottom of one of the slots 940, the proximity sensor 990 will not detect that the hook has been correctly deployed. As will be discussed, if the hook 948 is not properly deployed, the hustler operator may have to slightly move the stabilizer forward or rearward to seat the hook within the lock box 920. At the same time the hook 948 is being repositioned to engage the lock box 920, the repositionable arm 1000 swings out laterally from the side of the stabilizer 900 to a generally perpendicular position. In this position, the housing 1002 of the arm 1000 should be aligned with the dock cabinet 1050 so that the transmitters 1004, 1006, 1056 can communicate to the receivers 1008, 1052, 1054. The swing arm 1000 is principally repositioned to a deployed position by the damper 1020. But it should be noted that because the damper 1020 is responsible for repositioning the arm 1000 in the absence of pneumatic pressure, objects contacting the arm may be able to overcome the bias of the damper. But in such a case, presuming the contact is temporary, the arm 1000 will return to the deployment position (extending laterally outward from the stabilizer frame). But during this time, a number of problem conditions may occur.

The problem conditions that may occur include not properly positioning the stabilizer 900 under the parked trailer. This condition can be remedied simply by the hustler operator repositioning the stabilizer. The hustler operator will know the stabilizer needs to be repositioned because of a number of conditions. First, if the stabilizer 900 is not positioned properly, the transmitters 1004, 1006, 1056 cannot communicate to the receivers 1008, 1052, 1054. At the same time, if the hook 948 is not fully down into one of the slots 940, the proximity sensor will not send feedback to the control circuitry 970. Before the operator can deploy the repositionable jack assembly 110, because the control circuitry will not provide power to the motor 726, the control circuitry requires two conditions to be satisfied. The first condition is that the hook 948 is properly engaged, which is evidenced by a signal from the proximity sensor 990. The second condition is that the IR receiver 1008 of the repositionable arm 1000 receives a signal from the IR transmitter 1056 of the dock cabinet 1050 indicating that the stabilizer 900 is properly aligned. Unless both conditions are met, the control circuitry 970 will not power the electric motor to reposition the repositionable jack assembly 110. But both conditions can be met by having the hustler operator properly align the stabilizer 900 under the parked trailer.

Presuming the trailer stabilizer 900 is properly positioned so that the transmitters 1004, 1006, 1056 can communicate to the receivers 1008, 1052, 1054, and the hook 948 has properly engaged the lock box 920, the visual display 1058 of the dock cabinet 1050 illuminates a yellow light or set of lights. In other words, after the stabilizer 900 is properly positioned so the king pin is received, the transmitters and receivers are aligned, and the hook 948 is properly deployed, the visual display 1058 of the dock cabinet 1050 illuminates both a green and a yellow light (because the green light has not been extinguished. In order for this to occur, the control circuitry 970 has received a signal from the tail hook proximity sensor 990 indicative of the tail hook being properly positioned, and then sends a signal via the first IR transmitter 1004 to the first IR receiver 1052 indicating that the tail hook 948 is secure. After these conditions have been met, the control circuitry 970 allows power to go to the motor 726.

After the hook 948 engaged and the dock cabinet illuminates the yellow and green lights, the control circuitry 970 allows the hustler operator to deploy (i.e., lower) the repositionable jack assemblies 110. As discussed previously, the control panel 972 includes a visual display 974 and operator controls 976. Among the operator controls are separate buttons for raising and lowering the jacks 650. Accordingly, when the operator wants to lower the jacks 650, the operator simply presses the down jack button on the control panel 972. Thereafter, the deployment of the jacks 650 is automated. The control circuitry 970 receives the input from the control panel 972 button to lower the jacks 650 and causes the motor 726 to be turned to lower the jacks 650. In exemplary form, the jacks 650 comprise screw jacks and the motor is coupled to a transmission 724 shaft having individual clutches 720 that are mounted to the transmission shaft and respective drive shafts 712. The control circuitry continues to power the motor 726 until both proximity switches 984, 986 provide an indication that the jacks are fully down. As mentioned previously, each drive shaft 712 includes a magnet that is detected by a respective proximity switch 984, 986 as the shafts rotate to lower the jacks 650. The control circuitry 970 is programmed to shut off the motor after both proximity switches indicate the further rotation of the drive shafts is not occurring. This may occur, for example, because the magnet is not being sensed by the proximity sensor 984, 986 for a predetermined period of time (e.g., 0.5 seconds) or the proximity sensor continues to sense the magnet for more than a predetermined, constant period of time (e.g., 0.5 seconds). Because the surface that the stabilizer is sitting on may be uneven or may have debris underneath one or both jacks, it is not always the case that the jacks will be lowered to the same extent. Accordingly, to accommodate for varying heights of deployment, the clutches allow the transmission shaft to rotate, but not rotate the corresponding drive shaft when the bottom of the jack 650 is touching the ground (including any ground debris, etc.).

It should be noted that in lieu of the magnetic proximity switches, one may use limit switches mounted to the bottom of each jack 650.

After the jacks have been deployed, the visual display 974 of the control panel 972 illuminates a red light. When the red light illuminates on the control panel 972, a signal is sent via the control circuitry 970 to the second IR transmitter 1006 to transmit a signal indicative of the jacks 650 being deployed. This IR signal is received by the second IR receiver 1054, which causes the visual display 1058 of the dock cabinet 1050 to change to a red light and extinguish the yellow and green lights. After the hustler driver sees the red light of the dock cabinet 1050, the operator knows that both the jacks 650 and the hook 948 have been properly deployed and he can disconnect the electric power supply to the stabilizer 900, disconnect from the stabilizer king pin, and go on to his next task. By disconnecting the power supply to the stabilizer, the control circuitry and all electrical circuitry of the stabilizer is unpowered. In other words, the IR transmitters 1004, 1006 are no longer transmitting to the IR receivers 1052, 1054 of the dock cabinet 1050.

The red light of the visual display 1058 of the dock cabinet 1050 also has an impact on the internal cabinet 1066. Specifically, prior to the visual display turning on the red light, a loading dock person on the inside of the facility could turn the lock/unlock switch, but the visual display 1068 would remain red. But after the outside dock cabinet 1050 light turns red, the loading dock person on the inside of the facility has the ability to turn the switch to the lock position and the visual display 1068 will illuminate the green light. In other words, until the stabilizer 900 is deployed properly and completely, as documented by the outside dock cabinet 1050, loading dock personnel cannot change the visual display 1068 on the inside to green, thereby signaling that it was safe to load or unload the parked trailer. It should also be noted that as long as the visual display 1068 displays a green light, the hustler operator will be unable to remove the stabilizer 900. Simply put, the warehouse personnel control when the stabilizer is removed and must do so by first turning the switch 1070 to the unlock position, thereby changing the visual display 1068 back to a red light and then having the internal cabinet 1066 communicate with the dock cabinet 1050. While the visual display 1068 on the inside of the warehouse is green, a hustler operator cannot remove the stabilizer 900. The following is a description of the structure and process that would inhibit removal of the stabilizer 900 while the visual display 1068 of the internal cabinet 1066 is illuminated green (indicative of a safe condition to load or unload the trailer).

First, presuming one of the warehouse personnel does not turn the switch 1070 to the unlock position on the internal cabinet 1066, the visual display 1058 of the dock cabinet 1050 will remain a red light. When the visual display of the dock cabinet 1050 is red, the trailer stabilizer 900 cannot be removed. The first indication to the hustler operator is a visual one in that the light of the display 1058 is red instead of green.

Second, when the display 1058 is red instead of green, the transmitter of the 1056 of the dock cabinet 1050 is dead. Yet the IR transmitter 1056 of the dock cabinet 1050 needs to be operative to send a signal to the IR receiver 1008 so that the control circuitry 970 will provide power to raise the jacks 650 and air to raise the hook 948. And if the hustler operator has not hooked up the electric connection, the entire system on the stabilizer is dead. More specifically, the control circuitry 970 controls a center return solenoid 1074 that is operative to vent any air pressure imparted to the system when the electrical system of the stabilizer 900 is dead or if the IR transmitter 1056 of the dock cabinet 1050 has not sent a signal to the IR receiver 1008 of the aim 1000. In other words, when the control circuitry 970 is powered, the circuitry is looking for a signal from the IR transmitter 1056 of the dock cabinet 1050 that it is appropriate to remove the stabilizer 900. And this signal will never occur when the indicator light is red or if power is not provided to the system. So if the red light of the display 1058 is on, and the hustler operator attempts to remove the stabilizer 900 by hooking up the air supply gladhand, the air in the stabilizer system will vent. As an additional safety feature, if the hustler operator hooks up the electric power supply and the air supply, and then attempts to raise the jacks 650, the operation of attempting to raise the jacks by pushing one of the operator controls 976, the control circuitry shifts the solenoid valve 1074 to vent the air through an on-board air horn 1076 the creates loud horn sound telling the operator and surround people that the operator is erroneously attempting to remove the stabilizer. But presuming the warehouse personnel turns the switch 1070 to the unlock position on the internal cabinet 1066, the visual display 1058 of the dock cabinet 1050 will discontinue illuminating the red light and now illuminate the green light.

The green light of the dock cabinet visual display 1058 is the first signal to a hustler operator that it is appropriate to remove the stabilizer 900 because the trailer is ready to leave the warehouse. This also presumes that the IR transmitter 1056 of the dock cabinet 1050 has been operative to send a signal to the IR receiver 1008 so that the control circuitry 970 will allow removal of the stabilizer 900.

In order to remove the stabilizer 900, the hustler operator couples the fifth wheel of the hustler to the king pin 102 of the stabilizer. In addition, the operator couples the electric power connection to the stabilizer 900. The operator first raises the jacks 650 by pushing the jack up button 977 on the control panel. The control circuitry then sends a signal to the motor 726 to rotate the motor in an opposite direction to raise the jacks 650. Each of the jacks includes a proximity sensor 984, 985 that signals the control circuitry when the jacks are fully raised. This fully raised condition may not be met by turning the drive shafts 712 equally, so the control circuitry waits until both proximity sensor 984, 985 signal that each jack is fully raised. After receive signals from both sensors 984, 986 that the jacks have been raised, the control circuitry 970 discontinues power to the motor 726 and the green light illuminates on the visual display 974 indicating the jacks are up. Thereafter, the control circuitry 970, presuming the air lines are coupled to the stabilizer, automatically raises the hook 948 and folds in the arm 100 to lay along side the stabilizer side. At this point, the stabilizer may be removed from underneath the trailer and repositioned under another trailer or stored by discontinuing engagement with the hustler and allowing the stiff leg assembly 108 and the wheels 114 to hold up the stabilizer. At the point in time the stabilizer 900 is disconnected from the hustler, the absence of air pressure results in application of the brakes and dropping of the hook 948.

Referencing FIGS. 45-51, another exemplary trailer support 101 includes a frame 121 and an axle 141 mounted to the frame 121. The axle 141 includes one or more wheels 161 mounted proximate the ends of the axle 141. In this exemplary embodiment, the axle 141 includes tandem wheels 161 mounted at each end, with the tandem wheels including an associated braking assembly 181. However, it should be noted that the wheels 161 are not required to include a braking assembly 181.

Figure 45:
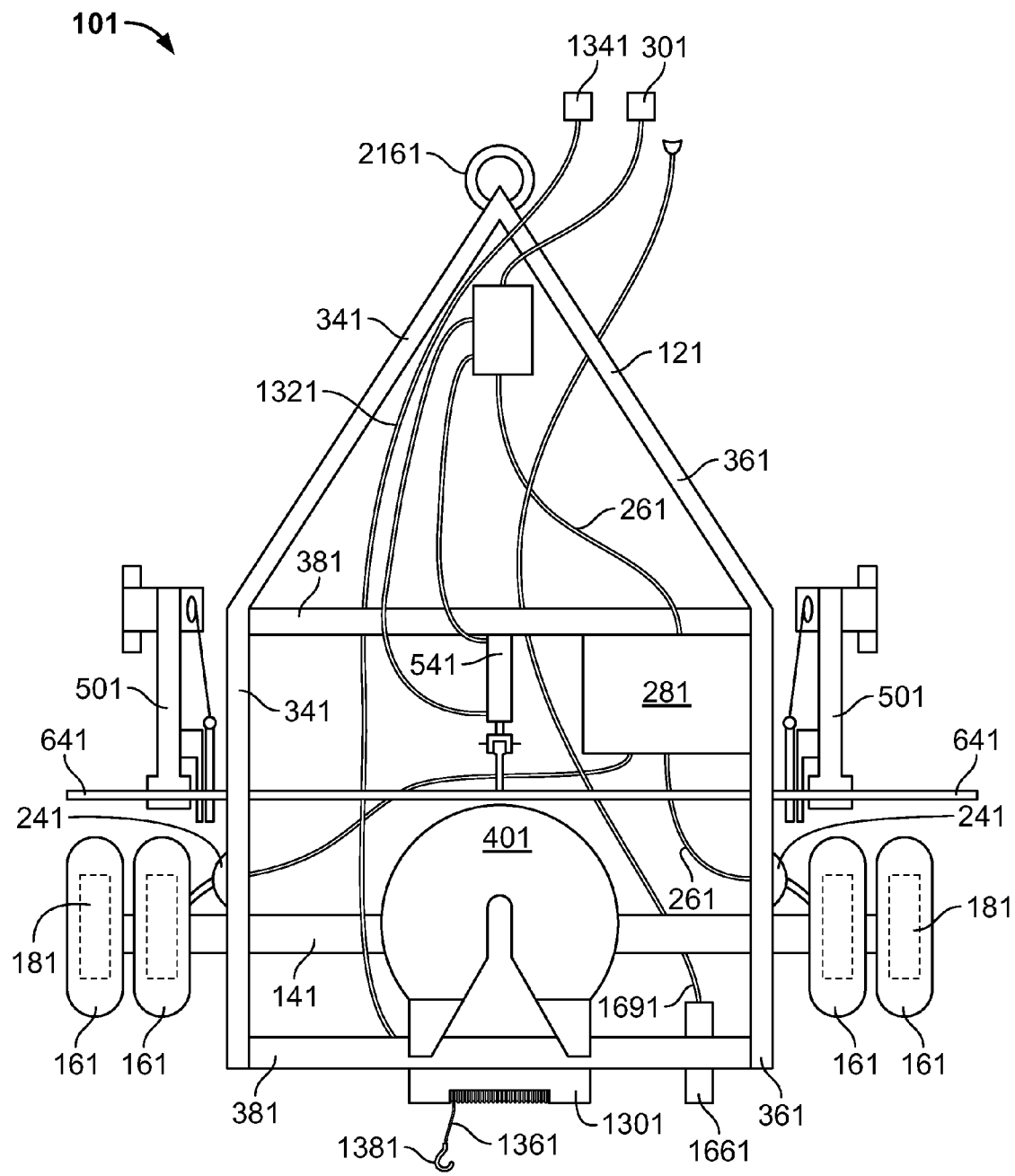
FIG. 45 is an overhead view of an exemplary trailer stabilizer in accordance with the instant disclosure.
Figure 46:
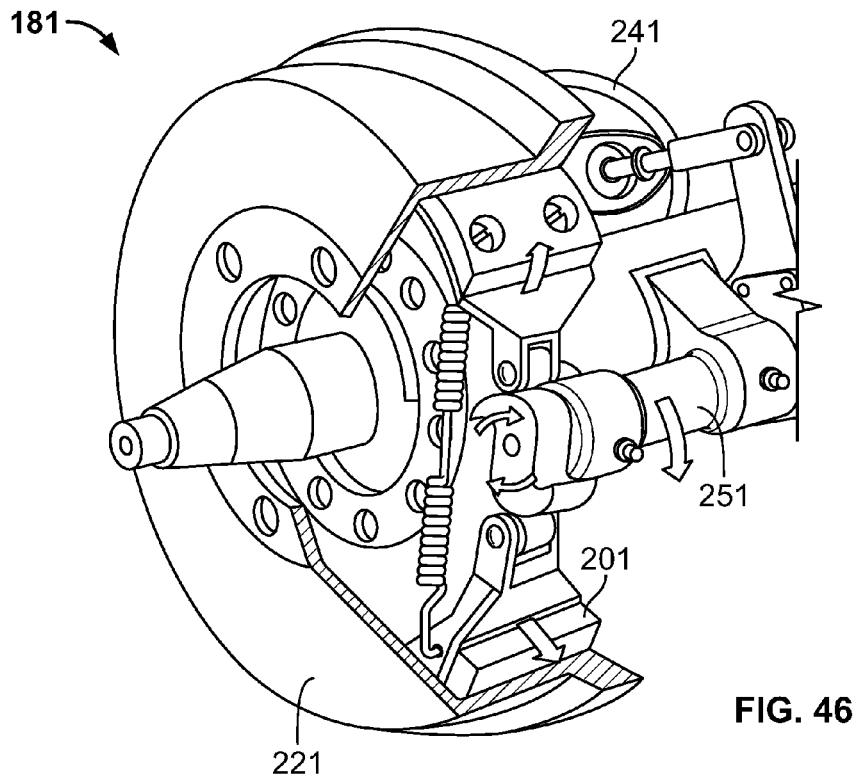
FIG. 46 is a perspective, cut away view of an exemplary brake assembly for use with the exemplary trailer stabilizer of FIG. 45.
Figure 47:
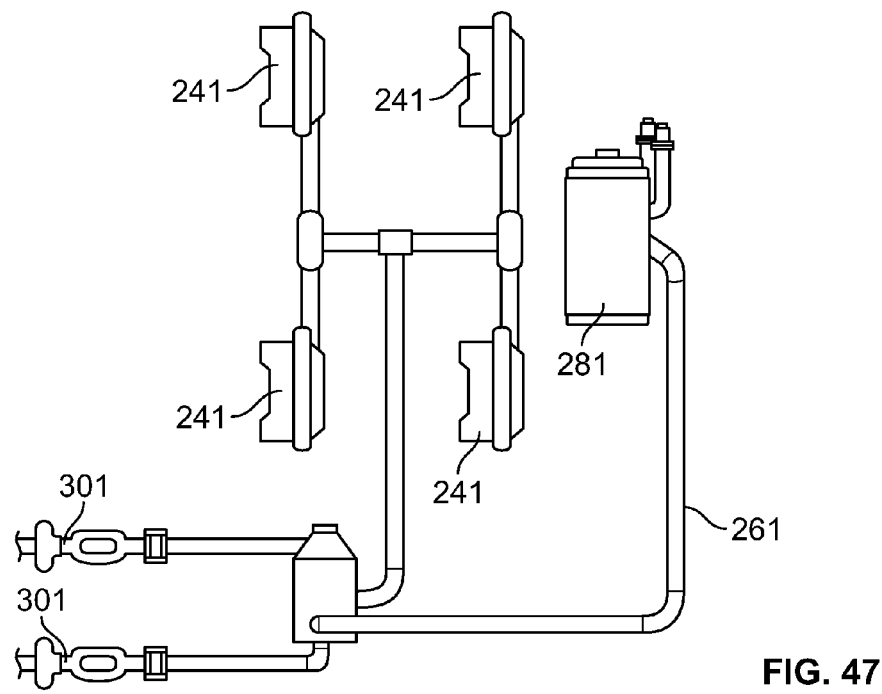
FIG. 47 is a schematic diagram of an exemplary braking system for use with the exemplary trailer stabilizer of FIG. 45.

Referring specifically to FIGS. 45-47, the braking assembly 181 includes a brake pad 201 which applies a force necessary to either a drum or disc 221 to retard rotation of the brake drum and wheel 161 with respect to the axle 141. A pneumatic brake cylinder 241 is coupled to the brake pads 201 by way of a push rod and cam shaft 251 in order to force the pads 201 against the drum 221 after a predetermined positive pressure is reached within the pneumatic lines 261 feeding the brake chamber. However, the brake cylinder 241 is also operative to force the pads 201 against the drums 221 when insufficient air pressure occurs within the pneumatic lines 261 feeding the cylinder 241. By way of example, if an air leak occurs within the pneumatic line or a yard truck 2001 (see FIG. 52) is not pneumatically coupled to the trailer support 101, the brake pads 201 will engage the drums 221 to inhibit rotation of the wheels 161. In other words, it takes a positive air pressure within the pneumatic brake lines 261 in order to discontinue engagement between the brake pads 201 and the drums 221. In this exemplary embodiment, the pneumatic lines 261 are in series with a compressed air storage vessel/tank 281 that is mounted to the frame 121. Thus, the compressed air storage vessel 281 provides an on-frame reservoir of compressed air. As will be discussed in more detail hereafter, the pneumatic lines 261 also includes quick connects 301 (e.g, a glad hand) adapted to be coupled to quick connects 321 of the yard truck 2001 in order for the yard truck to supply compressed air to the braking assembly 181.

Referring back to FIG. 45, the frame 121 includes a pair of C-shaped cross-section frame rails 341, 361 that are equally spaced apart from one another and oriented in parallel toward the rear of the trailer support 101. Toward the front of the trailer support 101, the frame rails 341, 361 are angled toward one another and eventually converge proximate the front of the trailer support. For the sections of the frame rails 341, 361 oriented in parallel, one or more cross-members 381 are joined to the frame rails, such as by welding or bolted fasteners. The cross members 381 may optionally include a block C-shape cross-section.

The frame 121 also has mounted to it a fifth wheel 401. Exemplary fifth wheels 401 include class 6, 7, and 8 fifth wheels such as the Fontaine No-Slack 6000 and 7000 Series, available from Fontaine International (www.fifthwheel.com). In this exemplary embodiment, the fifth wheel 401 is mounted in an elevated fashion above the frame rails 341, 361 using conventional nut and bolt fasteners. Those skilled in the art will understand that other fifth wheels 401 besides a Fontaine No-Slack may be utilized so long as the fifth wheel is operative to selectively engage and disengage a king pin of a freight trailer. It should also be noted that the king pin lock/receiver may be pneumatically, electrically, or hydraulically operated, or may simply be manually operated. Those skilled in the art are familiar with the various types of fifth wheels and the various types of locks/receivers that hold the king pin of a freight trailer in place until it is intentionally released.

Referencing FIGS. 45 and 48-50, the trailer support 101 may also include a pair of repositionable wheel chocks 501 that operate to retard rolling motion of the wheels 161 when deployed. In exemplary form, each wheel chock 501 is mounted to a repositioning device 521 that utilizes fluid power (pneumatic, hydraulic, etc.) to switch between deployment and storage of the wheel chocks 501. It should also be noted that the wheel chocks 501 may alternatively be deployed using a manual crank (not shown) that is mounted to the through rod 641. In either circumstance, when the wheel chocks 501 are deployed, the chocks are wedged between the wheels 161 and the ground. Consequently, as the wheels 16 attempt to rotate forward, the deployed chocks 501 provide a resistive force sufficient to retard forward rotation of the wheels. Conversely, when the chocks 501 are stored, the wheels 161 are able to rotate (forward or rearward), presuming some other device is not operative to retard rotational motion such as the braking assembly 181.

Figure 48:
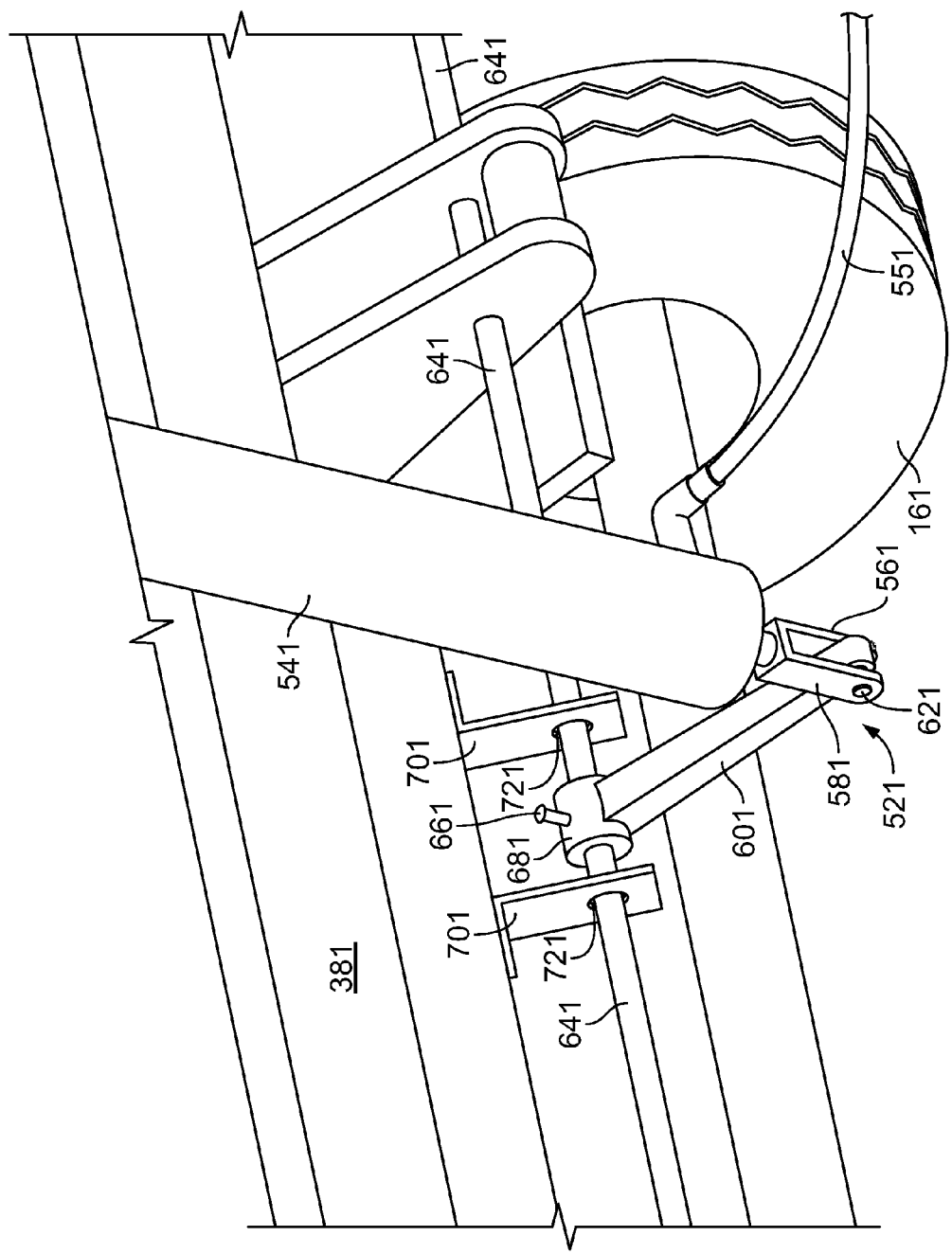
FIG. 48 is an underneath, perspective view of an exemplary repositioning assembly for use in repositioning the wheel chocks of the exemplary trailer stabilizer of FIG. 45.

Referring to FIGS. 45 and 48, the repositioning device 521 includes a pneumatic cylinder 541, which is supplied with air from pneumatic supply lines 551. One end of the pneumatic cylinder 541 is mounted to the underside of the cross-member 381. The opposite end of the pneumatic cylinder 541 includes an actuating piston 561 with a clevis 581 mounted to the far end of the piston. The clevis 581 is pivotally mounted to an L-shaped bracket 601 by way of a pin 621 that extends through both the clevis and bracket. A through rod 641, having a circular cross-section, is received within a cylindrical cavity formed by a cylindrical housing 681 mounted to the opposite end of the L-shaped bracket 601. A through hole extending into the cylindrical cavity is threaded to receive a fastener, such as a bolt 661, that extends into contact with an exterior of the through rod 641 to secure the cylindrical housing 681 to the through rod 641. Accordingly, rotational motion of the cylindrical housing 681, when the bolt 661 is tightened within the through hole, is transferred to the through rod 641, thereby causing the through rod to correspondingly rotate when the cylindrical housing is rotated. The rotational motion of the through rod 641 is transferred to the chocks 501 and is operative to reposition the chocks 501 between deployment and storage positions.

In this exemplary embodiment, the through rod 641 is located beneath and mounted to a cross-member 381 of the frame 121 using several brackets 701 with circular bushings 721. The bushings 721 operate to allow the through rod 641 to axially rotate with respect to the brackets 701, while retaining the horizontal and vertical position of the through rod. In exemplary form, a single through rod 641 is utilized to extend across the entire width of the frame 121 and outward beyond the frame in front of the wheels 161.

Figure 49:
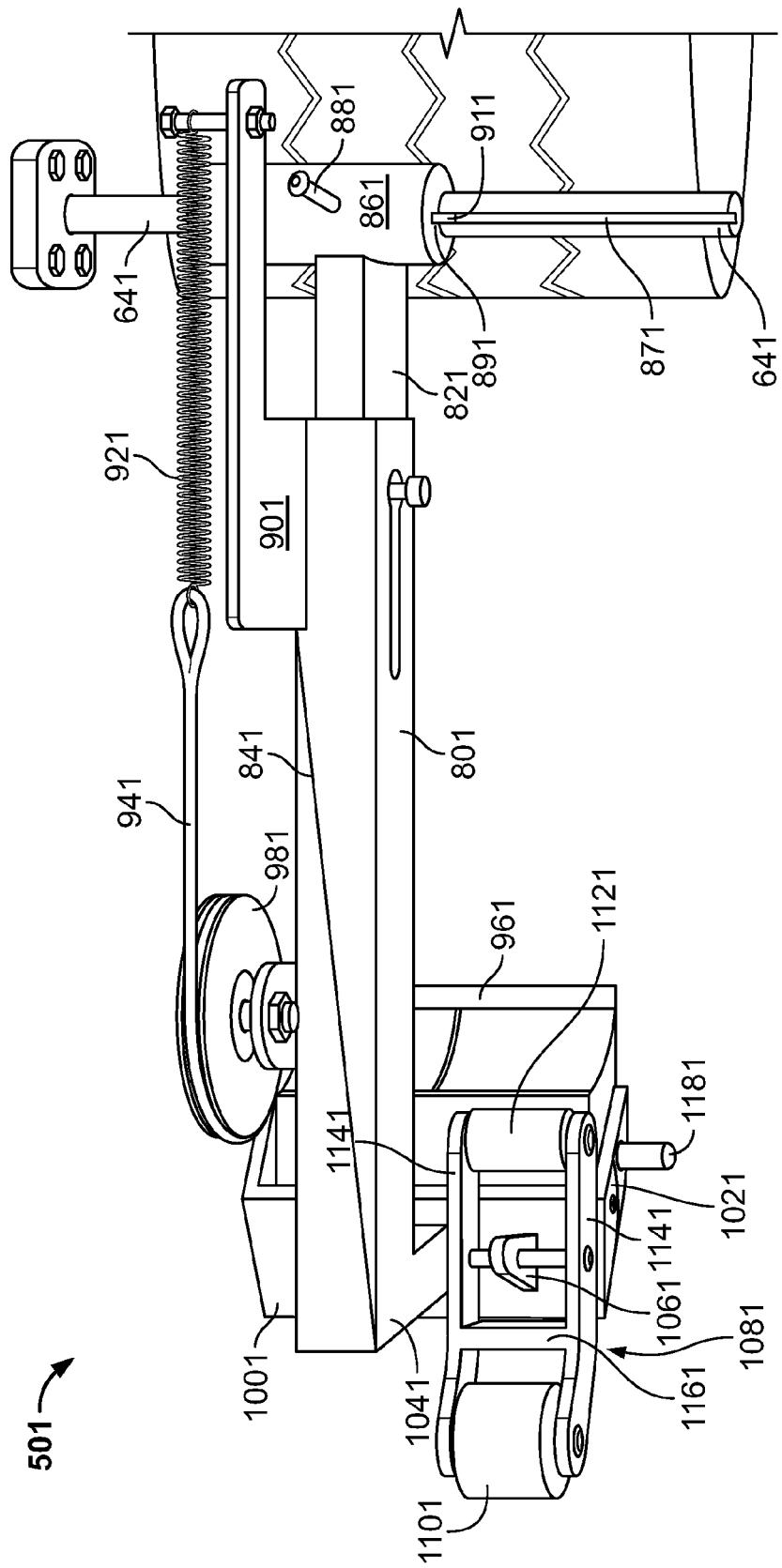
FIG. 49 is an elevated perspective view of a repositionable wheel chock, in the storage position, for use with the exemplary trailer stabilizer of FIG. 45.
Figure 50:
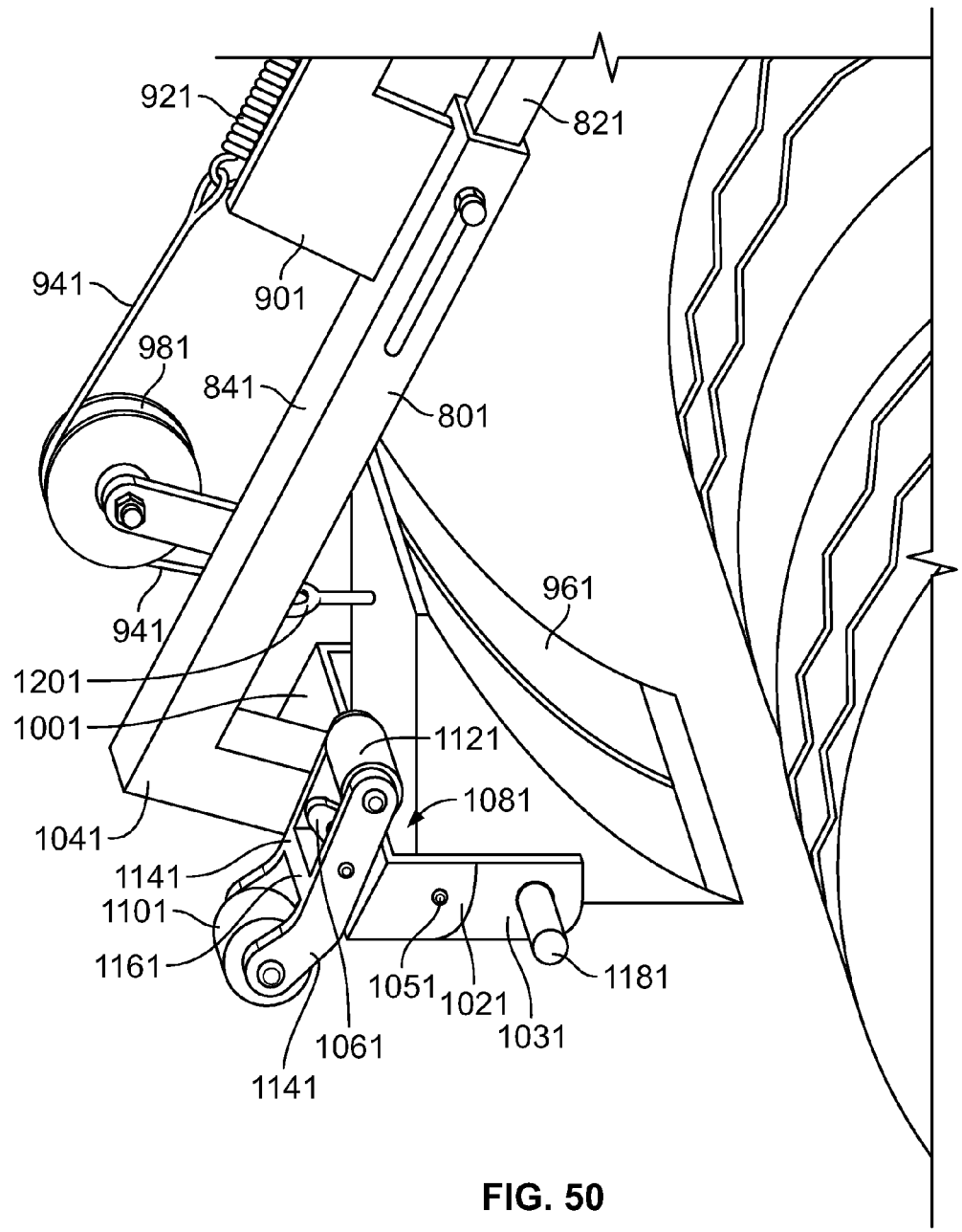
FIG. 50 is an elevated perspective view of the repositionable wheel chock of FIG. 49, shown just prior to complete deployment.

Referencing FIGS. 45, 49 and 50, each repositionable wheel chock 501 includes a telescopic pole 801 mounted to the through rod 641 that extends laterally beyond the frame 121. In exemplary form, the telescopic pole 801 comprises a first hollow tube 821 and a second, larger hollow tube 841, where the first tube has an exterior that is small enough to be received within the interior of the second tube. Because of the size differential between the tubes 821, 841, the tubes are operative to slide against one another to increase or decrease the length of the pole 801 as necessary. In this regard, the second tube 841 has a closed opposite end that optionally houses a spring (not shown), which is operative to bias the first hollow tube 821 with respect to the second tube. However, it should be noted that the tubes need not be telescopic or operative to slide with respect to one another in order to deploy the wheel chock 501. For example, tubes 821, 841 may be replaced by a single tube or multiple tubes that are rigidly mounted to one another to avoid longitudinal length changes.

Opposite the closed end of the second tube 841, the first tube 821 includes a transverse hollow cylinder 861. A cavity on the interior of the cylinder 861 allows for throughput of the through rod 641. Additionally, the through rod 641 includes a longitudinal keyway 871 formed on its exterior that is aligned with a longitudinal keyway 891 formed on the interior of the cylinder 861. In this fashion, after the keyways 871, 891 have been aligned (i.e., overlap) with one another, a key 911 is inserted into both keyways 871, 891 so that rotation of the through rod 641 results in corresponding rotation of the cylinder 861. In this exemplary embodiment, the keyways 871, 891 exhibit a rectangular, axial cross-section that accommodates the key 911, which also exhibits a rectangular, axial cross-section. A hole (not shown), which extends through the cylinder 861 and into the keyway 891, is adapted to receive a threaded fastener 881. By inserting the threaded fastener 881 into the hole, where the hole overlaps the keyway 891, the threaded fastener is operative to contact the key 911 and lock the key within the keyways 871, 891.

Opposite the closed end of the second tube 841, an arm 901 is mounted to the lateral exterior of the second tube. The arm 901 extends away from the closed end of the second tube 841 and extends beyond the open end of the second tube 841 in parallel with the first tube 821. In this exemplary embodiment, the arm 901 by way of a through bolt is mounted to a spring 921, where the spring is coupled to a cable 941, which is itself mounted to a chock block 961. As will be discussed in more detail below, the spring 921 provides a tension force that retains the chock block 961 in a predetermined position, thereby retarding the chock block 961 from digging into the ground as the repositionable wheel chock 501 is moved from its storage position to its deployment position. In order to maintain the proper tension on the chock block 961, a guide pulley 981 is mounted to the second tube 841, where the guide pulley 981 receives the cable 941.

Proximate the closed end of the second tube 841, a bracket 1001 is mounted to the second tube. This bracket 1001, in exemplary form, includes a block C-shaped segment 1021 that is spaced apart from the second tube by way of an extension 1041. The block C-shaped segment 1021 includes extension plates 1031 pivotally mounted by way of a pivot pin 1051 to allow articulation of the chock block 961 and provide an allowance for coaxial discrepancy between the through rod 641 and the stabilizer's wheels 161. A guide arm 1061 is mounted to the rear exterior of the C-shaped segment 1021. In this exemplary embodiment, the guide arm 1061 includes a through hole that receives a fastener to pivotally mount a roller assembly 1081 to the guide arm.

The roller assembly 1081 includes a first roller 1101 mounted opposite a second roller 1121, where both rollers are mounted to opposing rails 1141 that are tied together by a cross-brace 1161. The first roller 1101 is rotationally repositionable with respect to the rails 1141 and is adapted to contact the ground when the wheel chock 501 is deployed in its barrier or deployment position. Similarly, the second roller 1121 is rotationally repositionable with respect to the rails 1141 and is adapted to contact the rear of the chock block 961 and overcome the bias of the spring 921 to rotate the chock block when the first roller 1101 reaches the ground.

The chock block 961 is accommodated within the C-shaped segment 1021. The chock block 961 is pivotally mounted to the extension plates 1031 by way of a pivot shaft 1181 that concurrently extends through the chock block and the extension plates. A rear portion of the chock block 961 includes a connector 1201 that couples the chock block to the cable 941.

Figure 51:
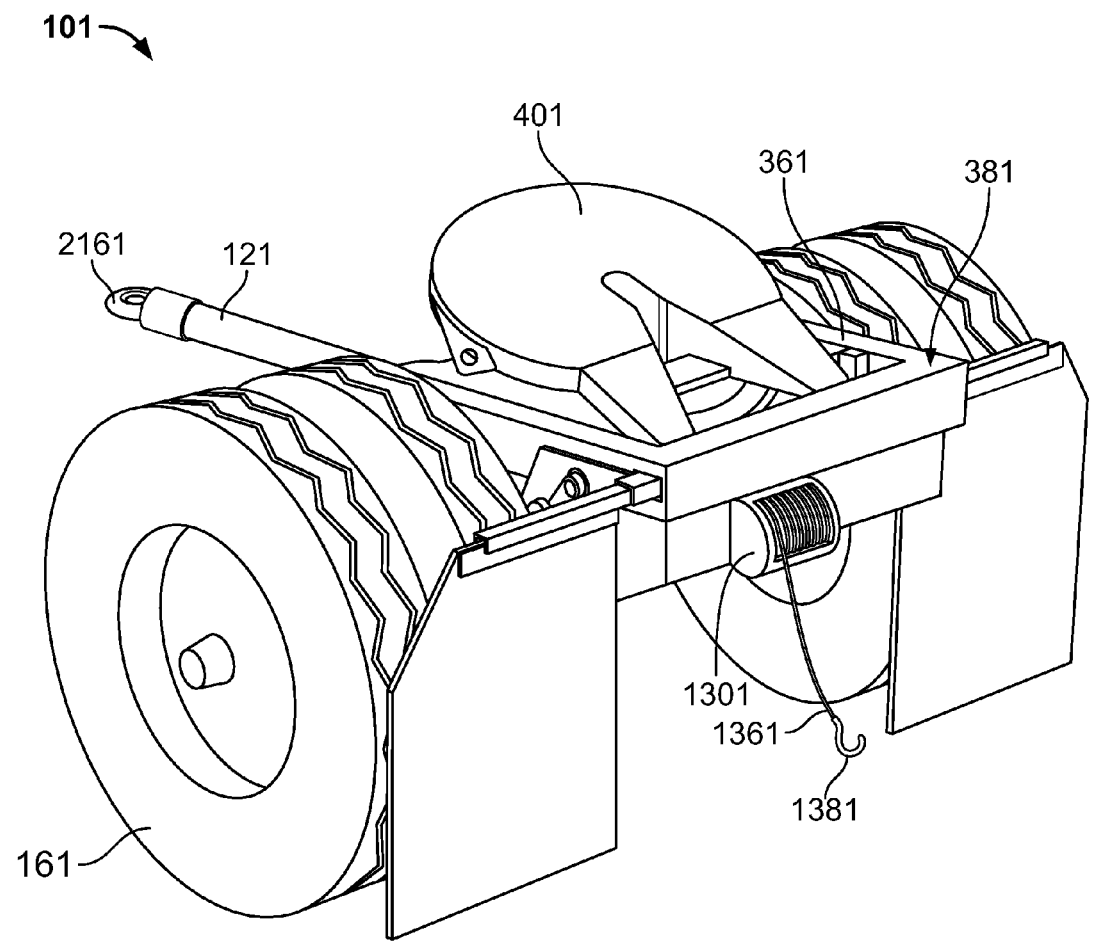
FIG. 51 is an elevated perspective view of the exemplary trailer stabilizer of FIG. 45.

Referring to FIGS. 45 and 51, the trailer support 101 may also includes a winch 1301 mounted to a rear cross member 381. The winch 1301 may be pneumatically, hydraulically, or electrically driven using a power connection line 1321 that includes a quick connect 1341 in order to receive power from a power source, such as from a yard truck 2001 (see FIG. 52). Alternatively, the winch 1301 could be manually actuated using a hand crank (not shown). In this exemplary embodiment, the winch 1301 includes a motor and a cable 1361 mounted to a rotating spool. A free end of the cable 1361 includes a hook 1381 that is adapted to interface with a ground cleat 1501 (see FIG. 53) in order to pull the rear of the trailer support 101 toward the ground cleat. For use with the instant embodiment, exemplary electric winches 1301 include, without limitation, the RN30W Rufnek worm gear winch available from Tulsa Winch (www.team-twg.com).

Figure 54:
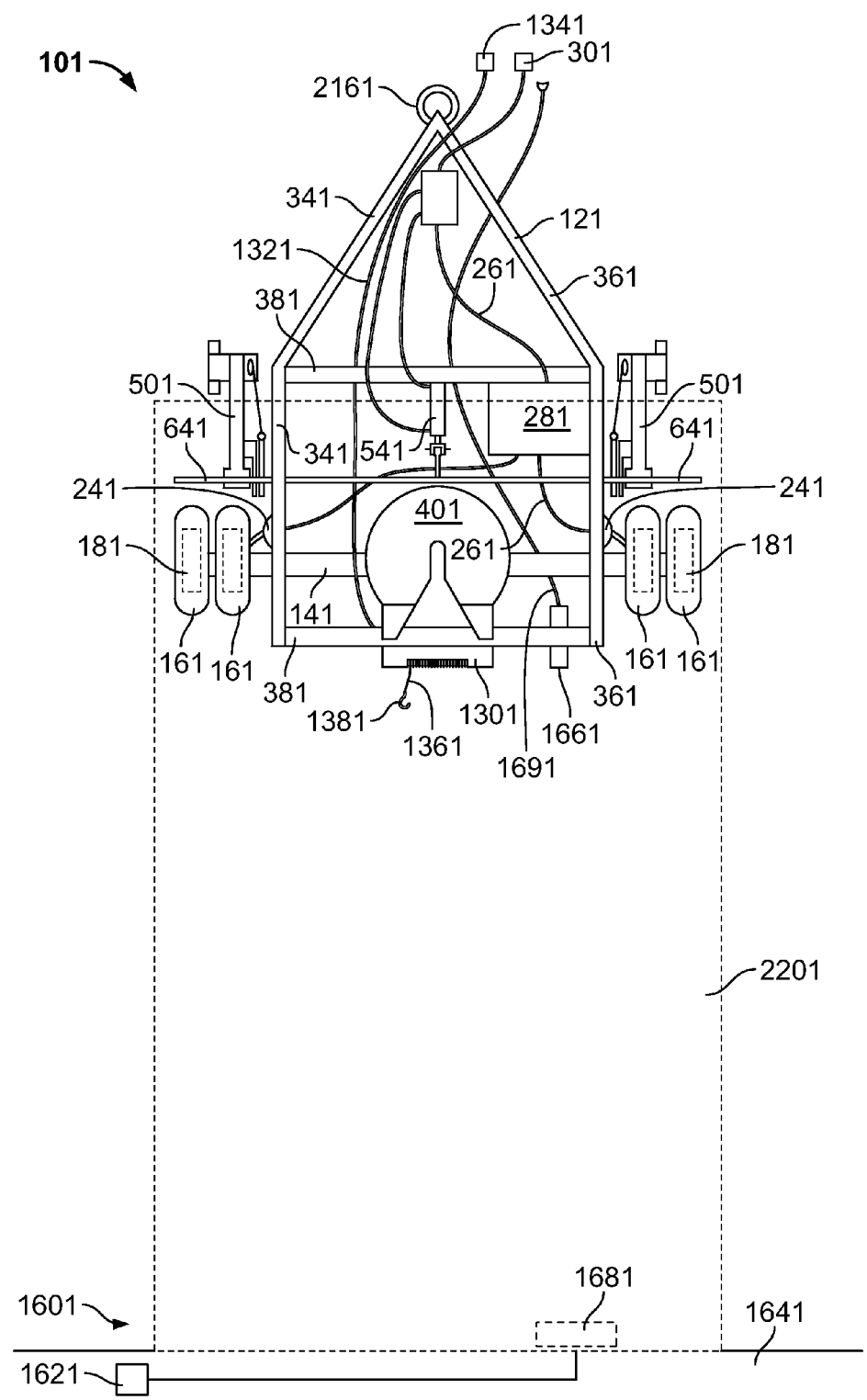
FIG. 54 is an overhead view of an exemplary layout at a warehouse or loading dock facility showing placement of the trailer stabilizer of FIG. 45 and the visual display components.

Referencing FIGS. 45 and 54, the trailer support 101 may further include a signaling system 1601. This signaling system 1601 provides a visual display 1621 that alerts personnel within a warehouse or loading dock facility 1641 when the trailer 2201 is stabilized using the trailer support 101. In exemplary form, the visual display 1621 is mounted on the interior of the warehouse or loading dock facility 1641 proximate the loading dock. As will be appreciated by those skilled in the art, when the rear of the trailer 2201 is backed up adjacent and aligned with respect to the loading dock opening, personnel within the warehouse or loading dock facility 1641 often cannot see through the loading dock opening because the rear of the trailer 2201 is occupying the entire loading dock opening. Therefore, the visual display 1601 takes the place of a manual visual inspection and indicates whether the trailer 2201 is stabilized or not to accommodate for the absence of a direct line of sight. In order for the visual display 1601 to know when to display an indicia that it is safe to load/unload the trailer 2201, the trailer stabilizer 101 includes an on-board infrared light source 1661.

Figure 52:
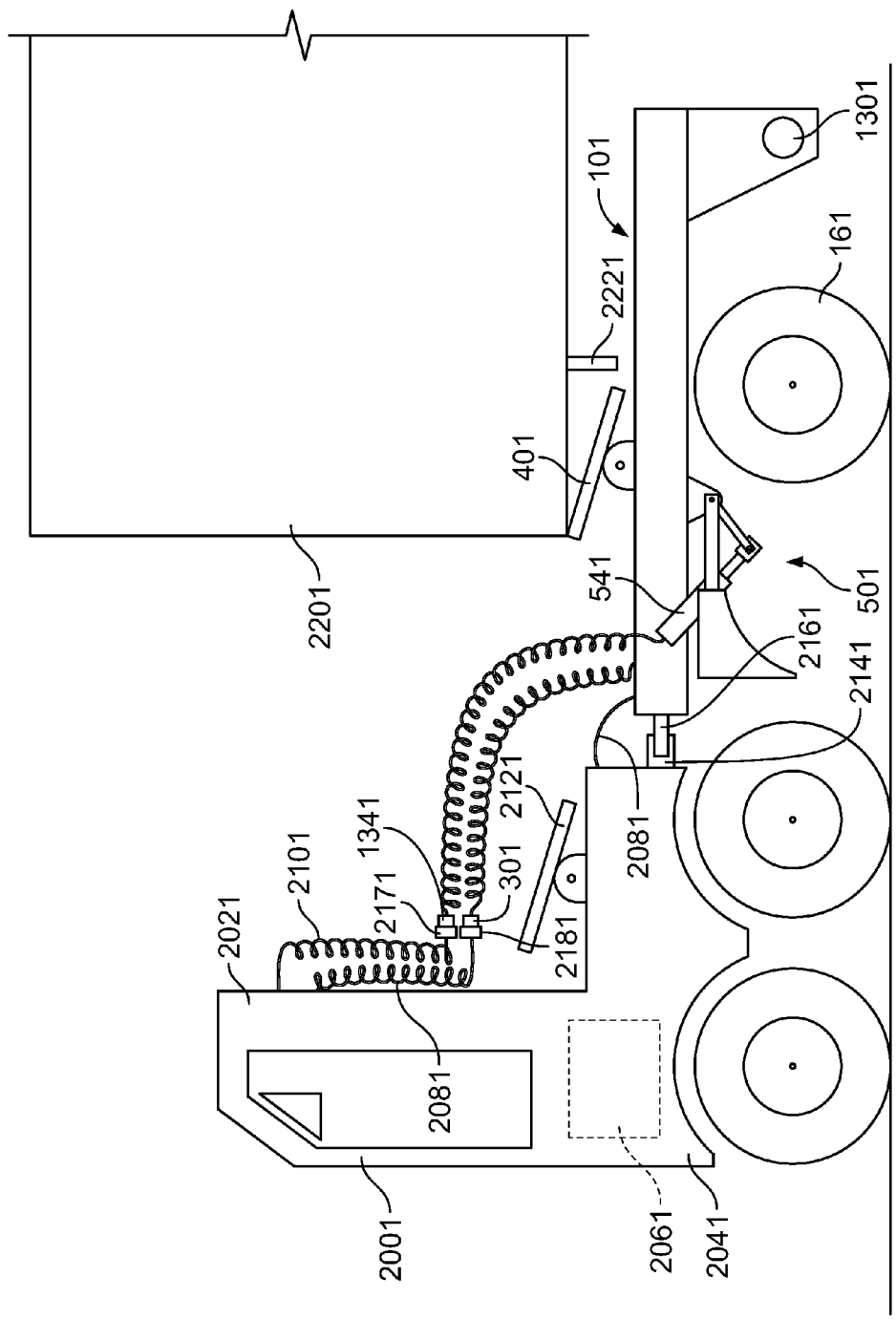
FIG. 52 is a profile view of an exemplary yard truck coupled to the trailer stabilizer of FIG. 45, shown being backed under a commercial freight trailer.

In this exemplary embodiment, the infrared light source 1661 is powered by an electrical source associated with the yard truck 2001 (see FIG. 52). However, it should be noted that the infrared light source could also be powered by an on-board power source (such as a battery or generator) associated with the trailer stabilizer 101. The infrared light source 1661 is selectively powered, however, only after the trailer support 101 has been secured. The infrared light source 1661, when powered, is operative to generate infrared light that is detected by an infrared detector 1681 located on the exterior of the warehouse or loading dock facility 1641. When infrared light is detected by the detector 1681, the detector communicates this detection to the visual display 1621 so that personnel within the warehouse or loading dock facility 1641 know it is safe to load or unload the trailer 2201. However, the visual display 1601 may provide more than a simple visual indication that the trailer stabilizer is secured.

The signaling system 1601 also includes a king pin sensor 1701 and a wheel chock sensor 1721. The king pin sensor 1701 is operative to determine whether or not a trailer king pin 2221 (see FIG. 52) is secured to the fifth wheel 401. When the king pin 2221 is secured to the fifth wheel 401, the sensor 1701 senses the position of the king pin within the opening of the fifth wheel. The sensor 1701 may also include an ancillary sensor (not shown) that confirms the king pin 2221 is locked within the fifth wheel 401. Likewise, the wheel chock sensor 1721 is operative to detect the position of the wheel chocks 501, such as when the wheel chocks are deployed on the ground in a blocking position directly in front of the wheels 161. Both the king pin sensor 1701 and the wheel chock sensor 1721 are in communication with a controller 1741 that uses a wireless transmitter to communicate information concerning the position of the king pin 2221 and the position of the wheel chocks 501 to the visual display 1601, which itself includes a wireless receiver.

Figure 53:
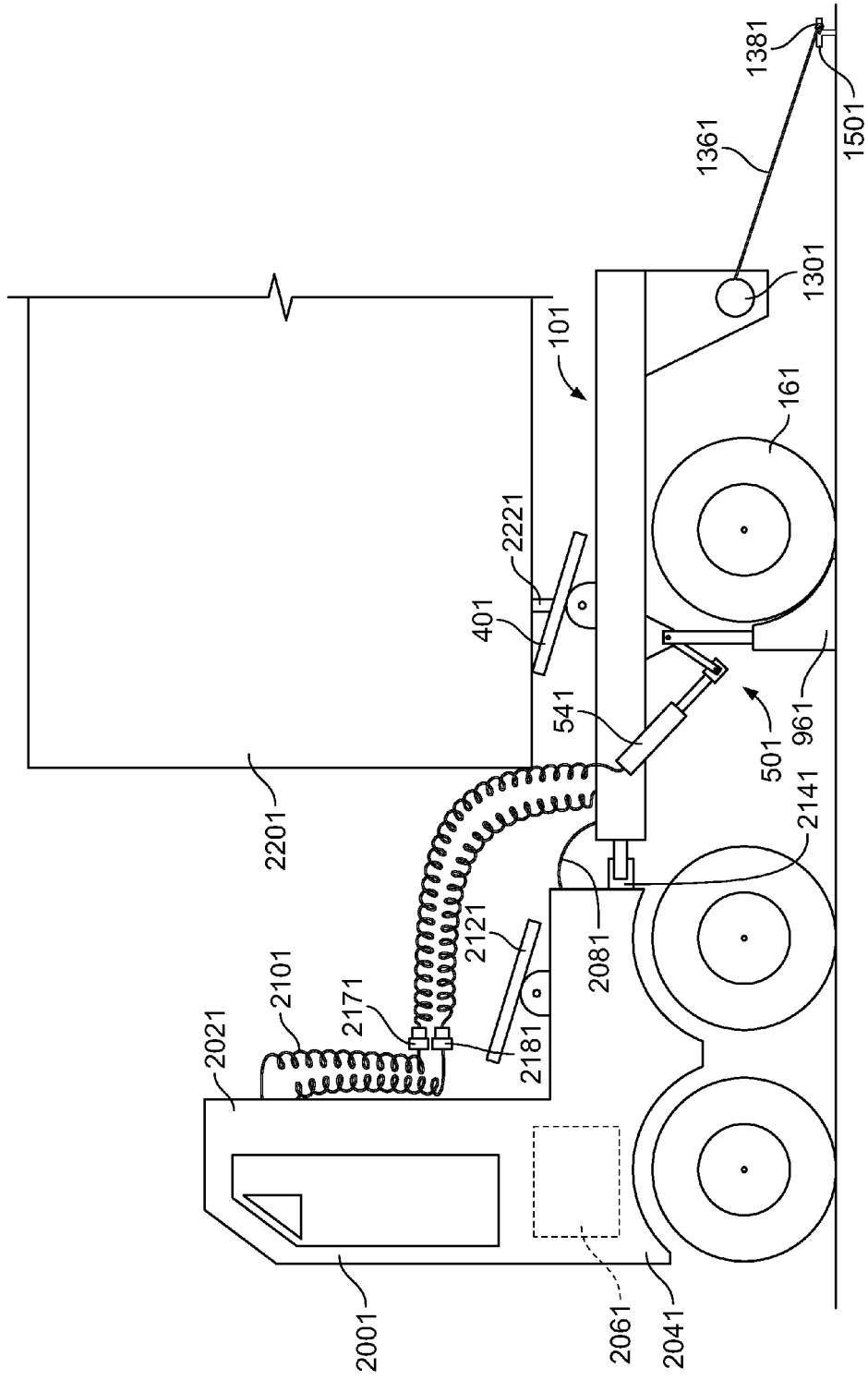
FIG. 53 is a profile view of the trailer stabilizer of FIG. 45 mounted and secured to the commercial freight trailer of FIG. 52.

Referring to FIGS. 52 and 53, a yard truck 2001 includes a cab 2021, a chassis 2041, an engine 2061, electrical connections 2081, pneumatic connections 2101, and a repositionable fifth wheel 2121. In addition, the yard truck 2001 includes a tow hook 2141 that receives the tow eye 2161 of the trailer support 101 in order to couple the yard truck 2001 to the trailer support 101.

In practice, the yard truck 2001 attaches itself to the trailer support 101 by way of the yard truck's tow hook 2141 being coupled to the tow eye 2161 of the trailer support 101. In addition to attaching the yard truck 2001 to the trailer support 101 using the hook 2141 and eye 2161, the yard truck operator also connects quick connects 1341, 301 of the trailer stabilizer 101 to quick connects 2171, 2181 associated with the yard truck to supply electrical and pneumatic power. It should also be noted that the yard truck 2001 may include hydraulic pump(s), lines, and connections (not shown) that connect to connections, lines, and devices of the trailer support 101, such as when the winch 1301 and/or repositioning device 521 is hydraulically driven. After completing connections between the yard truck 2001 and the trailer support 101, the yard truck operator then drives the yard truck into position with respect to a trailer 2201 having already been parked at a loading dock so that the doors of the trailer are open and the associated opening at the rear of the trailer is adjacent a loading dock opening.

At such a point in time, the trailer 2201 is initially supported by its landing gear (not shown). But, as discussed previously, the landing gear is not made to accommodate the high forces associated with a forklift repetitively entering and exiting the trailer to load or unload goods. As is evident to those skilled in the art, when loading a trailer, the initial weight of the loaded goods is positioned at the front of the trailer and is disproportionally born by the landing gear. Similarly, when a trailer is unloaded, the last weight to be taken off the trailer comes from the goods located at the front of the trailer, where this weight is disproportionally born by the landing gear. In order to ensure that the trailer does not nose-dive in case of landing gear failure, or that the trailer tips over on either lateral side, the instant disclosure provides a stabilizing device to retard nose dive or lateral tip over.

Referring again to FIGS. 52 and 53, after the yard truck 2001 has attached itself to the trailer stabilizer 101 and located a trailer that has yet to be stabilized, the yard truck thereafter backs the trailer stabilizer 101 underneath the trailer 2201. When backing the trailer stabilizer 101, the rear of the stabilizer (where the winch 1301 is located) moves underneath the trailer first and is aligned so that the fifth wheel 401 receives the trailer king pin 2221. While the trailer stabilizer 101 is being backed underneath the trailer 2201 and before the king pin 2221 is secured within the fifth wheel 401, the repositionable wheel chocks 501 are in a storage position and the brake assemblies 181 are free (i.e., not locked). It should also be noted that while the yard truck 2001 is backing the stabilizer 101 underneath the trailer 2201, the winch 1301 is preferably retracted. Continued backing of the yard truck 2001 causes the trailer stabilizer 101 to be further repositioned underneath the trailer 2201, eventually so much so that the king pin 2221 engages the fifth wheel 401 and becomes locked within the fifth wheel, thereby coupling the trailer stabilizer to the trailer. At this time, the king pin sensor 1701 detects the position of the king pin 2221 with respect to the fifth wheel 401 and communicates a signal indicative of the king pin position to the controller 1741 (see FIG. 45). Thereafter, the controller 1741 wirelessly communicates a signal to the visual display 1681 (see FIG. 54), which in turn displays visual indicia representing to dock workers that the king pin 2221 is secured to the trailer stabilizer 101.

After the trailer stabilizer 101 is coupled to the trailer 2201, a number of events occur to lock the position of the trailer stabilizer with respect to the trailer. One of these events may include the yard truck operator locking the braking assembly 181 of the trailer stabilizer by depressurizing the pneumatic lines 261 (see FIG. 45). This depressurization causes the brake pads 201 (see FIG. 46) to be forced against the brake drum/disc 221, thereby retarding rotational motion of the wheels 161. Another possible event is the deployment of the repositionable wheel chocks 501 using the repositioning device 521.

The yard truck operator controls, using standard internal controls within the yard truck 2001 to control the air pressure though line 2101, the pneumatic pressure applied to the pneumatic cylinder 541 to extend or retract the piston 561, thereby rotating the through rod 641 in either a clockwise or a counterclockwise direction. As discussed previously, rotation of the through rod 641 is operative to reposition the wheel chocks 501 between the storage position and the blocking position. In this manner, the yard truck operator is able to lower or raise the wheel chocks 501 without ever leaving the cab of the yard truck 2001. When the wheel chocks 501 are deployed so that the chocks are in front and adjacent at least one of the wheels 161, the wheel chock sensor 1721 senses this position and communicates a signal to the controller 1741 (see FIG. 45). Thereafter, the controller 1741 wirelessly communicates a signal to the visual display 1681 (see FIG. 54), which in turn displays visual indicia representing to dock workers that one or all of the wheel chocks 501 is deployed in a blocking position with respect to the wheels 161 of the trailer stabilizer 101. But the yard truck operator may need to exit the cab to couple the cable 1361 and hook 1381 to the ground, as well as to disconnect pneumatic and electrical connections extending from the yard truck 2001 to the trailer stabilizer 101.

In exemplary form, after the brake assembly 181 has been locked and the wheel chocks 501 have been deployed, the yard truck operator may exit the cab to secure the trailer support 101 to the ground using the winch 1301. The winch may be powered from an electrical power source on board the trailer stabilizer 101 or on board the yard truck 2001. In either circumstance, the winch 1301 is unwound a predetermined amount so that there is enough cable 1361 for the hook 1381 to reach the ground cleat 1501. The hook 1381 is thereafter mounted to the cleat 1501, and the winch 1301 is driven to wind the cable 1361 in order to remove the slack from the line. The winch 1301 associated controls (not shown) that are operative to discontinue winding of the cable 1361 after the cable reaches a predetermined tension. When taught, the cable 1361 and winch 1301 are operative to pull the trailer stabilizer 101 toward the rear of the trailer 2201, which acts to pull the fifth wheel 401 toward the rear of the trailer. Because the fifth wheel 401 at this point has received the king pin 2221, the fifth wheel 401 pushes against the front of the king pin to effectively wedge the trailer 2201 between the loading dock (not shown) and the fifth wheel 401 and wedge the king pin between the fifth wheel 401 and the ground cleat 1501.

As soon as the winching operation is complete, a switch 1691 associated with the infrared light source 1661 is tripped, thereby powering the light source and generating infrared light. The placement of the infrared light source 1661 is at the rear of the trailer support 101 and is designed to provide a direct line of sight between the light source and the light detector 1681 (see FIG. 54) mounted to the warehouse or loading dock facility 1641. It should be noted that the light source may be powered by the yard truck 2001 or may be powered by an on-board energy source (not shown) such as a generator or a battery. In exemplary form, the light source includes a timing circuit that only allows the infrared light source to be powered for a predetermined time. Regardless of the power source used, the light source 1661 is operative to generate infrared light that will be detected by the detector 1681.

The detector 1681, which is mounted to the warehouse or loading dock facility 1641, is operative to detect infrared light generated by the light source 1661. When infrared light is detected by the detector 1681, a signal is sent to the visual display 1621 indicating that the trailer stabilizer 101 is in a secured position with respect to the trailer 2201. In exemplary form, the visual display 1621 includes a red and green light. When illuminated, the red light indicates that the trailer 2201 parked at the loading dock is not ready to be loaded or unloaded because the trailer support 101 has not yet been secured to the trailer. In contrast, when illuminated, the green light indicates that the trailer 2201 parked at the loading dock is ready to be loaded or unloaded because the trailer support 101 is secured to the trailer.

When a trailer 2201 is fully loaded or unloaded, the yard truck 2001 reattaches itself to the trailer support 101, which includes reattaching the quick connects 301, 1341. Thereafter, to the extent the support 101 is coupled to the ground cleat 1501, the winch 1301 is unwound and the hook 1381 is disengaged from the cleat, followed by winding of the cable 1361. As soon as the winch cable 1361 is unwound, thereby allowing decoupling of the hook 1381 from the cleat 1501, the infrared light source 1661 is powered and generates infrared light. This light is in turn detected by the detector 1681, which is operative to send a signal to the visual display 1621 indicating that the trailer support 101 is not longer secured to the trailer 2201. As discussed previously, a red light is illuminated on the display 1621 indicating to dock personnel that it is not safe to load or unload goods from the trailer. It should be noted that in case the visual display 1621 gets out of sequence, it may be manually reset to display the red light or some other indicia reflecting that the trailer 2201 is not mounted to the trailer support 101.

Presuming the winch 1301 has been disengaged from the cleat 1501 or not even used, the yard truck operator the supplies power to the repositioning device 521 in order to retract the repositionable wheel chocks 501. Presuming the wheel chocks 501 were not used or have already been retracted, the yard truck operator supplies power to the brake assemblies 181 in order to free the brakes and allow the wheels to turn with respect to the frame 121. At this point, the king pin 2221 is released from the fifth wheel 401 and the trailer support may be removed from under the trailer 2201. At the point in time where the trailer stabilizer 101 is removed from under the front of the trailer 2201, it is up to the landing gear to support the frontal load of the trailer.

Figure 55:
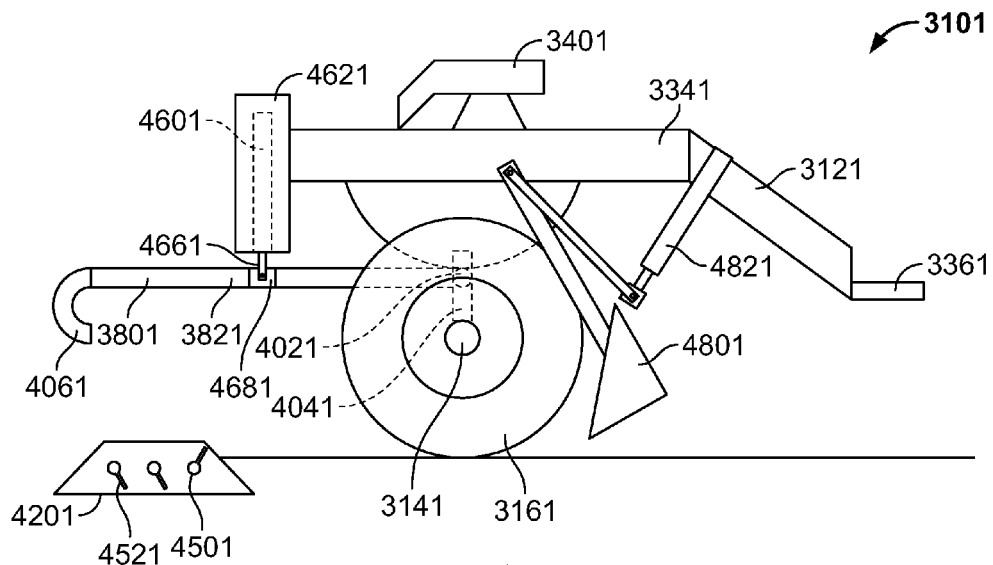
FIG. 55 is a profile view of another exemplary trailer stabilizer in a disengaged position.
Figure 56:
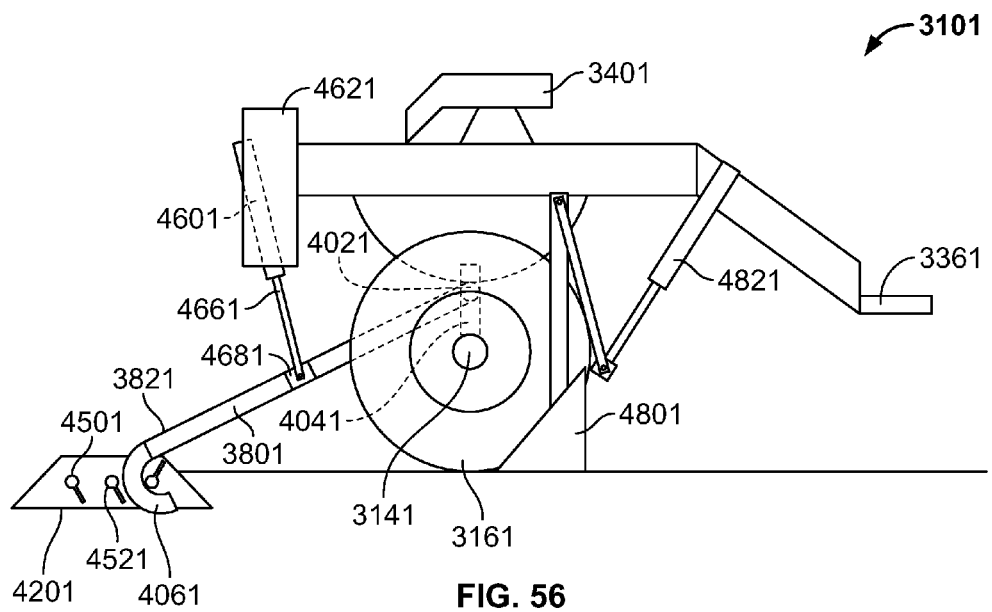
FIG. 56 is a profile view of the exemplary trailer stabilizer of FIG. 55 in an engaged position.
Figure 57:
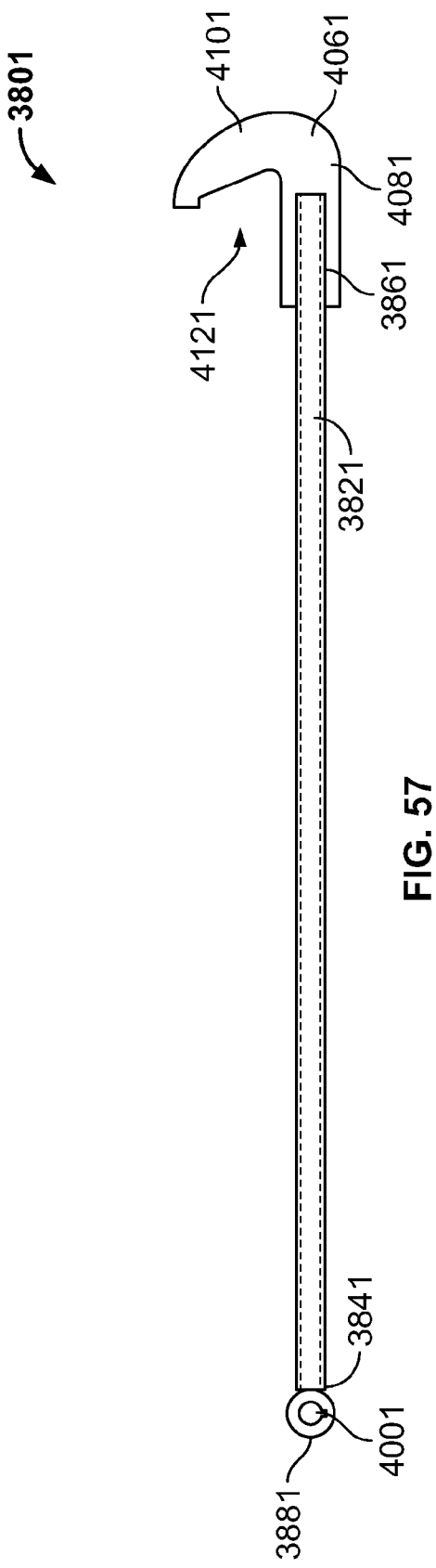
FIG. 57 is a profile view of the exemplary draw bar and associated hook in FIG. 55.
Figure 58:
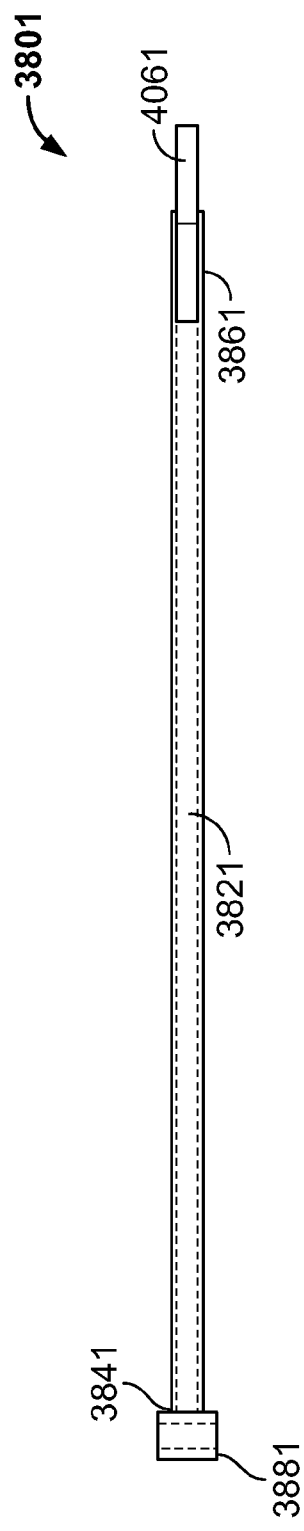
FIG. 58 is a top view of the exemplary draw bar and associated hook in FIG. 55.

Referring to FIGS. 55 and 56, a second exemplary trailer support 3101 includes a frame 3121 and an axle 3141 mounted to the frame 3121. The axle 3141 includes one or more wheels 3161 mounted proximate the ends of the axle 3141. In this exemplary embodiment, the axle 3141 includes tandem wheels 3161 mounted at each end, with the tandem wheels including an associated braking assembly (not shown), which is identical to that of the first exemplary embodiment 101 (see FIGS. 45-47). The braking assembly includes brake pads, brake drum/discs, and a pneumatic brake cylinder to apply a brake force to the trailer support 3101 when insufficient air pressure occurs within the pneumatic line feeding the cylinder. For purposes of brevity, reference is had to FIGS. 46 and 47 and the corresponding written description for a braking assembly that may be used as the instant braking assembly 3101.

The frame 3121 includes a pair of C-shaped cross-section frame rails 3341 that are equally spaced apart from one another and oriented in parallel toward the rear of the trailer support 3101. Toward the front of the trailer support 3101, the frame rails 3341 are angled toward one another and eventually converge at a hitch 3361 proximate the front of the trailer support. When oriented in parallel, the frame rails 3341 are jointed together by mounting one or more cross-members (not shown) to the frame rails (via welding, nuts and bolts, etc.), where the cross-members may optionally include a block C-shape cross-section.

At least one of the cross-members of the frame 3121 has mounted to it a fifth wheel 3401 in an elevated fashion above the frame rails 3341 (using conventional nut and bolt fasteners and/or welds). Again, the fifth wheel 3401 is analogous to the fifth wheel 401 discussed with respect to the first exemplary embodiment 101.

The trailer support 3101 also includes an actuatable draw bar and associated hook 3801 that is pivotally mounted to the frame 3121 between an elevated position and an engaged position (compare FIGS. 55 and 56). When in the draw bar and associated hook 3801 is in the engaged position (see FIG. 56), the hook is at or approximate ground level to engage a cleat 4201 mounted to the ground. When the draw bar and associated hook 3801 engage the cleat, appreciable forward movement of trailer support 3101 away from the cleat 4201 is not possible. Conversely, when the draw bar and associated hook 3801 is in the disengaged position (see FIG. 55), the hook is above ground level and inoperative to engage the cleat 4201. Thus, when the draw bar and associated hook 3801 are disengaged from the cleat 4201, appreciable forward movement of trailer support 3101 may be possible, presuming wheel chocks are not deployed in a barrier position.

Referring to FIGS. 55-58, in this exemplary embodiment, the draw bar and associated hook 3801 comprises quarter inch steel rectangular tubing 3821 extending longitudinally and having opposing ends 3841, 3861. At one end 3841, a cylindrical coupling 3881 is fastened to the tubing, such as by welding, and oriented so that a through opening 4001 is generally perpendicular to the longitudinal length of the tubing 3821. This opening 4001 receives an axle 4021 that is mounted to the trailer support 3101 so that the coupling 3881 pivots around the axle 4021. In exemplary form, the axle 4021 is sized to concurrently extend through the opening 4001 and corresponding openings that are aligned through spaced apart brackets 4041 mounted to the trailer support 3101 so that the longitudinal ends of the axle extend through the brackets. Each end of the axle 4021 includes a radial through hole that is sized to receive a respective cotter pin (not shown) and thereby inhibit the axle from being displaced laterally (i.e., from side to side). One or both of the cotter pins may be removed to allow the axle 4021 to be laterally repositioned with respect to the brackets 4041 and the cylindrical coupling 3881. When the draw bar and associated hook 3801 is mounted to the trailer support 3101, the cylindrical coupling 3881 interposes the brackets 4041 so that the through opening 4001 is longitudinally aligned with the corresponding openings of the brackets. At the same time, the axle 4021 is inserted through the openings in the coupling 3881 and brackets 4041 so that the ends of the axle extend just beyond the bracket openings. Thereafter, the cotter pins are installed, and the draw bar and associated hook 3801 is pivotally mounted to the trailer support 3101.

A heavy duty hook 4061 is mounted to the end 3861 of the rectangular tubing 3821 opposite the cylindrical coupling 3881. This heavy duty hook 4061 is fabricated from high strength steel and includes a linear segment 4081 that extends substantially coaxial with the tubing 3821. The far end of the segment 4081 is rounded over 4101. The hook 4061 defines a cavity 4121 on its interior that is adapted to retain at least one of a plurality of dowel pins 4501 associated with the cleat 4201 when the draw bar and associated hook 3801 is in the engaged position.

Figure 59:
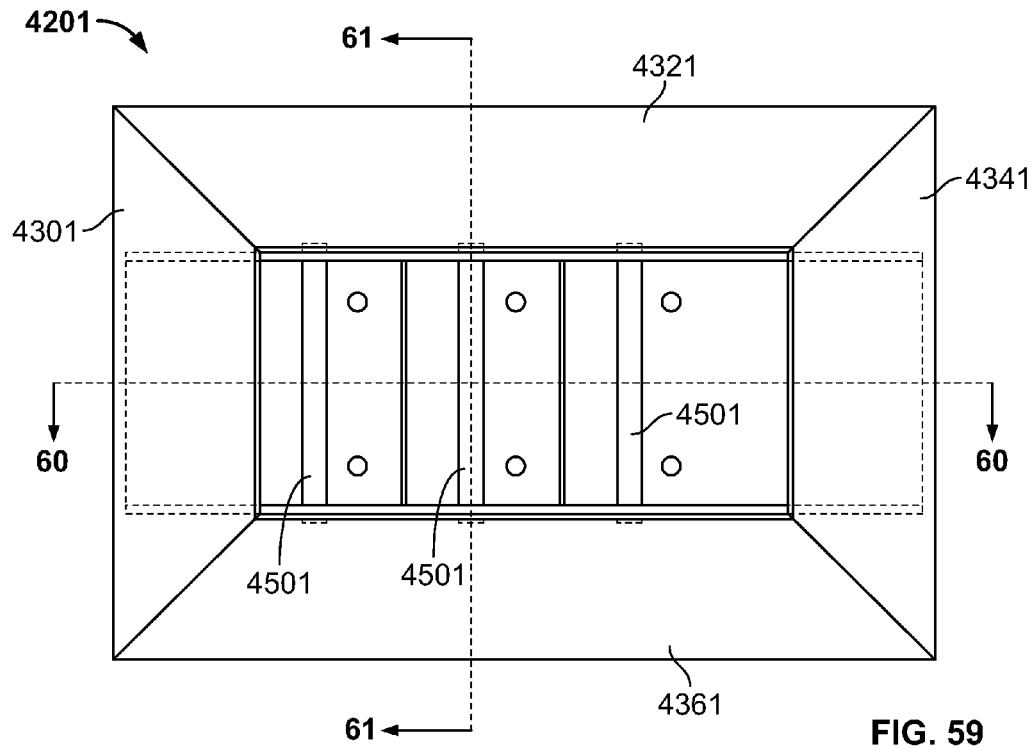
FIG. 59 is a top view of the exemplary pavement cleat in FIG. 55.
Figure 60:
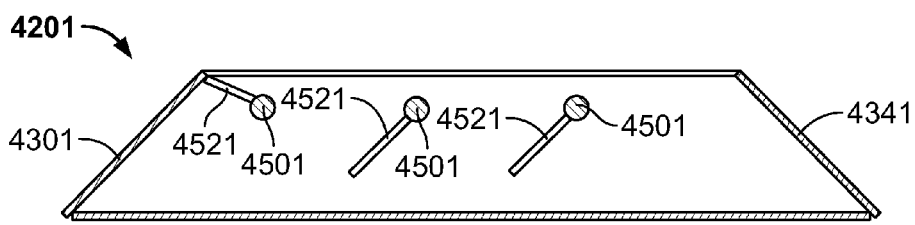
FIG. 60 is a cross-sectional view of the exemplary pavement cleat in FIG. 55 taken along lines 16-16 in FIG. 59.
Figure 61:
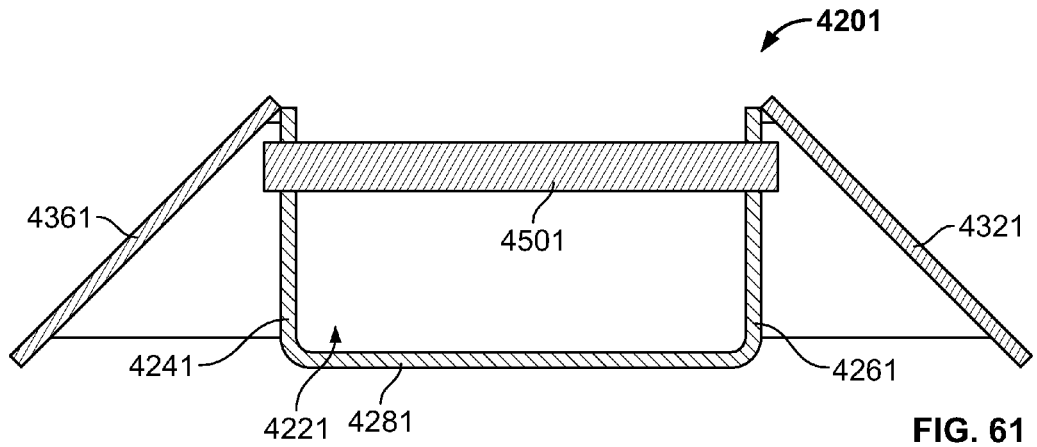
FIG. 61 is a cross-sectional view of the exemplary pavement cleat in FIG. 55 taken along lines 17-17 in FIG. 59.

Referring to FIGS. 59-61, the exemplary cleat 4201 comprises an open top with a longitudinal block U-shaped tunnel 4221 having opposed vertical sidewalls 4241, 4261 and a bottom wall 4281. Trapezoidal plates 4301, 4321, 4341, 4361 are mounted to tapered ends and to the top of the vertical sidewalls 4241, 4261. In addition, the trapezoidal plates 4301, 4321, 4341, 4361 are mounted to each other at their angled ends. In this manner, the trapezoidal plates 4301, 4321, 4341, 4361 operate to provide an angled incline so that unintended objects contacting the cleat 4201 can pass thereover.

On the interior of the cleat 4201 are a series of spaced apart dowel pins 4501 that span laterally across the vertical sidewalls 4241, 4261. Each dowel pin 4501 includes a flange 4521 that extends perpendicularly from the circumference and extends substantially the entire distance between the vertical sidewalls 4221, 4261 of the tunnel 4221. The vertical sidewalls 4221, 4261, 4221 include corresponding openings in order to receive the dowel pins 4501. But it should be noted that in this exemplary cleat 4201, the dowel pins 4501 are not rotationally repositionable with respect to the vertical sidewalls 4221, 4261. However, it is within the scope of the disclosure to provide dowel pins 4501 and flanges 4521 that are rotationally repositionable. Specifically, the flanges 4521 may be spring biased and operative to close the gap between adjacent pins 4501 in order to prohibit unintended objects from entering the interior of the cleat 4201.

In exemplary form, the forward most dowel pin 4501 is mounted to the vertical sidewalls 4241, 4261 so that its flange 4521 extends to meet the top edge of the forward trapezoidal plate 4301. As will be discussed in more detail below, this orientation ensures that the hook 4061 does not inadvertently snag the top edge of the forward trapezoidal plate 4301. The remaining dowel pins 4501 are oriented so that the flanges 4521 are upwardly sloped from front to back.

The orientation for the flanges 4521 of the second and successive dowel pins 4501 provides a series of ramps that allow the hook 4061 to move from front to back across the dowel pins without becoming snagged. Simply put, the hook 4061, when moving from front to back, slides up the flange and over one of the dowel pins, to only drop down and contact a successive flange of a successive dowel pin. The same process may be repeated until the hook reaches the top of last dowel pin or the hook is moved forward. At this point, the hook 4061 slides over the last dowel pin and begins to slide down the face of the rear trapezoidal plate 4341. In contrast, when the hook 4061 is repositioned from rear to front, the cavity 4121 of the hook receives whichever dowel pin 4501 is nearest in order to retain the hook within the cleat 4201. This retention occurs because the angled surfaces provided by the flanges 4521 operate to direct the hook 4061 into contact with the nearest dowel pin 4501 so that the dowel pin is received within the cavity. In this received position, the draw bar and associated hook 3801 cannot be moved forward to the next nearest dowel pin, nor can the hook 4061 be vertically repositioned out of engagement with the dowel pin. In order to discontinue engagement of the hook 4061 with the instant dowel pin 4501, the draw bar and associated hook 3801 is repositioned rearward (from front to back) until the tip of the hook 4061 clears the instant dowel pin. Thereafter, the draw bar and associated hook 3801 may be vertically raised to remove the hook 4061 from within the cleat 4201.

Referring back to FIGS. 55 and 56, in order to vertically reposition the draw bar and associated hook 3801, a pneumatic cylinder 4601 is concurrently coupled to the rectangular tubing 3821 and corresponding brackets 4621 mounted at the rear of the frame 3121. In this exemplary embodiment, air supply lines (not shown) are coupled to the pneumatic cylinder 4601 and are adapted to receive air from a yard truck or other tractor (see e.g., FIGS. 52 and 53). The pneumatic cylinder 4601 is pivotally mounted to the rear of the frame 3121 by way of the corresponding brackets 4621, while the pneumatic cylinder piston 4661 is repositionably mounted to a clevis 4681 on the rectangular tubing 3821 using a through pin (not shown). The clevis 4681 is formed by two parallel metal plates that are welded to the rectangular tubing, where each plate has an aligned hole that receives the through pin. In this manner, when the piston 4661 is extended from the cylinder 4601, the draw bar and associated hook 3801 are pivoted about the axle 4021 in order to lower the hook 4061. Conversely, when the piston 4661 is retracted into the cylinder 4601, the draw bar and associated hook 3801 are pivoted about the axle 4021 in order to raise the hook 4061.

In addition, the exemplary trailer support 3101 may include a pair of repositionable wheel chocks 4801 having generally the same structure and mode of operation as the wheel chocks 501 discussed with respect to the foregoing embodiment. Accordingly, for purposes of brevity, a detailed discussion of the components and mode of operation has been omitted.

In operation, a yard truck (not shown) attaches itself to the trailer support 3101 by way of the yard truck's tow hook being coupled to the hitch 3361 of the trailer support. In addition to attaching the yard truck to the trailer support 3101 using the hitch 3361, the yard truck operator also connects quick connects of the trailer stabilizer 3101 to quick connects associated with the yard truck to supply electrical and pneumatic power to the trailer stabilizer. It should also be noted that the yard truck may include hydraulic pump(s), lines, and connections (not shown) that connect to connections, lines, and devices of the trailer support 3101, such as when the draw bar and associated hook 3801 is hydraulically repositioned by way of a hydraulic cylinder instead of a pneumatic cylinder 4601.

After completing connections between the yard truck and the trailer support 3101, the yard truck operator then drives the yard truck into position with respect to a trailer having already been parked at a loading dock so that the doors of the trailer are open and the associated opening at the rear of the trailer is adjacent a loading dock opening. The yard truck operator then begins to back the trailer stabilizer 3101 underneath the trailer, with the rear of the stabilizer where the draw bar and associated hook 3801 is located moving underneath the trailer first so that the fifth wheel 3401 is aligned with the king pin of the trailer. While the trailer stabilizer 3101 is backed underneath the trailer, the repositionable wheel chocks 4801 are in a storage position, the brake assemblies of the trailer stabilizer are free (i.e., not locked), and the draw bar and associated hook 3801 are in a raised position. Continued backing of the yard truck causes the trailer stabilizer 3101 to be further repositioned underneath the trailer, eventually so much so that the king pin engages the fifth wheel 3401 and becomes locked within the fifth wheel, thereby coupling the trailer stabilizer to the trailer. At this time, a king pin sensor detects the position of the king pin with respect to the fifth wheel 3401 and communicates a signal indicative of the king pin position to a controller associated with the yard truck. Thereafter, the controller wirelessly communicates a signal to a visual display (not shown), which displays visual indicia within a warehouse to dock workers telling them that the king pin is secured to the trailer stabilizer 3101.

After the trailer stabilizer 3101 is coupled to the trailer, a number of events occur to lock the position of the trailer stabilizer with respect to the trailer. First, the yard truck operator lowers the draw bar and associated hook 3801 so that the hook 4061 contacts the top of the cleat 4201, which is already securely mounted to the pavement/concrete underneath the trailer, in order for the hook to float on top of the cleat. The yard truck operator then pulls slightly forward so that the hook 4061 captures one of the dowel pins 4501 within the cavity 4221 and retards further forward movement of the stabilizer 3101. A sensor associated with the stabilizer 3101 detects the deployed position of the draw bar and associated hook 3801 and communicates this to the controller. The controller then wirelessly communicates a signal to a visual display (not shown) or powers an infrared light source to communicate with an infrared light detector operatively coupled to the visual display letting dock workers know that the draw bar and associated hook 3801 is deployed.

In addition to securing the hook 4061 to the cleat 4201, the yard truck operator also locks the braking assembly of the trailer stabilizer by depressurizing the pneumatic lines feeding the drum assemblies. This depressurization causes the brake pads to be forced against the brake drum/disc, thereby retarding rotational motion of the wheels 3161. Another event is the deployment of the repositionable wheel chocks 4801 using a pneumatic cylinder 4821. Deployment of the wheel chocks 4801 is essentially the same as that discussed for the first exemplary embodiment and has been omitted only to further brevity. Thereafter, the yard truck unhooks any pneumatic and electrical connections with the trailer stabilizer and continues on to the next spotted trailer.

After the trailer is fully loaded or unloaded, the yard truck reattaches itself to the trailer support 3101, which includes reattaching any pneumatic and electrical connections. After these connections have been reestablished, the repositionable wheel chocks 4801 are raised to a storage position and the brake assemblies are freed (i.e., not locked). This allows the yard truck operator to slightly reposition the trailer support 3101 toward the rear of the trailer to unseat the hook 4061 from the nearest dowel pin 4501 of the cleat 4201. After the hook 4061 is unseated, the yard truck operator manipulates valves to supply air to the air supply lines coupled to the pneumatic cylinder 4601. This, in turn, causes the piston 466 to retract within the cylinder 4601, thereby pivoting the draw bar and associated hook 3801 about the axle 4021, thus raising the hook 4061. After the hook 4061 has been raised to no longer potentially come in contact with the cleat 4201, and the landing gear of the trailer has been lowered, the yard truck pulls the trailer support 3101 out from under the trailer so that the king pin of the trailer no longer engages the fifth wheel 3401.

The exemplary trailer stabilizer 3101 is operative to inhibit trailer nosedives, tip-overs, and trailer creep. Moreover, the exemplary trailer stabilizer 3101 includes a means for informing dock personnel when the trailer stabilizer 3101 is mounted to the trailer, thereby informing the dock personnel that it is safe or unsafe to load/unload the trailer, similar to that discussed for the first exemplary embodiment.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A trailer stabilizer and signaling system comprising:
   a repositionable freight trailer stabilizer comprising a frame having mounted thereto a wheel, the repositionable freight trailer stabilizer including a repositionable jack; and,
   a stabilizer communicator operatively coupled to the trailer stabilizer, the stabilizer communicator including a deployable signaler configured to confirm the trailer stabilizer is secured under a parked freight trailer; and,
   a dock communicator adapted to be remote from the stabilizer communicator, the dock communicator configured to at least one of receive a signal from the stabilizer communicator and send a signal to the stabilizer communicator;
   wherein the dock communicator includes a first visual display configured to display a message indicative of the trailer stabilizer being secured to the parked freight trailer.

2. The trailer stabilizer and signaling system of claim 1, wherein the stabilizer communicator includes a controller communicatively coupled to the deployable signaler.

3. The trailer stabilizer and signaling system of claim 2, further including a link in electrical communication with the controller and the stabilizer communicator configured to establish electrical communication between the controller and the stabilizer communicator.

4. The trailer stabilizer and signaling system of claim 1, wherein the deployable signaler includes a repositionable arm.

5. The trailer stabilizer and signaling system of claim 4, wherein the repositionable arm includes at least two of a wired transmitter, a wireless transmitter, a wired receiver, and a wireless receiver.

6. The trailer stabilizer and signaling system of claim 5, wherein:
   the repositionable arm includes a wireless transmitter and a wireless receiver;
   the wireless transmitter comprises an infrared transmitter; and,
   the wireless receiver comprises an infrared receiver.

7. The trailer stabilizer and signaling system of claim 5, wherein:
   the repositionable arm includes a first wireless transmitter, a second wireless transmitter, and a wireless receiver;
   the first wireless transmitter comprises a first infrared transmitter;
   the second wireless transmitter comprises a second infrared transmitter;
   the wireless receiver comprises an infrared receiver; and,
   the first infrared transmitter operates at a first frequency and the second infrared transmitter operates at a second frequency different than the first frequency.

8. The trailer stabilizer and signaling system of claim 4, wherein the repositionable arm comprises a yieldable arm.

9. The trailer stabilizer and signaling system of claim 8, wherein:
   the stabilizer communicator includes a controller communicatively coupled to the deployable signaler; and,
   the controller is configured to control repositioning of the yieldable arm between a stowed position and a deployed position.

10. The trailer stabilizer and signaling system of claim 9, wherein:
    the yieldable arm is operatively coupled to a fluid actuated cylinder that is concurrently coupled to the frame, the fluid actuated cylinder configured to reposition the yieldable arm between the stowed position and the deployed position; and,
    the controller controls repositioning of the fluid actuated cylinder.

11. The trailer stabilizer and signaling system of claim 1, wherein the first visual display is configured to change at least one of color and text when the repositionable freight trailer stabilizer is secured to the parked freight trailer.

12. A trailer stabilizer and signaling system comprising:
    a repositionable freight trailer stabilizer comprising a frame having mounted thereto a wheel, the repositionable freight trailer stabilizer including a repositionable jack;
    a stabilizer communicator operatively coupled to the repositionable freight trailer stabilizer, the stabilizer communicator including a deployable signaler configured to confirm the repositionable freight trailer stabilizer is secured under a parked freight trailer; and,
    a dock communicator adapted to be remote from the stabilizer communicator, the dock communicator configured to at least one of receive a signal from the stabilizer communicator and send a signal to the stabilizer communicator;
    wherein the dock communicator includes at least one of a wired transmitter, a wireless transmitter, a wired receiver, and a wireless receiver.

13. The trailer stabilizer and signaling system of claim 12, wherein:
    the dock communicator includes a wireless transmitter, a first wireless receiver, and a second wireless receiver;
    the wireless transmitter comprises an infrared transmitter;
    the first wireless receiver comprises a first infrared receiver configured to receive infrared signals at a first frequency;
    the second wireless receiver comprises a second infrared receiver configured to receive infrared signals at a second frequency; and,
    the first frequency is different from the second frequency.

14. A trailer stabilizer and signaling system comprising:
    a repositionable freight trailer stabilizer comprising a frame having mounted thereto a wheel, the repositionable freight trailer stabilizer including a repositionable jack; and,
    a stabilizer communicator operatively coupled to the repositionable freight trailer stabilizer, the stabilizer communicator including a deployable signaler configured to confirm the repositionable freight trailer stabilizer is secured under a parked freight trailer; and, a dock communicator adapted to be remote from the stabilizer communicator, the dock communicator configured to at least one of receive a signal from the stabilizer communicator and send a signal to the stabilizer communicator;

wherein the dock communicator includes a first visual display configured to display a message indicative of the repositionable freight trailer stabilizer being properly aligned with respect to the parked freight trailer.

15. The trailer stabilizer and signaling system of claim 14, wherein the first visual display is configured to change at least one of color and text when the repositionable freight trailer stabilizer is properly aligned with respect to the parked freight trailer.

16. The trailer stabilizer and signaling system of claim 14, wherein the dock communicator includes a second visual display configured to display a message indicative of the repositionable freight trailer stabilizer being secured to the parked freight trailer.

17. The trailer stabilizer and signaling system of claim 16, wherein the first visual display is configured to change at least one of color and text when the repositionable freight trailer stabilizer is properly aligned with respect to the parked freight trailer.

18. The trailer stabilizer and signaling system of claim 14, wherein the message includes illuminating at least one of a plurality of lights, at least two of the lights having a different color.

19. The trailer stabilizer and signaling system of claim 18, wherein the plurality of lights include at least two of a red light, a green light, a yellow light, an amber light, and a blue light.

* * * * *